US012641494B2

(12) United States Patent
    Xin et al.

(10) Patent No.:  US 12,641,494 B2
(45) Date of Patent:       May 26, 2026

(54) INTER-NETWORK INTERWORKING METHOD, APPARATUS, AND SYSTEM

(71) Applicant: Huawei Technologies Co., Ltd., Shenzhen (CN)

(72) Inventors: Yang Xin, Shanghai (CN); Guowei Ouyang, Beijing (CN); Weiwei Chong, Shenzhen (CN); Xiaobo Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 901 days.

(21) Appl. No.: 17/832,382

(22) Filed: Jun. 3, 2022

(65) Prior Publication Data

US 2022/0295355 A1      Sep. 15, 2022

Related U.S. Application Data

(63) Continuation of application No. PCT/CN2019/123449, filed on Dec. 5, 2019.

(51) Int. Cl.
    *H04W 36/00*       (2009.01)
    *H04W 36/14*       (2009.01)
(52) U.S. Cl.
    CPC ... *H04W 36/0022* (2013.01); *H04W 36/0033* (2013.01); *H04W 36/14* (2013.01)
(58) Field of Classification Search
    CPC ......... H04W 36/0022; H04W 36/0033; H04W 36/14
    See application file for complete search history.

(56) References Cited

U.S. PATENT DOCUMENTS

2010/0177735 A1    7/2010  Bihannic et al.
2013/0044709 A1*   2/2013  Adjakple .............. H04W 76/15
                                                   370/329

(Continued)

FOREIGN PATENT DOCUMENTS

CN          110519808 A   *  5/2018
CN          109041149 A      12/2018

(Continued)

OTHER PUBLICATIONS

Huawei et al., "Adding 5G-GUTI type for interworking",3GPP TSG-CT WG1 Meeting #109, Montreal (Canada), 3GPP TS 24.501 V03.1, C1-181358, XP051395822, Total 7 pages, 3rd Generation Partnership Project, Valbonne, France (Feb. 26-Mar. 2, 2018).

(Continued)

*Primary Examiner* — Faruk Hamza
*Assistant Examiner* — Tito Q Pham
(74) *Attorney, Agent, or Firm* — Leydig, Voit & Mayer, Ltd.

(57)                    ABSTRACT

An inter-network interworking method, an apparatus, and a system are provided to ensure that a service is not interrupted when a terminal moves from a second network to a third network. When the terminal supports a NAS capability of the third network and/or a network name corresponding to the terminal supports interworking between the second network and the third network, a second access management network element sends a session management request including a session identifier to a first session management network element that supports interworking of the terminal among a first network, the second network, and the third network. The second access management network element receives, from the first session management network element, a session management response including a session context of the terminal in the third network.

12 Claims, 21 Drawing Sheets

(56) References Cited

U.S. PATENT DOCUMENTS

| | | | |
|---|---|---|---|
| 2014/0179318 A1 | 6/2014 | Wang | |
| 2017/0201533 A1* | 7/2017 | Targali | H04L 63/1441 |
| 2017/0223530 A1* | 8/2017 | Marquardt | H04L 41/28 |
| 2018/0376384 A1* | 12/2018 | Youn | H04W 36/144 |
| 2019/0159099 A1 | 5/2019 | Xu et al. | |
| 2020/0107230 A1* | 4/2020 | Zhao | H04W 36/144 |

FOREIGN PATENT DOCUMENTS

| | | |
|---|---|---|
| CN | 109391932 A | 2/2019 |
| CN | 109392042 A | 2/2019 |
| CN | 109673026 A | 4/2019 |
| CN | 110351793 A | 10/2019 |
| CN | 110351796 A | 10/2019 |
| CN | 110351803 A | 10/2019 |
| CN | 110366214 A | 10/2019 |
| CN | 105706518 B | 2/2020 |
| WO | 2018058324 A1 | 4/2018 |
| WO | 2019154036 A1 | 8/2019 |
| WO | 2019196012 A1 | 10/2019 |

OTHER PUBLICATIONS

Cisco Systems, "Support of 2G/3G UEs by PCF and CHF," 3GPP Draft; SA WG2 Meeting #S2-136, Reno, Nevada, USA, S2-1911407, XP051821499, Total 9 pages, 3rd Generation Partnership Project, Valbonne, France (Nov. 18-22, 2019).

Huawei, "The GUAMI and GUMMEI usage for EPS/5GS interworking," 3GPP TSG-RAN3 Meeting #105, Ljubljana, Slovenia, R3-193910, XP051770109, Total 3 pages, 3rd Generation Partnership Project, Valbonne, France (Aug. 26-30, 2019).

Ericsson, "NR Architecture," 3GPP TSG RAN WG3 Chairman, RWS-18000, Total 19 pages 3rd Generation Partnership Project, Valbonne, France (Oct. 23, 2018).

Yanover et al., "5G Network and Service Management including Orchestration," NGMN Alliance, 170307, Total 32 pages (Mar. 7, 2017).

* cited by examiner

2G/3G SM context 4G SM context

INTER-NETWORK INTERWORKING METHOD, APPARATUS, AND SYSTEM

CROSS-REFERENCE TO RELATED APPLICATIONS

This application is a continuation of International Application No. PCT/CN2019/123449, filed on Dec. 5, 2019, the disclosure of which is hereby incorporated by reference in its entirety.

TECHNICAL FIELD

Embodiments of this application relate to the field of communication technologies, and in particular, to an inter-network interworking method, an apparatus, and a system.

BACKGROUND

In a 5th generation (5G) communication system, a 5G network supports interworking with a 4th generation (4G) network. For example, a terminal may move from the 5G network to the 4G network, or move from the 4G network to the 5G network. However, direct interworking between the 5G network and a 2G/3G network is not supported. To be specific, direct movement of the terminal from the 5G network to the 2G/3G network is not supported, or direct movement of the terminal from the 2G/3G network to the 5G network is not supported. The 5G network needs to inter-work with the 2G/3G network by using the 4G network as a medium. To be specific, the terminal may move from the 5G network to the 4G network and then further move from the 4G network to the 2G/3G network; or the terminal may move from the 2G/3G network to the 4G network, and then further move from the 4G network to the 5G network.

Currently, in a conventional architecture of interworking between 2G/3G and 4G networks, the 2G/3G network collaborates with the 4G network to implement conversion between a session context (for example, an evolved packet system (EPS) bearer context or a packet data network (PDN) connection context) in the 4G network and a session context (for example, a packet data protocol (PDP) context) in the 2G/3G network, so that the terminal can move from the 2G/3G network to the 4G network, or move from the 4G network to the 2G/3G network.

However, if the terminal initially accesses the 2G/3G network, a service may be interrupted in a process in which the terminal moves from the 4G network to the 5G network.

SUMMARY

Embodiments of this application provide an inter-network interworking method, an apparatus, and a system, to ensure that a service is not interrupted when a terminal successfully moves from a second network to a third network.

According to a first aspect, an embodiment of this application provides an inter-network interworking method, including: When a terminal supports a non-access stratum (NAS) capability of a third network and/or a network name corresponding to the terminal supports interworking between a second network and the third network, a second access management network element in the second network sends, to a first session management network element, a session management request used to request a session context of the terminal in the third network. The first session management network element supports interworking of the terminal among a first network, the second network, and the third network. The second access management network element receives, from the first session management network element, a session management response including the session context of the terminal in the third network.

This embodiment of this application provides the inter-network interworking method. In the method, when the terminal supports the NAS capability of the third network and/or the network name corresponding to the terminal supports the interworking between the second network and the third network, the second access management network element in the second network sends, to the first session management network element, the session management request used to request the session context of the terminal in the third network. In this way, when determining that the terminal is to move from the first network to the second network, the first session management network element that supports the interworking of the terminal among the first network, the second network, and the third network feeds back, to the second access management network element, the session context that is of the terminal and that can be applied to the third network, so that when the terminal moves the second network, the second network can prepare the session context of the terminal in the third network, to ensure the terminal to move from the second network to the third network in the future.

In a possible implementation, the session management request includes a session identifier, the session identifier is used to identify a session of the terminal in the third network, and the session context is a context of the session corresponding to the session identifier. This solution helps the first session management network element associate the session context of the terminal in the third network with the session identifier.

In a possible implementation, before that a second access management network element sends a session management request to a first session management network element, the method provided in this embodiment of this application further includes: The second access management network element determines the first session management network element. The first session management network element is determined, so that the second access management network element requests the session context of the terminal in the third network from the first session management network element, to prepare the session context of the terminal in the third network in advance.

In a possible implementation, that the second access management network element determines the first session management network element includes: The second access management network element receives address information of the first session management network element from a first access management network element in the first network. This solution is applicable to a case in which when the terminal initially registers with the first network, but the first access management network element can determine that the terminal supports the NAS capability of the third network and/or the network name corresponding to the terminal supports the interworking between the second network and the third network, the first access management network element selects the first session management network element for the terminal during initial access of the terminal. Therefore, when the terminal accesses the first network, the first access management network element may select the first session management network element for the terminal.

In a possible implementation, before that the second access management network element receives address information of the first session management network element from a first access management network element in the first network, the method provided in this embodiment of this application may further include: The second access management network element sends a context request including an identifier of the terminal to the first access management network element, so that the address information of the first session management network element can be obtained in a process of requesting the context of the terminal. For example, the context request may be further used to request information about the session management network element that supports the interworking of the terminal among the first network, the second network, and the third network.

In a possible implementation, that the second access management network element determines the first session management network element includes: The second access management network element determines that the terminal supports the NAS capability of the third network and/or the network name corresponding to the terminal supports the interworking between the second network and the third network, where a second session management network element selected, in the first network, by the first access management network element for the terminal does not support the interworking between the second network and the third network; and the second access management network element selects the first session management network element. This solution is applicable to a case in which if the second session management network element selected by the first access management network element for the terminal does not support the interworking between the second network and the third network, when determining that the terminal supports the NAS capability of the third network and/or the network name corresponding to the terminal supports the interworking between the second network and the third network, the second access management network element autonomously selects the first session management network element for the terminal. For example, the second access management network element may select the first session management network element in the following manner: The first session management network element obtains the address information of the first session management network element from a network repository function NRF or a DNS server.

In a possible implementation, the method provided in this embodiment of this application further includes: The second access management network element receives a first request message from the terminal, where the first request message includes the session identifier and/or first capability information, and the first capability information indicates that the terminal supports the NAS capability of the third network. For example, the first request message may be a tracking area update request. In this way, the terminal sends the session identifier to the second access management network element in a process in which the terminal moves from the first network to the second network, and the terminal includes the first capability information in the tracking area update request in the process in which the terminal moves from the first network to the second network, so that the second access management network element determines that the terminal supports the NAS capability of the third network. Certainly, the first capability information may alternatively be notified by the terminal to the second access management network element by using a message other than the tracking area update request. This is not limited in this embodiment of this application.

In a possible implementation, the session management request includes the session identifier and/or second indication information that indicates the terminal to move from the first network to the second network, or second indication information that indicates a network accessed by the terminal to be switched from the first network to the second network. In this way, the first session management network element generates a first session context corresponding to the session identifier, the second indication information helps the first session management network element determine that the access network of the terminal is switched, so that the first session context or an updated second session context is generated.

In a possible implementation, after that the second access management network element receives a session management response from the first session management network element, the method provided in this embodiment of this application further includes: The second access management network element sends the session context of the terminal in the third network to the terminal. In this way, the terminal subsequently moves from the second network to the third network based on the session context of the terminal in the third network.

In a possible implementation, the session context of the terminal in the third network includes the second session context and/or the first session context associated with the session identifier.

In a possible implementation, the method provided in this embodiment of this application further includes: The second access management network element receives a registration request message from the terminal, where the registration request message includes the first capability information.

In a possible implementation, the first network is a 2G network or a 3G network, the second network is a 4G network, and the third network is a 5G network.

In a possible implementation, the first access management network element is a core network entity serving GPRS support node SGSN in the 2G network or the 3G network. The second access management network element is a mobility management entity MME. The first session management network element is a session management network element SMF+PGW-C+GGSN-C network element that supports the interworking of the terminal among the first network, the second network, and the third network. The second session management network element is a PGW network element, a PGW-C network element, or a PGW-C+GGSN-C network element.

According to a second aspect, an embodiment of this application provides an inter-network interworking method, including: A first access management network element in a first network determines that a terminal supports a NAS capability of a third network and/or a network name corresponding to the terminal supports interworking between a second network and the third network; and the first access management network element selects a first session management network element for the terminal, where the first session management network element supports interworking of the terminal among a first network, the second network, and the third network. In a process in which the terminal moves from the first network to the second network, the first access management network element sends address information of the first session management network element to a second access management network element in the second network.

In this solution, when the terminal accesses the first network, the first access management network element may select, for the terminal, the first session management network element that supports the interworking of the terminal among the first network, the second network, and the third network, so that in the process in which the terminal subsequently moves from the first network to the second network, the first access management network element sends address information of a second session management network element to the second access management network element, so that the second access management network element subsequently requests the second session management network element to generate a session context of the terminal in the third network.

In a possible implementation, before that the first access management network element sends address information of a second session management network element to the second access management network element in the second network, the method provided in this embodiment of this application further includes: The first access management network element receives, from the second access management network element, a context request including an identifier of the terminal. Correspondingly, the first access management network element may send the address information of the second session management network element to the second access management network element in the second network in the following manner: The first access management network element sends a context response to the second access management network element in the second network, where the context response includes the address information of the second session management network element.

In a possible implementation, the method provided in this embodiment of this application further includes: The first access management network element receives, from the terminal, a registration request message including first capability information, where the first capability information is used to indicate that the terminal supports the NAS capability of the third network. Therefore, in a process in which the terminal registers with the first network, the first access management network element selects, for the terminal, the first session management network element that supports the interworking of the terminal among the first network, the second network, and the third network.

In a possible implementation, the method provided in this embodiment of this application further includes: The first access management network element obtains subscription information that is of the terminal and that includes first indication information, where the first indication information indicates that the network name corresponding to the terminal supports the interworking between the second network and the third network. This helps the first access management network element determine that the interworking between the second network and the third network is supported.

According to a third aspect, an embodiment of this application provides an inter-network interworking method, including: A first session management network element receives a session management request from a second access management network element in a second network. The first session management network element supports interworking of a terminal among a first network, the second network, and a third network. When the terminal moves from the first network to the second network, the first session management network element sends a session context of the terminal in the third network to the second access management network element based on the session management request.

According to the method, in a process in which the terminal moves from the first network to the second network, the first session management network element may generate, in advance for the terminal based on the session management request of the second access management network element, the session context applied to the third network. This helps the terminal subsequently move from the second network to the third network.

In a possible implementation, the method provided in this embodiment of this application further includes: The first session management network element obtains subscription information that is of the terminal and that includes first indication information. The first indication information indicates that a network name corresponding to the terminal supports interworking between the second network and the third network.

In a possible implementation, the session management request includes a session identifier of the terminal, the session identifier is used to identify a session of the terminal in the third network, and the session context is a context of the session corresponding to the session identifier. This helps the first session management network element generate the session context corresponding to the session identifier.

In a possible implementation, the session management request further includes second indication information indicating that a network accessed by the terminal is switched from the first network to the second network, so that the first session management network element determines that the network accessed by the terminal is switched, and generates the session context of the terminal in the third network.

In a possible implementation, that the first session management network element generates, based on the session management request, the session context corresponding to the session identifier includes: The first session management network element generates the session context of the terminal in the third network based on the first indication information.

According to a fourth aspect, an embodiment of this application provides an inter-network interworking method, including: In a process in which a terminal moves from a first network to a second network, the terminal sends a first request message to a second access management network element in the second network, where the first request message is used to enable the terminal to move from the first network to the second network. The terminal supports a NAS capability of a third network and/or a network name corresponding to the terminal supports interworking between the second network and the third network. The terminal receives, from the second access management network element, a first response message including a session context of the terminal in the third network.

In a possible implementation, the method provided in this embodiment of this application further includes: The terminal allocates a session identifier based on at least one of the following information: that the terminal moves from the first network to the second network, first capability information, that the network name of the terminal supports the interworking between the second network and the third network, and that the terminal creates a session in the first network, where the first capability information indicates that the terminal supports the NAS capability of the third network.

In a possible implementation, the first request message further includes the session identifier and/or the first capability information, and the session identifier is used to identify a session of the terminal in the third network. This solution is applicable to a case in which the terminal initially registers with the first network.

In a possible implementation, the method provided in this embodiment of this application further includes: The terminal sends a registration request message including the first capability information to the second access management network element. This solution is applicable to a case in which the terminal initially registers with the second network.

In a possible implementation, the first request message includes a session identifier of the terminal, and the session identifier is used to identify the session of the terminal in the third network.

According to a fifth aspect, an embodiment of this application provides an inter-network interworking method, including: A second access management network element in a second network determines that a terminal is to move from a first network to the second network. The second access management network element sends third indication information and/or second indication information to an access network element in the second network, where the third indication information is used by the access network element to determine to prohibit the terminal from accessing a third network from the second network, and the second indication information indicates the terminal to access the third network in an initial registration manner.

This embodiment of this application provides the inter-network interworking method. In the method, when determining that the terminal is to move from the first network to the second network, the second access management network element sends the third indication information and/or the second indication information to the access network element in the second network. In this way, the third indication information may be used to prohibit the terminal from moving from the second network to the third network, to avoid a problem that a service is interrupted when the terminal moves from the second network to the third network. The second indication information may be used to guide the terminal to access the third network in a re-registration manner.

In a possible implementation, that a second access management network element in a second network determines that a terminal is to move from a first network to the second network includes: The second access management network element receives, from the terminal or the access network element, fourth indication information that indicates the terminal to move from the first network to the second network.

In a possible implementation, that a second access management network element in a second network determines that a terminal is to move from a first network to the second network includes: The second access management network element determines that the terminal is to be redirected or handed over from the first network to the second network.

In a possible implementation, the second access management network element determines that the terminal initially registers with the first network.

In a possible implementation, the first network is a 2G network or a 3G network, the second network is a 4G network, and the third network is a 5G network.

According to a sixth aspect, an embodiment of this application provides an inter-network interworking method, including: A terminal sends a tracking area update request to a second access management network element in a second network, where the tracking area update request includes at least one of first capability information and a session identifier of the terminal, the first capability information indicates that the terminal supports a NAS capability of a third network, and the session identifier is used to identify a session of the terminal in the third network. The terminal receives any one of first indication information, second indication information, or third indication information from the second access management network element, where the first indication information indicates the terminal to deregister from the second network; the second indication information indicates the terminal to release a first packet data network (PDN) connection corresponding to a network name, where the first PDN connection does not support interworking between the second network and the third network; and the third indication information indicates the terminal to establish a second PDN connection corresponding to a first network name, where the second PDN connection supports the interworking between the second network and the third network.

In a possible implementation, the first indication information further indicates the terminal to initiate initial registration in the second network immediately after the terminal deregisters from the second network.

In a possible implementation, after that the terminal receives first indication information, the method provided in this embodiment of this application further includes: The terminal sends a first request (for example, an attach request attach request) to the second access management network element, where the first request is used to request to register with the second network, where the first request carries at least one of the first capability information and the session identifier of the terminal, the first capability information is used to indicate that the terminal supports the NAS capability of the third network, and the session identifier is used to identify the session of the terminal in the third network. This helps the second access management network element select a first session management network element for the terminal in a registration process of the terminal, to assist the terminal in moving from the second network to the third network subsequently.

In a possible implementation, the second indication information further indicates the terminal to establish a second PDN connection corresponding to the network name immediately after releasing the first PDN connection, where the second PDN connection supports the interworking between the second network and the third network.

In a possible implementation, the third indication information further indicates the terminal to release a first PDN connection corresponding to the first network name after establishing the second PDN connection, where the first PDN connection does not support the interworking between the second network and the third network.

In a possible implementation, the terminal supports the NAS capability of the third network and/or the network name of the terminal supports the interworking between the second network and the third network.

In a possible implementation, that the first PDN connection does not support the interworking between the second network and the third network includes: The first session management network element corresponding to the first PDN connection does not support the interworking between the second network and the third network.

In a possible implementation, that the second PDN connection supports the interworking between the second network and the third network includes: The first session management network element corresponding to the second PDN connection supports the interworking between the second network and the third network.

According to a seventh aspect, an embodiment of this application provides an inter-network interworking method, including: A terminal supports a NAS capability of a third network and/or a network name of the terminal supports interworking from a second network to the third network, and a second access management network element in the second network determines that a second session management network element determined by a first access management network element in a first network for the terminal does not support the interworking between the second network and the third network; and the second access management network element sends any one of first indication information, second indication information, or third indication information to the terminal, where the first indication information indicates the terminal to deregister from the second network; the second indication information indicates the terminal to release a first packet data network PDN connection corresponding to the network name, where the first PDN connection does not support the interworking from the second network and the third network; and the third indication information indicates the terminal to establish a second PDN connection corresponding to a first network name, where the second PDN connection supports the interworking between the second network and the third network.

In a possible implementation, the first indication information further indicates the terminal to initiate initial registration in the second network immediately after the terminal deregisters from the second network.

In a possible implementation, after that the second access management network element sends first indication information to the terminal, the method provided in this embodiment of this application further includes: The second access management network element receives a first request (for example, an attach request attach request) from the terminal, where the first request is used to request to register with the second network, the first request carries at least one of first capability information and a session identifier of the terminal, the first capability information is used to indicate that the terminal supports the NAS capability of the third network, and the session identifier is used to identify a session of the terminal in the third network. This helps the second access management network element select, for the terminal in a process in which the terminal requests to initially register with the second network, a session management network element that supports interworking of the terminal among the first network, the second network, and the third network.

In a possible implementation, the second indication information further indicates the terminal to establish a second PDN connection corresponding to the network name immediately after releasing the first PDN connection, where the second PDN connection supports the interworking between the second network and the third network.

In a possible implementation, after that the second access management network element sends second indication information to the terminal, the method provided in this embodiment of this application further includes: The second access management network element receives a PDN connection establishment request from the terminal, where the PDN connection establishment request carries a session identifier. The PDN connection establishment request is used to request to establish the second PDN connection, so that the second access management network element selects the first session management network element for the terminal in a process of establishing the second PDN connection.

In a possible implementation, the third indication information further indicates the terminal to release a first PDN connection corresponding to the first network name after establishing the second PDN connection, where the first PDN connection does not support the interworking between the second network and the third network.

In a possible implementation, after that the second access management network element sends third indication information to the terminal, the method provided in this embodiment of this application further includes: The second access management network element receives a PDN connection establishment request from the terminal, where the PDN connection establishment request carries the session identifier, and the PDN connection establishment request is used to request to establish the second PDN connection, so that the second access management network element selects the session management network element for the terminal in a process of establishing the second PDN connection.

In a possible implementation, the terminal supports the NAS capability of the third network and/or the network name of the terminal supports the interworking between the second network and the third network.

In a possible implementation, the method provided in this embodiment of this application further includes: The second access management network element receives a tracking area update request from the terminal, where the tracking area update request includes at least one of the first capability information and the session identifier of the terminal, the first capability information is used to indicate that the terminal supports the NAS capability of the third network, and the session identifier is used to identify the session of the terminal in the third network.

In a possible implementation, the method provided in this embodiment of this application further includes: The second access management network element receives, from the first access management network element, address information of the second session management network element determined for the terminal.

In a possible implementation, that second access management network element receives, from the first access management network element, address information of the second session management network element determined for the terminal includes: In a process in which the second access management network element obtains a session context of the terminal in the second network from the first access management network element, the second access management network element receives the address information of the second session management network element from the first access management network element.

In a possible implementation, that the first PDN connection does not support the interworking between the second network and the third network includes: The first session management network element corresponding to the first PDN connection does not support the interworking between the second network and the third network.

In a possible implementation, that the second PDN connection supports the interworking between the second network and the third network includes: The first session management network element corresponding to the second PDN connection supports the interworking between the second network and the third network.

According to an eighth aspect, an embodiment of this application provides a communication apparatus. The communication apparatus may be a second access management network element, or a chip used in the second access management network element. The communication apparatus includes a transceiver unit and a processing unit. When the second access management network element performs the method in any one of the first aspect or the optional designs of the first aspect, the transceiver unit is configured to perform sending and receiving operations, and the processing unit is configured to perform an action other than the sending and receiving operations. For example, when the second access management network element performs the method in the first aspect, the transceiver unit is configured to: when the processing unit determines that a terminal supports a NAS capability of a third network and/or a network name corresponding to the terminal supports interworking between a second network and the third network, send, to a first session management network element, a session management request used to request a session context of the terminal in the third network, where the first session management network element supports interworking of the terminal among a first network, the second network, and the third network. The transceiver unit is further configured to receive a session management response from the first session management network element, where the session management response includes the session context of the terminal in the third network.

For example, when the communication apparatus is a chip or a chip system in the second access management network element, the processing unit may be a processor, and the transceiver unit may be a communication interface. For example, the communication interface may be an input/output interface, a pin, a circuit, or the like. The processing unit executes instructions stored in a storage unit, so that the second access management network element implements the inter-network interworking method described in any one of the first aspect or the possible implementations of the first aspect. The storage unit may be a storage unit (for example, a register or a cache) in the chip, or may be a storage unit (for example, a read-only memory or a random access memory) that is in the second access management network element and that is outside the chip.

According to a ninth aspect, an embodiment of this application provides a communication apparatus. The communication apparatus may be a first access management network element, or a chip used in the first access management network element. The communication apparatus includes a transceiver unit and a processing unit. When the first access management network element performs the method in any one of the second aspect or the optional designs of the second aspect, the transceiver unit is configured to perform sending and receiving operations, and the processing unit is configured to perform an action other than the sending and receiving operations. For example, when the first access management network element performs the method in the second aspect, the processing unit is configured to: determine that a terminal supports a NAS capability of a third network and/or a network name corresponding to the terminal supports interworking between a second network and the third network, and select a second session management network element for the terminal, where the second session management network element supports interworking of the terminal among a first network, the second network, and the third network. The transceiver unit is configured to: in a process in which the terminal moves from the first network to the second network, send address information of a first session management network element to a second access management network element in the second network.

For example, when the communication apparatus is a chip or a chip system in the first access management network element, the processing unit may be a processor, and the transceiver unit may be a communication interface. For example, the communication interface may be an input/output interface, a pin, a circuit, or the like. The processing unit executes instructions stored in a storage unit, so that the first access management network element implements the inter-network interworking method described in any one of the second aspect or the possible implementations of the second aspect. The storage unit may be a storage unit (for example, a register or a cache) in the chip, or may be a storage unit (for example, a read-only memory or a random access memory) that is in the first access management network element and that is outside the chip.

According to a tenth aspect, an embodiment of this application provides a communication apparatus. The communication apparatus may be a first session management network element, or a chip used in the first session management network element. The communication apparatus includes a transceiver unit and a processing unit. When the first session management network element performs the method in any one of the third aspect or the optional designs of the third aspect, the transceiver unit is configured to perform sending and receiving operations, and the processing unit is configured to perform an action other than the sending and receiving operations. For example, when the first session management network element performs the method in the third aspect, the transceiver unit is configured to receive a session management request from a second access management network element in a second network. The apparatus supports interworking of a terminal among a first network, the second network, and a third network. A network accessed by the terminal is switched from the first network to the second network. In response to the session management request, the processing unit is configured to generate a session context of the terminal in the third network. The transceiver unit is further configured to send the session context of the terminal in the third network to the second access management network element.

For example, when the communication apparatus is a chip or a chip system in the first session management network element, the processing unit may be a processor, and the transceiver unit may be a communication interface. For example, the communication interface may be an input/output interface, a pin, a circuit, or the like. The processing unit executes instructions stored in a storage unit, so that the first session management network element implements the inter-network interworking method described in any one of the third aspect or the possible implementations of the third aspect. The storage unit may be a storage unit (for example, a register or a cache) in the chip, or may be a storage unit (for example, a read-only memory or a random access memory) that is in the first session management network element and that is outside the chip.

According to an eleventh aspect, an embodiment of this application provides a communication apparatus. The communication apparatus may be a terminal, or a chip used in the terminal. The communication apparatus includes a transceiver unit and a processing unit. When the terminal performs the method in any one of the fourth aspect or the optional designs of the fourth aspect, the transceiver unit is configured to perform sending and receiving operations, and the processing unit is configured to perform an action other than the sending and receiving operations. For example, when the terminal performs the method in the fourth aspect, the processing unit is configured to determine that the apparatus moves from a first network to a second network, and the transceiver unit is configured to send a first request message to a second access management network element in the second network in a process in which the apparatus moves from the first network to the second network. The transceiver unit is further configured to receive, from the second access management network element, a first response message including a session context of the apparatus in a third network. The first request message is used to request to move the terminal from the first network to the second network.

For example, when the communication apparatus is a chip or a chip system in the terminal, the processing unit may be a processor, and the transceiver unit may be a communication interface. For example, the communication interface may be an input/output interface, a pin, a circuit, or the like. The processing unit executes instructions stored in a storage unit, so that the terminal implements the inter-network interworking method described in any one of the fourth aspect or the possible implementations of the fourth aspect. The storage unit may be a storage unit (for example, a register or a cache) in the chip, or may be a storage unit (for example, a read-only memory or a random access memory) that is in the terminal and that is outside the chip.

According to a twelfth aspect, an embodiment of this application provides a communication apparatus. The communication apparatus may be a second access management network element, or a chip used in the second access management network element. The communication apparatus includes a transceiver unit and a processing unit. When the second access management network element performs the method in any one of the fifth aspect or the optional designs of the fifth aspect, the transceiver unit is configured to perform sending and receiving operations, and the processing unit is configured to perform an action other than the sending and receiving operations. For example, when the second access management network element performs the method in the fifth aspect, the processing unit is configured to determine that a terminal is to move from a first network to a second network. The transceiver unit is configured to send third indication information and/or second indication information to an access network element in the second network, where the third indication information is used by the access network element to determine to prohibit the terminal from accessing a third network from the second network, and the second indication information indicates the terminal to access the third network in an initial registration manner.

For example, when the communication apparatus is a chip or a chip system in the second access management network element, the processing unit may be a processor, and the transceiver unit may be a communication interface. For example, the communication interface may be an input/output interface, a pin, a circuit, or the like. The processing unit executes instructions stored in a storage unit, so that the second access management network element implements the inter-network interworking method described in any one of the fifth aspect or the possible implementations of the fifth aspect. The storage unit may be a storage unit (for example, a register or a cache) in the chip, or may be a storage unit (for example, a read-only memory or a random access memory) that is in the second access management network element and that is outside the chip.

According to a thirteenth aspect, an embodiment of this application provides a communication apparatus. The communication apparatus may be a terminal, or a chip used in the terminal. The communication apparatus includes a transceiver unit and a processing unit. When the terminal performs the method in any one of the sixth aspect or the optional designs of the sixth aspect, the transceiver unit is configured to perform sending and receiving operations, and the processing unit is configured to perform an action other than the sending and receiving operations. For example, when the terminal performs the method in the sixth aspect, the transceiver unit is configured to send a tracking area update request to a second access management network element in a second network, where the tracking area update request includes at least one of first capability information and a session identifier of the apparatus, the first capability information indicates that the apparatus supports a non-access stratum NAS capability of a third network, and the session identifier is used to identify a session of the apparatus in the third network. The transceiver unit is configured to receive any one of first indication information, second indication information, or third indication information from the second access management network element, where the first indication information indicates the apparatus to deregister from the second network; the second indication information indicates the apparatus to release a first packet data network PDN connection corresponding to a network name, where the first PDN connection does not support interworking between the second network and the third network; and the third indication information indicates the apparatus to establish a second PDN connection corresponding to a first network name, where the second PDN connection supports the interworking between the second network and the third network.

For example, when the communication apparatus is a chip or a chip system in the terminal, the processing unit may be a processor, and the transceiver unit may be a communication interface. For example, the communication interface may be an input/output interface, a pin, a circuit, or the like. The processing unit executes instructions stored in a storage unit, so that the terminal implements the inter-network interworking method described in any one of the sixth aspect or the possible implementations of the sixth aspect. The storage unit may be a storage unit (for example, a register or a cache) in the chip, or may be a storage unit (for example, a read-only memory or a random access memory) that is in the terminal and that is outside the chip.

According to a fourteenth aspect, an embodiment of this application provides a communication apparatus. The communication apparatus may be a second access management network element, or a chip used in the second access management network element. The communication apparatus includes a transceiver unit and a processing unit. When the second access management network element performs the method in any one of the seventh aspect or the optional designs of the seventh aspect, the transceiver unit is configured to perform sending and receiving operations, and the processing unit is configured to perform an action other than the sending and receiving operations. For example, when a terminal performs the method in the seventh aspect, and the terminal supports a NAS capability of a third network and/or a network name of the terminal supports interworking from a second network to the third network, the processing unit is configured to: determine that a second session management network element determined by a first access management network element in a first network for the terminal does not support the interworking between the second network and the third network; and the transceiver unit is configured to send any one of first indication information, second indication information, or third indication information to the terminal, where the first indication information indicates the terminal to deregister from the second network; the second indication information indicates the terminal to release a first packet data network PDN connection corresponding to the network name, where the first PDN connection does not support the interworking from the second network and the third network; and the third indication information indicates the terminal to establish a second PDN connection corresponding to a first network name, where the second PDN connection supports the interworking between the second network and the third network.

For example, when the communication apparatus is a chip or a chip system in the second access management network element, the processing unit may be a processor, and the transceiver unit may be a communication interface. For example, the communication interface may be an input/output interface, a pin, a circuit, or the like. The processing unit executes instructions stored in a storage unit, so that the second access management network element implements the inter-network interworking method described in any one of the seventh aspect or the possible implementations of the seventh aspect. The storage unit may be a storage unit (for example, a register or a cache) in the chip, or may be a storage unit (for example, a read-only memory or a random access memory) that is in the second access management network element and that is outside the chip.

According to a fifteenth aspect, this application provides a second access management network element, including a processor, where the processor reads instructions stored in a memory, to implement the method in any one of the first aspect or the optional designs of the first aspect. The memory may be a memory in the second access management network element.

According to a sixteenth aspect, this application provides a first access management network element, including a processor, where the processor reads instructions stored in a memory, to implement the method in any one of the second aspect or the optional designs of the second aspect. The memory may be a memory in the first access management network element.

According to a seventeenth aspect, this application provides a first session management network element, including a processor, where the processor reads instructions stored in a memory, to implement the method in any one of the third aspect or the optional designs of the third aspect. The memory may be a memory in the first session management network element.

According to an eighteenth aspect, this application provides a terminal, including a processor, where the processor reads instructions stored in a memory, to implement the method in any one of the fourth aspect or the optional designs of the fourth aspect. The memory may be a memory in the terminal.

According to a nineteenth aspect, this application provides a second access management network element, including a processor, where the processor reads instructions stored in a memory, to implement the method in any one of the fifth aspect or the optional designs of the fifth aspect. The memory may be a memory in the second access management network element.

According to a twentieth aspect, this application provides a terminal, including a processor, where the processor reads instructions stored in a memory, to implement the method in any one of the sixth aspect or the optional designs of the sixth aspect. The processor is connected to the memory. The memory may be a memory in the terminal.

According to a twenty-first aspect, this application provides a second access management network element, including a processor, where the processor reads instructions stored in a memory, to implement the method in any one of the seventh aspect or the optional designs of the seventh aspect. The memory may be a memory in the second access management network element.

According to a twenty-second aspect, this application provides a second access management network element, including a communication interface and a processor connected to the communication interface. The second access management network element performs the method in any one of the first aspect or the optional designs of the first aspect by using the communication interface and the processor.

According to a twenty-third aspect, this application provides a first access management network element, including a communication interface and a processor connected to the communication interface. The first access management network element is configured to perform the method in any one of the second aspect or the optional designs of the second aspect by using the communication interface and the processor.

According to a twenty-fourth aspect, this application provides a first session management network element, including a communication interface and a processor connected to the communication interface. The first session management network element is configured to perform the method in any one of the third aspect or the optional designs of the third aspect by using the communication interface and the processor.

According to a twenty-fifth aspect, this application provides a terminal, including a communication interface and a processor connected to the communication interface. The terminal is configured to perform the method in any one of the fourth aspect or the optional designs of the fourth aspect by using the communication interface and the processor.

According to a twenty-sixth aspect, this application provides a second access management network element, including a communication interface and a processor connected to the communication interface. The second access management network element is configured to perform the method in any one of the fifth aspect or the optional designs of the fifth aspect by using the communication interface and the processor.

According to a twenty-seventh aspect, this application provides a terminal, including a communication interface and a processor connected to the communication interface. The terminal is configured to perform the method in any one of the sixth aspect or the optional designs of the sixth aspect by using the communication interface and the processor.

According to a twenty-eighth aspect, this application provides a second access management network element, including a communication interface and a processor connected to the communication interface. The second access management network element is configured to perform the method in any one of the seventh aspect or the optional designs of the seventh aspect by using the communication interface and the processor.

According to a twenty-ninth aspect, an embodiment of this application provides a communication system, including the second access management network element in any one of the twenty-eighth aspect, the twenty-first aspect, and the fourteenth aspect and a first access management network element. The first access management network element is configured to select, for a terminal, a session management network element that does not support interworking between a second network and a third network.

In a possible implementation, the communication system described in the twenty-ninth aspect may further include the terminal described in any one of the twentieth aspect, the twenty-seventh aspect, or the thirteenth aspect.

According to a thirtieth aspect, an embodiment of this application provides a communication system, including the second access management network element described in any one of the eighth aspect, the fifteenth aspect, and the twenty-second aspect, the first access management network element described in any one of the ninth aspect, the sixteenth aspect, and the twenty-third aspect, and the first session management network element described in any one of the tenth aspect, the seventeenth aspect, and the twenty-fourth aspect.

In a possible implementation, the communication system may further include the terminal described in any one of the eleventh aspect, the eighteenth aspect, and the twenty-fifth aspect.

According to a thirty-first aspect, this application provides a computer-readable storage medium, including computer-readable instructions. When the instructions are run on a computer, the computer is enabled to perform the method in any possible design of any one of the first aspect, the second aspect, the third aspect, the fourth aspect, the fifth aspect, the sixth aspect, or the seventh aspect.

According to a thirty-second aspect, this application provides a computer program product, including a computer program. When the program runs on a computer, the computer is enabled to perform the method in any possible design of any one of the first aspect, the second aspect, the third aspect, the fourth aspect, the fifth aspect, the sixth aspect, or the seventh aspect.

According to a thirty-third aspect, this application provides a chip, used in a second access management network element. The chip includes at least one processor and a communication interface. The communication interface is coupled to the at least one processor. The processor is configured to run a computer program or instructions, to perform the method in any one of the first aspect or the possible implementations of the first aspect. The communication interface is configured to communicate with another module outside the chip.

According to a thirty-fourth aspect, this application provides a chip, used in a first access management network element. The chip includes at least one processor and a communication interface. The communication interface is coupled to the at least one processor. The processor is configured to run a computer program or instructions, to perform the method in any one of the second aspect or the possible implementations of the second aspect. The communication interface is configured to communicate with another module outside the chip.

According to a thirty-fifth aspect, this application provides a chip, used in a first session management network element. The chip includes at least one processor and a communication interface. The communication interface is coupled to the at least one processor. The processor is configured to run a computer program or instructions, to perform the method in any one of the third aspect or the possible implementations of the third aspect. The communication interface is configured to communicate with another module outside the chip.

According to a thirty-sixth aspect, this application provides a chip, used in a terminal. The chip includes at least one processor and a communication interface. The communication interface is coupled to the at least one processor. The processor is configured to run a computer program or instructions, to perform the method in any one of the fourth aspect or the possible implementations of the fourth aspect. The communication interface is configured to communicate with another module outside the chip.

According to a thirty-seventh aspect, this application provides a chip, used in a second access management network element. The chip includes at least one processor and a communication interface. The communication interface is coupled to the at least one processor. The processor is configured to run a computer program or instructions, to perform the method in any one of the fifth aspect or the possible implementations of the fifth aspect. The communication interface is configured to communicate with another module outside the chip.

According to a thirty-eighth aspect, this application provides a chip, used in a terminal. The chip includes at least one processor and a communication interface. The communication interface is coupled to the at least one processor. The processor is configured to run a computer program or instructions, to perform the method in any one of the sixth aspect or the possible implementations of the sixth aspect. The communication interface is configured to communicate with another module outside the chip.

According to a thirty-ninth aspect, this application provides a chip, used in a second access management network element. The chip includes at least one processor and a communication interface. The communication interface is coupled to the at least one processor. The processor is configured to run a computer program or instructions, to perform the method in any one of the seventh aspect or the possible implementations of the seventh aspect. The communication interface is configured to communicate with another module outside the chip.

Optionally, the chip described in this application may further include at least one memory, and the at least one memory stores instructions or a computer program.

According to a fortieth aspect, an embodiment of this application provides a communication apparatus. The communication apparatus may be any one of a second access management network element, a first access management network element, a first session management network element, or a terminal, or may be a chip used in any one of the second access management network element, the first access management network element, the first session management network element, or the terminal. The communication apparatus has a function of implementing the method described in any one of the first aspect, the second aspect, the third aspect, the fourth aspect, the fifth aspect, the sixth aspect, and the seventh aspect. The function may be implemented by hardware, or may be implemented by hardware executing corresponding software. The hardware or the software includes one or more modules corresponding to the function.

DESCRIPTION OF EMBODIMENTS

Figure 1A:
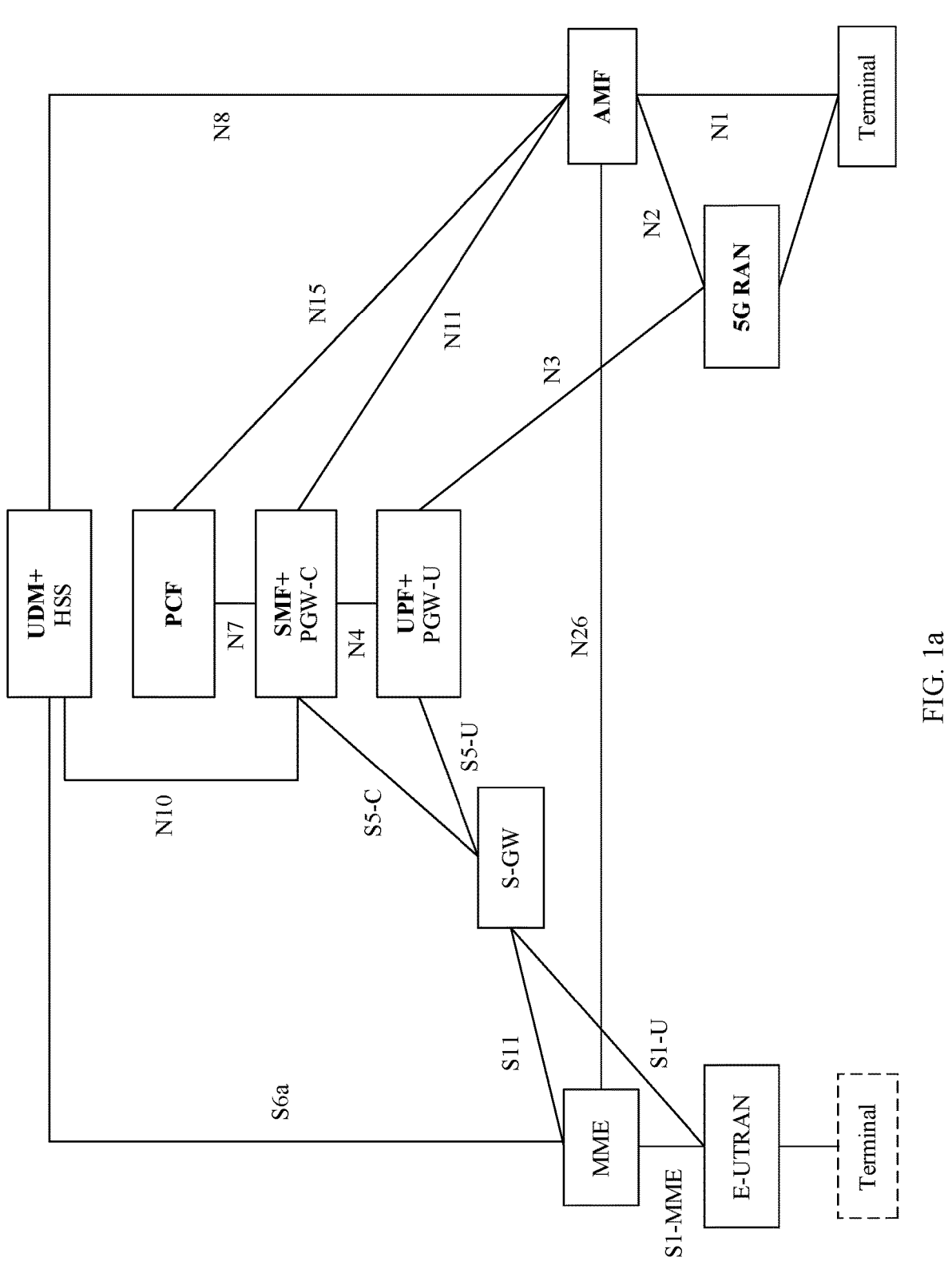
FIG. 1a is a system architecture for interworking between a 5G network and a 4G network according to an embodiment of this application.

Before this application is described, the technical terms in embodiments of this application are described first.

1. A packet data network (PDN) connection (connection or connectivity) is a group of evolved packet system (EPS) bearers established on a terminal in a second network (for example, a 4G network). These EPS bearers have a same IP address and a same access point name (APN). The EPS bearer is a data transmission channel in the second communication system (for example, the 4G network). On a terminal side and a network side, one PDN connection is identified by using an IP address, an APN, or a default evolved packet system bearer identifier (Default EPS Bearer ID).

2. A context of a PDN connection (which may also be referred to as an EPS bearer context) includes an IP address, an APN, a PDN gateway (PGW) address, and context information of each EPS bearer that are used by the PDN connection, where the context information of the EPS bearer includes a QoS parameter of the bearer and the like.

3. A PDU session is a group of QoS flows established on a terminal in a third network (for example, a 5G network). These QoS flows have a same IP address and a same data network name (DNN). The QoS flow is a data transmission channel in the third network (for example, the 5G network). On a terminal side and a network side, one PDU session is identified by using a terminal IP address, a DNN, or a PDU session identifier (PDU Session ID).

4. A context of a PDU session (corresponding to a 5G SM context or a 5G session context below) includes an IP address, an APN, an SMF network element address, a UPF network element address, and context information of each QoS flow that are used by the PDU session. One PDU session may include a plurality of QoS flows. In a PDU session in a third network, there is a QoS flow corresponding to a dedicated EPS bearer in a second network, and there is a QoS flow corresponding to a default EPS bearer in the second network.

For example, one dedicated EPS bearer may correspond to one or more QoS flows in the PDU session, and one default EPS bearer may also correspond to one or more QoS flows in the PDU session. Optionally, the default EPS bearer may correspond to a default QoS flow. The default QoS flow is a QoS flow corresponding to a default QoS rule. Optionally, one GBR dedicated EPS bearer corresponds to one or more GBR QoS flows.

To clearly describe the technical solutions in embodiments of this application, terms such as "first" and "second" are used in embodiments of this application to distinguish between same items or similar items that provide basically same functions and purposes. For example, a first access management network element and a second access management network element are merely intended to distinguish between different access management network elements, and do not limit a sequence of the first access management network element and the second access management network element. A person skilled in the art may understand that the terms such as "first" and "second" do not limit a quantity and an execution sequence, and the terms such as "first" and "second" do not indicate a definite difference either.

It should be noted that, in this application, the word such as "example" or "for example" is used to represent giving an example, an illustration, or a description. Any embodiment or design solution described by using "example" or "for example" in this application shall not be construed as being more preferred or more advantageous than another embodiment or design solution. Exactly, use of the word such as "example" or "for example" is intended to present a related concept in a specific manner.

A network architecture and a service scenario that are described in embodiments of this application are intended to describe the technical solutions in embodiments of this application more clearly, and do not constitute any limitation on the technical solutions provided in embodiments of this application. A person of ordinary skill in the art may know that, with evolution of the network architecture and emergence of a new service scenario, the technical solutions provided in embodiments of this application are also applicable to a similar technical problem.

In this application, "at least one" means one or more, and "a plurality of" means two or more. The term "and/or" describes an association relationship between associated objects and indicates that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof means any combination of the items, including a singular item (piece) or any combination of a plurality of items (pieces). For example, at least one of a, b, or c may indicate: a, b, c, a and b, a and c, b and c, or a, b, and c, where a, b, and c may be singular or plural.

A system architecture and a service scenario described in embodiments of this application are intended to describe the technical solutions in embodiments of this application more clearly, and do not constitute any limitation on the technical solutions provided in embodiments of this application. A person of ordinary skill in the art may know that, with evolution of a network architecture and emergence of a new service scenario, the technical solutions provided in embodiments of this application are also applicable to a similar technical problem. In embodiments of this application, an example in which a provided method is applied to an NR system or a 5G network is used for description.

Before embodiments of this application are described, interworking between a 5G network and a 4G network and interworking between the 4G network and a 2G/3G network are described first.

FIG. 1a is a diagram of an architecture for interworking between a 5G network and a 4G network. Refer to FIG. 1a. A communication system includes a terminal, an evolved UMTS terrestrial radio access network (E-UTRAN), a mobility management entity (MME), a serving gateway (S-GW) network element, a user plane function (UPF)+PDN gateway for user plane (PGW-U) network element, a session management function (SMF)+PDN gateway for control plane (PGW-C) network element, a policy control function (PCF) network element, a home subscriber server (HSS)+ unified data management (UDM), an access and mobility management function (AMF) network element, and a 5G radio access network (5G-RAN).

The E-UTRAN is an access network in a long term evolution (LTE) system (for example, the 4G network), and may be, for example, a base station on a 4G network side. The terminal may access the 4G network through the E-UTRAN. The 5G-RAN is a base station on a 5G side, and the terminal may access the 5G network through the 5G-RAN; the 5G-RAN may be a base station further evolved from the E-UTRAN, and the terminal may access the 5G network through the base station; or the 5G-RAN may be a base station specially used by the terminal to access the 5G network.

The MME is a core network device in the 4G network, and is responsible for terminal authentication and authorization, mobility management, and session management. A linked EPS bearer identifier (linked EPS bearer ID, LBI) of a PDN connection of the terminal in the 4G network is allocated by the device.

The S-GW network element is a core network device (core network gateway) in the 4G network, and is responsible for data forwarding, downlink data storage, and the like.

The UPF+PGW-U is a core network device shared by the 4G network and the 5G network, namely, a combined core network device in the 4G network and the 5G network, and includes functions of a UPF and a PGW-U. The UPF is a user plane device in a 5G core network, provides a user plane service for a PDU session of the terminal, and is an interface gateway between an operator network and an external network. The PGW-U is a user plane device in a 4G core network, provides a user plane service for a PDN connection of the terminal, and is an interface gateway between an operator network and an external network. The UPF+PGW-U may also be referred to as a PGW-U+UPF. A device is the same as this device provided that the device includes the functions of the UPF and the PGW-U.

The SMF+PGW-C network element is a core network device shared by the 4G network and the 5G network, namely, a combined core network device in the 4G network and the 5G network, and includes functions of an SMF and a PGW-C. The SMF is a control plane device in the 5G core network, provides a control plane service for the PDU session of the terminal, manages the PDU session in the 5G network, manages QoS of the 5G network, is responsible for assigning an IP address to the terminal, and is responsible for selecting a UPF for the terminal. The PGW-C is a control plane device in the 4G core network, provides a user plane service for the PDN connection of the terminal, assigns an IP address to the terminal, and establishes an EPS bearer for the terminal. The SMF+PGW-C network element may also be referred to as a PGW-C+SMF network element. A device is the same as this device provided that the device includes the functions of the SMF and the PGW-C.

The PCF is a core network device in the 5G network, is a policy network element, and may provide a 5G QoS parameter to the SMF+PGW-C network element, to assist the SMF+PGW-C network element in implementing mapping from the 5G QoS parameter to a 4G QoS parameter.

The UDM+HSS is a core network device shared by the 4G network and the 5G network, namely, a combined core network device in the 4G network and the 5G network, and includes functions of an HSS and a UDM. The HSS is a core network device in the 4G network, and is configured to store user subscription data. The UDM is a core network device in the 5G network, and is configured to store user subscription data. The UDM+HSS may also be referred to as an HSS+UDM. A device is the same as this device provided that the device includes the functions of the HSS and the UDM.

The AMF is a core network device in the 5G network, and is configured to perform an authentication operation and an authorization operation on the terminal, and manage mobility of the terminal.

An N26 interface is an interface between the MME and the AMF. Currently, this interface is optional. When the terminal moves between the 4G network and the 5G network, a context of the terminal may be transferred through the N26 interface. When a PDN connection established by the terminal in the 4G network can be seamlessly transferred to the 5G network, the MME selects, for the terminal, the combined network element SMF+PGW-C in the 5G network and the 4G network. The seamless transfer means that an IP address remains unchanged, and the PGW-C remains unchanged. In addition, a PDU session created by the terminal in the 5G network can also be transferred to the 4G network, so that it is ensured that the IP address of the terminal remains unchanged.

The combined network elements: the HSS+UDM, the PGW-C+SMF network element, and the UPF+PGW-U are used for interworking between the 5G network and the 4G network. This depends on a capability or subscription information of the terminal. If the terminal does not support the interworking, these combined network elements do not need to serve the terminal.

Another UPF may exist between the 5G RAN and the UPF+PGW-U. For example, the UPF is used for uplink classifier (UL CL) traffic distribution or data communication between a relay NG-RAN and the UPF+PGW-U.

To support the interworking between the 5G network and the 4G network, the terminal needs to support a core network capability of the 5G network (for example, a 5G NAS capability) and a core network capability of the 4G network (for example, a 4G NAS capability, which may also be referred to as an EPC NAS capability). In addition, to support the interworking between the 5G network and the 4G network, in a process in which the terminal registers with the 5G network or the 4G network, the terminal needs to indicate, to the network, that the terminal supports both the 5G NAS capability and the 4G NAS capability.

The 5G terminal supports two modes: single registration (single registration, SR) and dual registration (dual registration, DR).

In the SR mode:

the terminal has only one active mobility management (mobility management, MM) state (a registration management (registration management, RM) state in a 5GC or an evolved packet system mobility management (EPS mobility management, EMM) state in an EPC); and the terminal registers with the 5G network or the 4G network; that is, the terminal does not register with both the 5G network and the 4G network; in other words, it is impossible that the terminal registers with both the 5G network and the 4G network.

In the DR mode:

the terminal may register with only the 4G network, may register with only the 5G network, or may register with both the 5G network and the 4G network.

A procedure of the interworking between the 5G network and the 4G network is as follows: The terminal in a connected mode may move between the 5G network and the 4G network through handover or redirection. The terminal in an idle mode may move to the 4G network through a tracking area update (TAU) procedure, and may move to the 5G network through a registration update (registration update) procedure. In comparison with a common TAU procedure for the terminal in the idle mode, a procedure of redirection from the 5G network to the 4G network for the terminal in the connected mode includes an additional step in which a 5G base station indicates the terminal to be redirected to the 4G network. Remaining steps are the same as those in a TAU procedure in the 4G network. In comparison with a common registration update procedure for the terminal in the idle mode, a procedure of redirection from the 5G network to the 4G network for the terminal in the connected mode includes an additional step in which a 4G base station indicates the terminal to be redirected to the 5G network. Remaining steps are the same as those in a registration update procedure in the 5G network.

A relationship between a 5G session context (also referred to as a session management (SM) context) and a 4G session context is as follows:

To better support the interworking between the 5G network and the 4G network, the 4G session context needs to be prepared in advance during PDU session creation and guaranteed bit rate (GBR) quality of service (QoS) flow establishment in the 5G network:

if the PCF network element is deployed, the PGW-C+ SMF network element performs 4G QoS mapping based on the 5G QoS parameter obtained from the PCF network element; in this case, the PGW-C+SMF network element allocates, to a TFT, a PCC rule obtained from the PCF network element;

otherwise, the 4G QoS mapping and the traffic flow template (TFT) allocation are locally performed by the PGW-C+SMF network element, and the PGW+SMF network element ignores a 5G QoS parameter (for example, QoS notification control) that is not suitable for the 4G network.

If the SMF network element determines that an EPS bearer ID needs to be allocated to a QoS flow, the SMF requests the AMF network element to allocate the EPS bearer ID.

On the contrary, to better support the interworking between the 4G network and the 5G network, the 5G session context needs to be prepared in advance during establishment of a PDN connection:

the terminal allocates a PDU session ID and sends the PDU session ID to the PGW-C+SMF by using a protocol configuration option (PCO);

if the PCC is deployed, during the establishment of the PDN connection and establishment of a dedicated bearer, the PGW-C+SMF performs 4G QoS mapping based on a 5G QoS parameter obtained from the PCF network element, and allocates a TFT from the PCF; otherwise, the 4G QoS mapping and the TFT allocation are locally performed by the PGW-C+SMF network element; and other 5G QoS parameters, for example, a session AMBR, a QoS rule, and a QoS flow-level QoS parameter, corresponding to the PDN connection are sent to the terminal by using the PCO if a QoS flow associated with the QoS rule is required, where the 5G QoS parameters are stored in the terminal and used when the terminal is handed over or redirected from the 4G network to the 5G network.

Figure 1B:
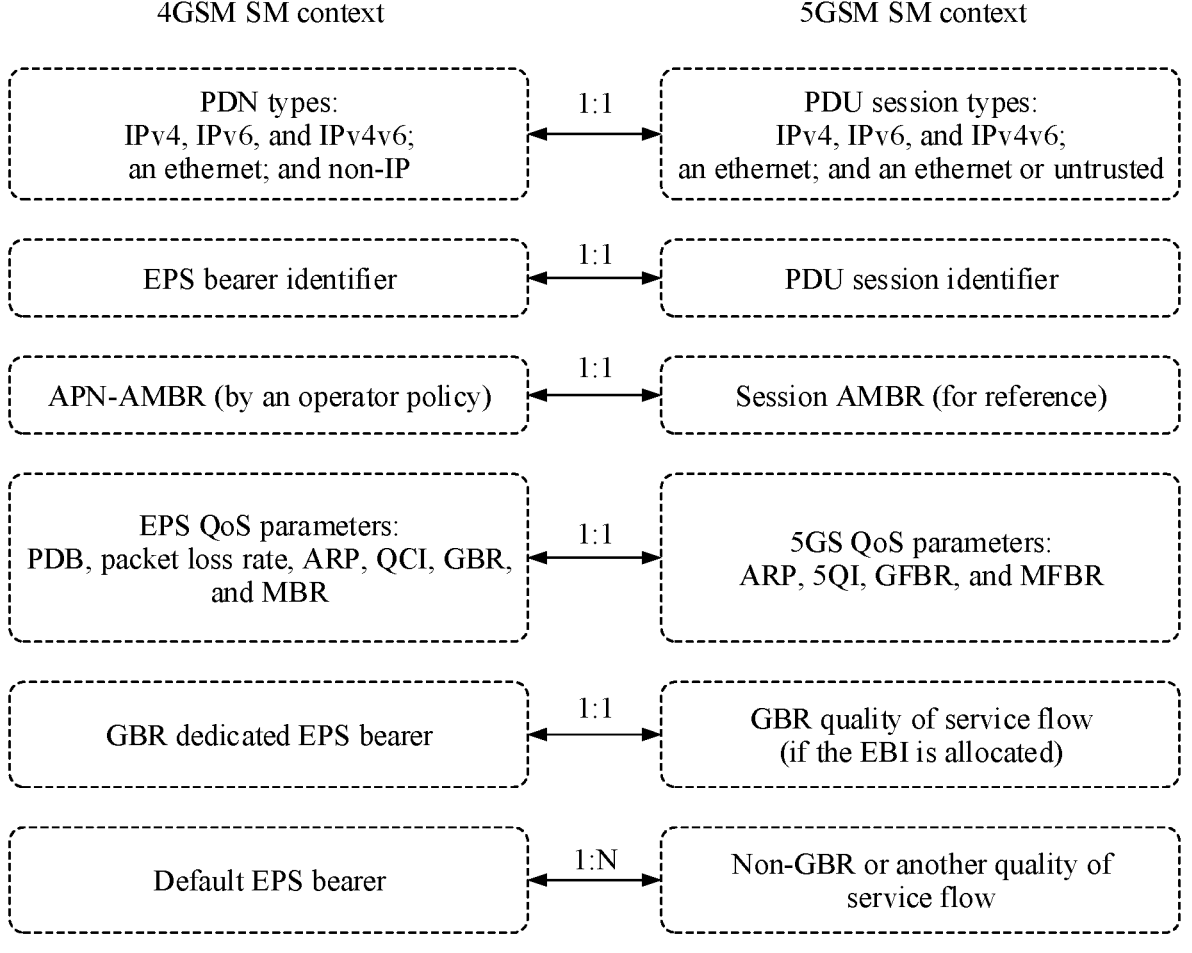
FIG. 1b is a schematic diagram of a mapping relationship between a session management context in a 5G network and a session management context in a 4G network.

Specifically, the 5G SM context and the 4G SM context are shown in FIG. 1b. For example, a PDN connection type may be mapped to a PDU session type in a 1:1 manner. PDN connection types include IPv4, IPv6, and IPv4v6; an ethernet; and non (Non)-IP. PDU session types include IPv4, IPv6, and IPv4v6; an ethernet; and an ethernet or untrusted. There is mapping between an EPS bearer identifier (ID) in the 4G network and a PDU session identifier in the 5G network. There is mapping between an APN-AMBR (aggregate maximum bit rate, aggregate maximum bit rate) (by an operator policy) and a session AMBR (for reference). There is mapping between an EPS QoS parameter (parameters) and a 5GS (5G system, 5G system) QoS parameter. EPS QoS parameters include a packet delay budget (packet delay budget, PDB), a packet loss rate (PLR), an allocation and retention priority (ARP), a quality of service class identifier (QoS class identifier, QCI), a guaranteed bit rate (GBR), and a maximum bit rate (MBR). 5GS QoS parameters include an ARP, a 5G QoS class identifier (5QI), a guaranteed flow bit rate (GFBR), and a maximum flow bit rate (MFBR). There is mapping between a GBR dedicated EPS bearer in the 4G network and a GBR QoS flow in the 5G network. There is mapping between a default EPS bearer in the 4G network and a non-GBR or another QoS flow in the 5G network.

Figure 1C:
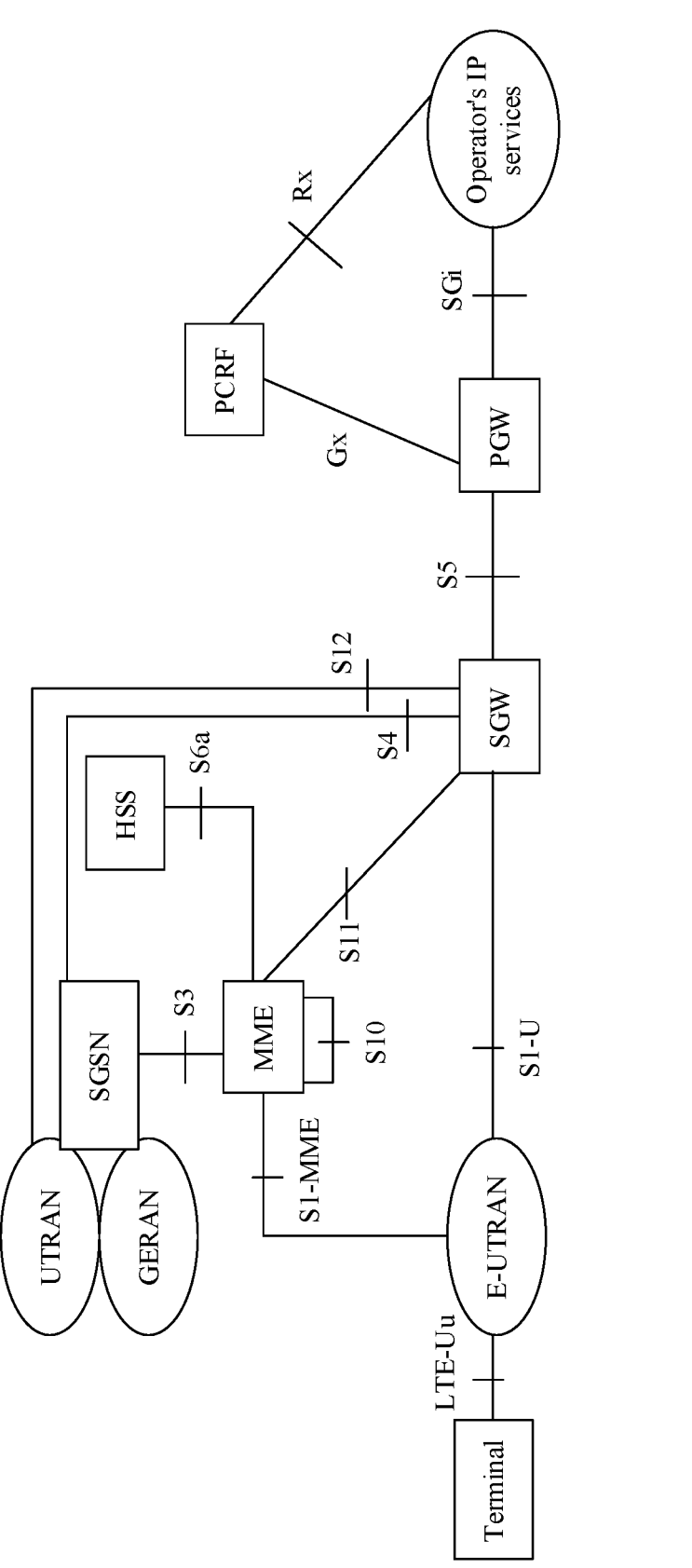
FIG. 1c is a system architecture for interworking between a 2G/3G network and a 4G network according to an embodiment of this application.

FIG. 1c is a diagram of an architecture for interworking between a 4G network and a 2G/3G network. A communication system includes: a terminal, a UTRAN, a global system for mobile communications (GSM)/EDGE radio access network (GSM/EDGE radio access network, GERAN), an E-UTRAN, an S-GW, a PDN gateway (PGW) for user plane network element, a policy and charging rules function (PCRF) network element, an MME, a core network entity serving GPRS support node (serving GPRS support node, SGSN) in the 3G network, an HSS, and operator's IP services (for example, an IP multimedia subsystem (IMS) and a packet-switched streaming media service (PSS)).

The UTRAN is an access network in the 3G network (for example, may be a 3G base station), and the GERAN may be an access network in the 2G network (for example, a 2G base station). The terminal may access the 3G network through the UTRAN and access the 2G network through the GERAN.

In the 4G network, a communication interface S3 exists between the MME and the SGSN, and the MME and the SGSN are usually deployed at a same location. An S6a interface exists between the MME and the HSS. An S10 interface exists between MMEs, and an S11 interface exists between the MME and the S-GW. An S4 interface exists between the S-GW and the SGSN, and an S12 interface exists between the S-GW and the UTRAN. An S1-U interface exists between the E-UTRAN and the S-GW. An S1-MME interface exists between the E-UTRAN and the MME. An S5 interface exists between the S-GW and the PGW. A Gx interface exists between the PGW and the PCRF. An SGi interface between the PGW and the operator's IP services. An Rx interface exists between the operator's IP services and the PCRF.

Similarly, to support the interworking between the 4G network and the 2G/3G network, the terminal needs to support both a core network capability of the 4G network (for example, a 4G NAS capability) and a core network capability of the 2G/3G network (for example, a 2G/3G NAS capability). In a process in which the terminal registers with the 4G network or the 2G/3G network, the terminal needs to indicate a network side that the terminal supports NASs of both the 4G network and the 2G/3G network.

A procedure of the interworking between the 4G network and the 2G/3G network is as follows: The terminal in a connected mode may move between the 4G network and the 2G/3G network through handover or redirection. The terminal in an idle mode may move from the 4G network to the 2G/3G network through a tracking area update (routing area update, RAU) procedure, and may move from the 2G/3G network to the 4G network through a TAU procedure. In comparison with a common RAU procedure for the terminal in the idle mode, a procedure of redirection from the 4G network to the 2G/3G network for the terminal in the connected mode includes an additional step in which a 4G base station indicates the terminal to be redirected to the 2G/3G network. Remaining steps are the same as those in an RAU procedure in the 2G/3G network. In comparison with a common TAU procedure for the terminal in the idle mode, a procedure of redirection from the 2G/3G network to the 4G network for the terminal in the connected mode includes an additional step in which a 2G/3G network base station indicates the terminal to be redirected to the 4G network. Remaining steps are the same as those in a TAU procedure in the 4G network.

A relationship between a 4G session context and a session context of the terminal in the 2G/3G network is as follows:

To better ensure service continuity, during establishment of a PDN connection (default bearer) and dedicated bearers (including GBR and non-GBR bearers) in the 4G network, if the MME discovers that the terminal supports both the 2G/3G core network (core) NAS capability and movement from the 4G network to the 2G/3G network is supported, the MME generates a packet data protocol (packet data protocol, PDP) context based on an EPS bearer context, and then sends the PDP context to the terminal. After the terminal moves from the 4G network to the 2G/3G network, the terminal may directly activate the PDP context.

On the contrary, during establishment of a PDP connection in the 2G/3G network, if the SGSN determines that the terminal further supports the 4G NAS capability and movement from the 2G/3G network to the 4G network is supported, the SGSN generates an EPS bearer context based on a PDP Context, and then sends the EPS bearer context to the terminal. After the terminal moves from the 2G/3G network to the 4G network, the terminal can directly activate the EPS bearer context.

Figure 1D:
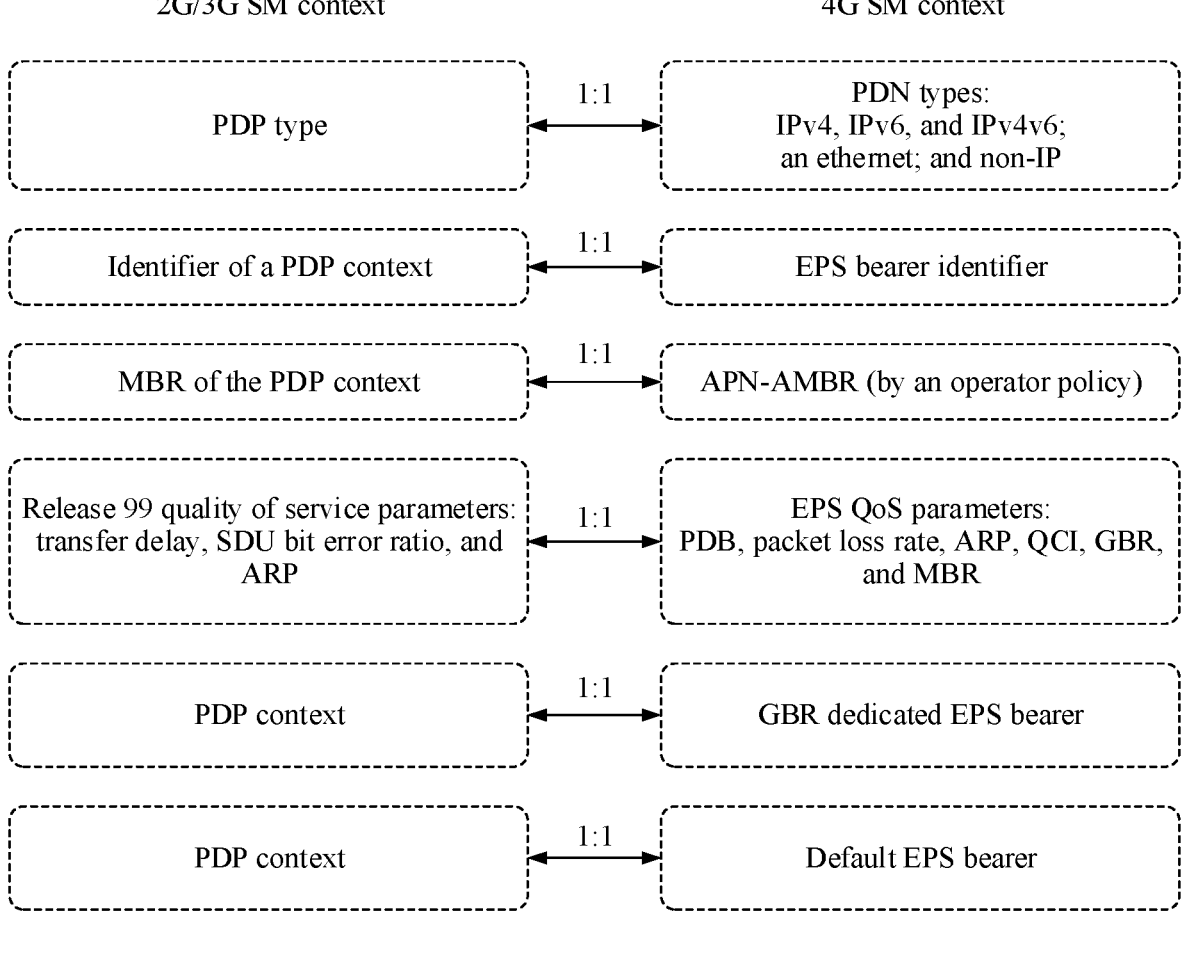
FIG. 1d is a schematic diagram of a mapping relationship between a session management context in a 4G network and a session management context in a 2G/3G network.

The SM context in the 4G network and the SM context in the 2G/3G network are shown in FIG. 1d.

There is mapping between a PDP type in the 2G/3G network and a PDN type; there is mapping between an identifier of the PDP context (ID of PDP Context) and an EPS bearer identifier (EPS bearer ID); there is mapping between an MBR of the PDP context and an APN-AMBR; there is mapping between a Release 99 QoS parameter (for example, a transfer delay, an SDU error ratio, or an ARP) and an EPS QoS parameter; there is mapping between the PDP context and the GBR dedicated EPS bearer; and there is mapping between the PDP context and the default EPS bearer.

Figure 2:
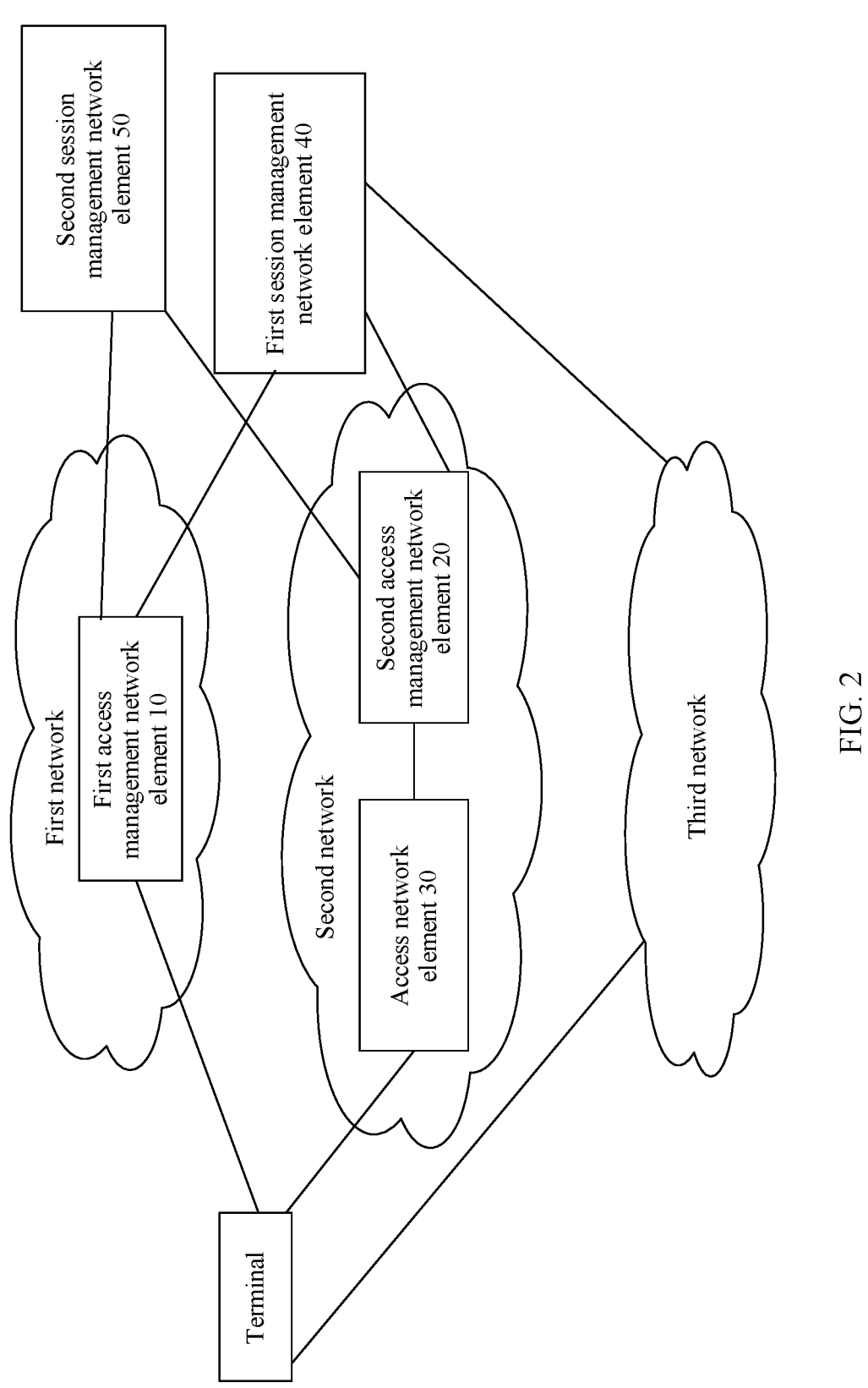
FIG. 2 is a schematic diagram of an architecture of a communication system according to an embodiment of this application.

FIG. 2 shows a communication system according to an embodiment of this application. The communication system includes a first access management network element 10, a second access management network element 20, an access network element 30, and a first session management network element 40.

The first access management network element 10 belongs to a first network. The second access management network element 20 and the access network element 30 belong to a second network. The first session management network element 40 is a network element shared by the first network, the second network, and a third network, and can implement interworking (Interworking) of a terminal among the first network, the second network, and the third network.

In other words, the first session management network element 40 may implement interworking of the terminal between the first network and the second network and interworking of the terminal between the second network and the third network.

In a possible implementation, the communication system may further include a second session management network element 50. In embodiments of this application, the first network may be a 2G network or a 3G network, the second network may be a 4G network, and the third network may be a 5G network.

Figure 3:
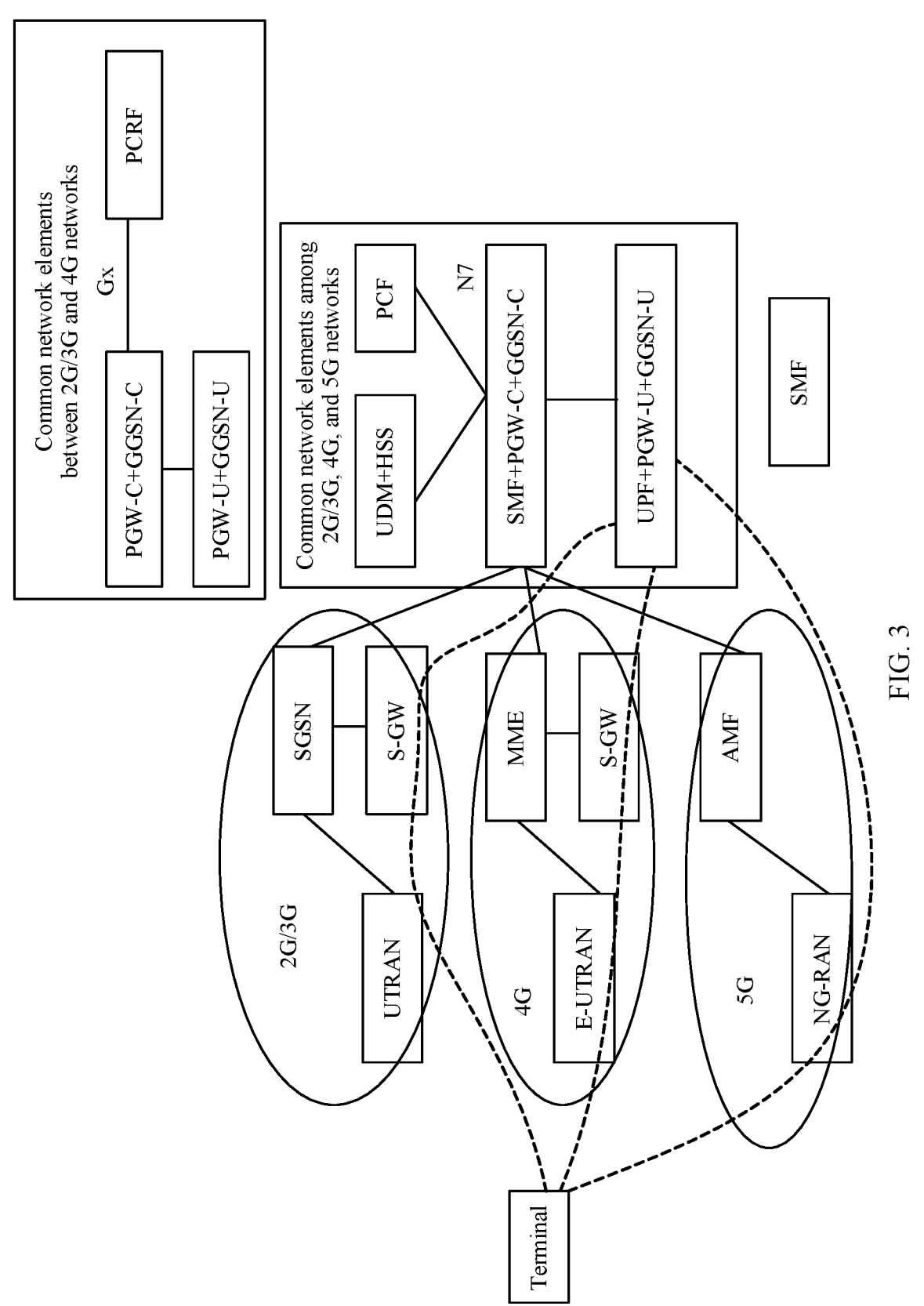
FIG. 3 is a diagram of an architecture of a system in which a first network, a second network, and a third network coexist according to an embodiment of this application.

A system architecture of a communication system to which embodiments of this application are applied is shown in FIG. 3. The system architecture includes a first network, a second network, and a third network. In FIG. 3, an example in which the first network is a 2G/3G network, the second network is a 4G network, and the third network is a 5G network is used for description. The first access management network element 10 corresponds to an SGSN in FIG. 3, the second access management network element 20 corresponds to an MME in FIG. 3, the first session management network element 40 corresponds to an SMF+PGW-C+GGSN-C network element in FIG. 3, and the second session management network element 40 corresponds to a PGW-C+GGSN-C network element in FIG. 3. In addition, the system shown in FIG. 3 may further include a UTRAN in the 2G/3G network, an E-UTRAN in the 4G network, an NG-RAN in the 5G network, a user plane network element UPF+PGW-U+GGSN-U, a UDM+HSS, and a PCF network element that are shared by the 2G/3G network, the 4G network, and the 5G network, a user plane network element PGW-U+GGSN-U, and control plane network elements: a PGW-C+GGSN-C network element and a PCRF network element that are shared by the 2G/3G network and the 4G network. In embodiments of this application, the first session management network element 40 may alternatively be replaced with a control plane network element shared by the 2G/3G network, the 4G network, and the 5G network.

It should be noted that "-C" in embodiments of this application represents only a control plane function of a corresponding network element, and does not represent a user plane function. However, in a 2/3G era and an early stage of a 4G era, both the control plane function and the user plane function are inside a same network element, for example, both a GGSN-C and a GGSN-U are functions of a GGSN network element, and both a PGW-C and a PGW-U are functions of a PGW network element.

The terminal may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, in this application, the devices mentioned above are collectively referred to as terminals.

It should be understood that the terminal in embodiments of this application may be a terminal device in an internet of things or a terminal in a plurality of vertical industry application fields such as a port, an intelligent factory, railway transportation, logistics, an unmanned aerial vehicle, and a driverless car, for example, a mobile robot, an automated guided vehicle (AGV), a driverless car, a control device and a sensor on a train, or a control device and a sensor deployed in a factory.

For example, in embodiments of this application, the terminal may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that is directly worn or integrated into clothes or an accessory of a user. The wearable device is not merely a hardware device, but is configured to implement a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs. The terminal may alternatively be a sensor device used in a factory.

An access device is configured to provide a network access function for an authorized terminal in a specific area, and can use transmission tunnels having different quality based on a terminal level, a service requirement, and the like. The access device can manage a radio resource and provide an access service for the terminal device, to forward a control signal and terminal device data between a terminal device and a core network. The access device may also be understood as a base station in a conventional network. For example, the access device may be responsible for functions such as radio resource management, quality of service (QoS) management, and data compression and encryption on an air interface side.

The access network element may be a device in a radio network. The access network element may also be referred to as a wireless access device or a network device. For example, the terminal is connected to a radio access network (RAN) node in a radio network. Currently, examples of some access network elements are: a next generation NodeB (gNB) and a transmission reception point (TRP) in a 5th generation (5G) system, and an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP) in an LTE system. In a network structure, the access network element may include a centralized unit (CU) node, a distributed unit (DU) node, or a RAN device including a CU node and a DU node. The access network element may alternatively be a wireless backhaul device, a vehicle-mounted device, a wearable device, a network device in a future 5G network, a network device in a future evolved PLMN, or the like. In a 3rd generation (3G) system, the access network element is referred to as a NodeB or the like.

Figures 4A, 4B, 4C, 4D, 5:
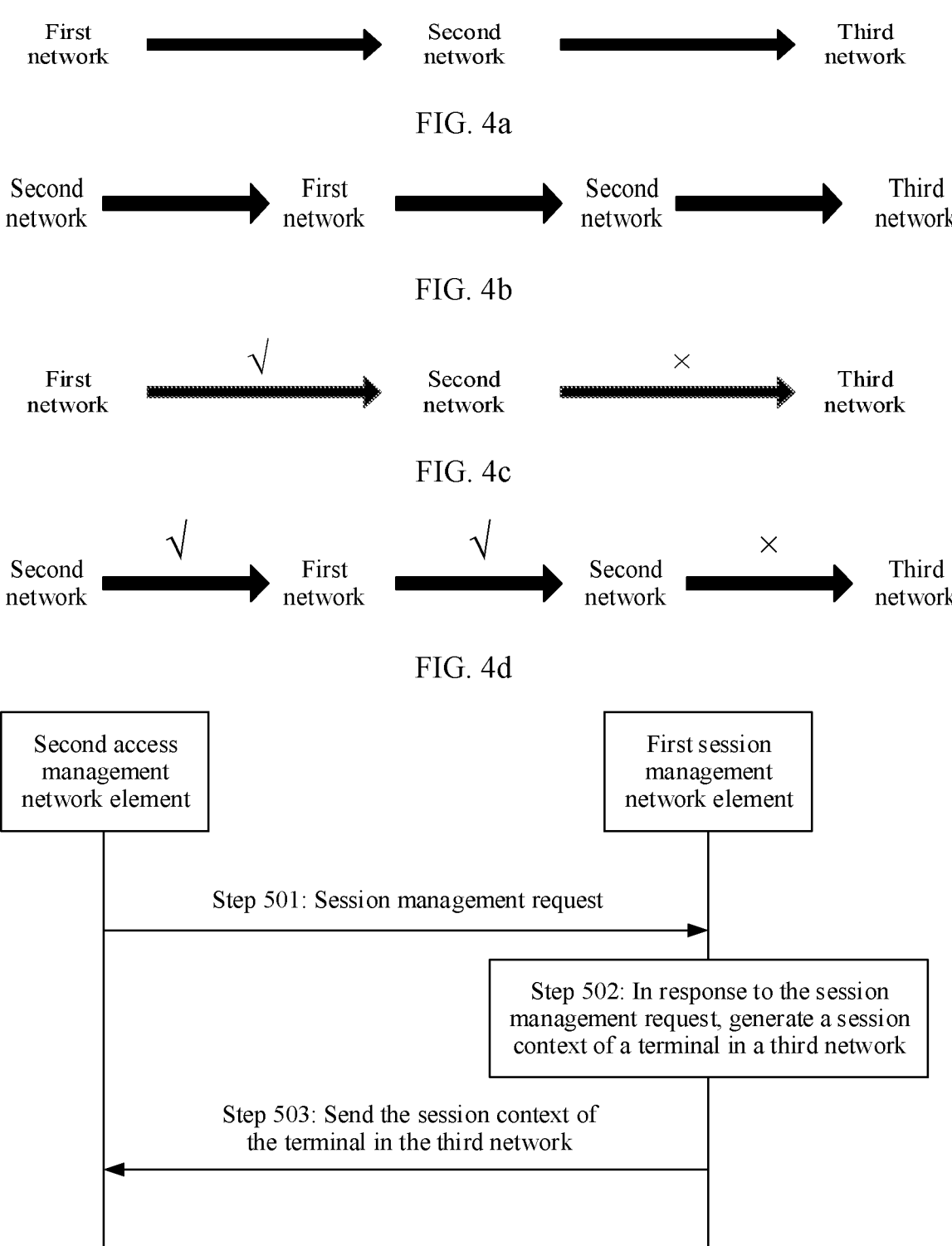
FIG. 4a is a first schematic diagram of a scenario 1 according to an embodiment of this application.
FIG. 4b is a first schematic diagram of a scenario 2 according to an embodiment of this application.
FIG. 4c is a second schematic diagram of a scenario 1 according to an embodiment of this application.
FIG. 4d is a second schematic diagram of a scenario 2 according to an embodiment of this application.
FIG. 5 is a first schematic flowchart of inter-network interworking according to an embodiment of this application.

An inter-network interworking method provided in embodiments of this application is applicable to the following scenarios:

Scenario 1: As shown in FIG. 4a, a terminal initially accesses a first network, and then the terminal moves a second network and then moves to a third network.

Scenario 2: As shown in FIG. 4b, a terminal initially accesses a second network and moves to a first network, then returns to the second network, and finally moves to a third network.

For the scenario 1, as shown in FIG. 4c, when the terminal moves from the second network to the third network again, the terminal may fail to access the third network due to the following reason 1 or reason 2.

Reason 1: When accessing the first network, the terminal may not report, to a first access management network element, that the terminal supports a NAS capability of the third network. In this case, a gateway selected by the first access management network element for the terminal in the first network does not support interworking of the terminal among the first network, the second network, and the third network. In embodiments of this application, a network element or node that supports the interworking of the terminal between the first network, the second network, and the third network may be referred to as a combined network element or a combined node. The following uses an example in which the combined network element or the combined node is a first session management network element. The first session management network element may correspond to a GGSN-C+PGW-C+SMF.

Reason 2: When the terminal accesses the first network, the terminal and the first network have only a local network parameter (for example, a 2G session parameter/3G session parameter, refer to FIG. 1d), and neither a parameter (namely, a 4G parameter, refer to FIG. 1b or 1d) of the terminal in the second network nor a parameter (namely, a 5G parameter, refer to FIG. 1b) of the terminal in the third network is allocated. Therefore, after the terminal moves from the first network to the second network, the terminal and the first access management network element may locally map the 2G session parameter/3G session parameter to the 4G parameter. In this case, a 5G parameter corresponding to an EPS session is neither allocated nor synchronized for the terminal and the first network. If the terminal continues to move from the second network to the third network, because neither the terminal nor the first network has a corresponding 5G parameter, session migration fails. Therefore, the terminal cannot move from the second network to the third network again in the scenario 1.

For the scenario 2, as shown in FIG. 4*d*, the terminal initially accesses or registers with the second network, a second access management network element in the second network selects a first session management network element for the terminal, and then the first session management network element stores a 4G session context of the terminal in the second network and a 5G session context corresponding to the 4G session context.

However, subsequently, the terminal moves from the second network to the first network, and the terminal modifies or creates, in the first network, a session context (namely, a PDP context) of the terminal in the first network. In this case, when the terminal returns from the first network to the second network again, a corresponding new 4G session context of the terminal in the second network is generated, and the originally mapped 5G session context is discarded. In this way, a session of the terminal cannot move from the second network to the third network. Therefore, the terminal cannot move from the second network to the third network again in the scenario 2.

However, a combined network element (for example, a 5G session management function (Session Management Function, SMF)+4G PDN gateway for control plane (PDN Gateway for Control plane, PGW-C)) is introduced to the 5G network. The SMF+PGW-C can implement conversion between the 4G session context and the 5G session context. However, not all PGW network elements will be upgraded to support a function of an SMF. Generally, during initial access of the terminal, an access management network element in an initially accessed network may select, for the terminal, a combined network element that has a capability of generating the session context of the terminal in the 5G network. However, during the initial access of the terminal, the combined network element selected by the initially accessed network for the terminal does not have the capability of generating the session context of the terminal in the 5G network.

In embodiments of this application, a specific structure of an execution body of the inter-network interworking method is not particularly limited in embodiments of this application, provided that communication can be performed according to the inter-network interworking method in embodiments of this application by running a program that records code of the inter-network interworking method in embodiments of this application. For example, the inter-network interworking method provided in embodiments of this application may be performed by a functional module that is in a first session management network element and that can invoke and execute the program, or may be a communication apparatus, for example, a chip, used in the first session management network element. The inter-network interworking method provided in embodiments of this application may be performed by a functional module that is in a second access management network element and that can invoke and execute the program, or may be a communication apparatus, for example, a chip, used in the second access management network element. This is not limited in this application. The following embodiments are described by using an example in which the inter-network interworking method is performed by the first session management network element and the second access management network element.

It should be noted that mutual reference may be made between embodiments of this application. For example, for same or similar steps, mutual reference may be made between method embodiments, apparatus embodiments, or system embodiments. This is not limited.

In embodiments of this application, that a terminal moves to (Move to) a second network from a first network or the terminal moves to a third network from the second network means that the network of the terminal is switched. However, a location of the terminal may remain unchanged. Certainly, the location of the terminal may also change. This is not limited in embodiments of this application.

Based on the foregoing problem, FIG. 5 shows an inter-network interworking method according to an embodiment of this application. The method includes the following steps.

Step 501: A second access management network element in a second network sends a session management request to a first session management network element when a terminal supports a non-access stratum (NAS) capability of a third network and/or a network name corresponding to the terminal supports interworking between the second network and the third network, so that the first session management network element receives the session management request from the second access management network element, where the first session management network element supports interworking of the terminal among a first network, the second network, and the third network, and a session identifier is used to identify a session of the terminal in the third network.

The session management request is used to request a session context of the terminal in the third network.

The non-access stratum NAS capability of the terminal in the third network may correspond to a 5G NAS capability.

In this embodiment of this application, the network name corresponding to the terminal may be an APN in the first network or the second network, and may be a DNN in the third network.

For example, the session context of the terminal in the third network may include a first session context and/or a second session context. The first session context is a session context of a session of the terminal in the third network, and the second session context is a session context that is of the terminal in the third network and that corresponds to a modified session context/an updated session context of the terminal in the first network.

In a possible implementation, when the session management request is used to request the first session context of the terminal in the third network, the session management request includes the session identifier of the terminal. The session identifier is used to identify the session of the terminal in the third network, and the session context is a context of the session corresponding to the session identifier. The session identifier comes from the terminal. When the session management network element is configured to request the second session context of the terminal in the third network, the session management request may not include the session identifier.

It may be understood that the second access management network element may send the session identifier of the terminal to the first session management network element in a session management process. A message carrying the session identifier of the terminal may alternatively be a message other than the session management request. This is not limited in this embodiment of this application. After receiving the session identifier, the first session management network element may bind the session identifier to the first session context subsequently generated by the first session management network element, that is, the session identifier may identify the first session context, to facilitate subsequently updating of the session associated with the first session context, including but not limited to modification and releasing of the session.

Certainly, the session identifier of the terminal may alternatively be sent by the second access management network element to the first session management network element in another procedure. This is not limited in this embodiment of this application.

The session management process in this embodiment of this application is used to manage a session of the terminal in the second network. For example, the session management process may be a session create process or a session modification process. Using the session create process as an example, the session management request may be a create session request (Create Session Request). Using the session modification process as an example, the session management request may be a modify bearer request.

For example, the session management request may further carry an identifier (for example, an IMSI) of the terminal, a RAT type (the second network), and a session context (for example, an EPS bearer context (an EPS bearer ID and a 4G QoS parameter)) of the terminal in the second network.

For example, the identifier of the terminal may be one or more of the following: an internet protocol (IP) address, a subscription permanent identifier (SUPI), a permanent equipment identifier (PEI), a generic public subscription identifier (GPSI), an international mobile subscriber identity (IMSI), an international mobile equipment identity (IMEI), an IP address, and a mobile subscriber integrated service digital network number (MSISDN). For an identifier of a terminal in the following embodiments, refer to the descriptions herein. Details are not described subsequently again.

In an optional implementation, the session management request further includes second indication information indicating that a network accessed by the terminal is switched from the first network to the second network.

Step 502: The access network of the terminal is switched from the first network to the second network, and the first session management network element generates the session context of the terminal in the third network in response to the session management request.

In a possible implementation, in this embodiment of this application, when the access network of the terminal is switched from the first network to the second network, the first session management network element obtains the first session context (a type of a first session, a QFI, and a QoS parameter of the third network) through mapping by using the session context of the terminal in the second network. For a process in which the first session management network element obtains the first session context through mapping by using the session context of the terminal in the second network, refer to the specific descriptions in FIG. 1b. Details are not described herein again. In this case, the session context of the terminal in the second network corresponds to the 4G SM context in FIG. 1b. The first session context corresponds to the 5G SM context.

The QoS parameter of the third network in the first session context may be mapped by using a QoS parameter of the second network, or may be obtained through querying by the first session management network element from the PCF network element based on the identifier of the terminal. This is not limited in this embodiment of this application.

Step 503: The first session management network element sends the session context of the terminal in the third network to the second access management network element, so that the second access management network element receives the session context of the terminal in the third network from the first session management network element.

For example, the first session management network element may send the session context of the terminal in the third network to the second access management network element in the session management process. For example, the session context of the terminal in the third network may be carried in a session management response. For example, the session management response may be a create session response or a modify session response.

If the session context of the terminal in the third network includes the second session context, that the first session management network element sends the second session context of the terminal to the second access management network element in this embodiment of this application is applicable to the scenario 2. To be specific, the terminal first accesses or registers with the second network, and then moves to the first network. If an existing session context of the terminal in the first network is updated in the first network, after the first session management network element determines that the terminal is to move from the first network to the second network, the first session management network element updates an existing session context of the terminal in the third network as the second session context. The existing session context of the terminal in the third network corresponds to an updated session context of the terminal in the first network.

It may be understood that, in the scenario 2, the terminal first accesses or registers with the second network, and then the terminal moves to the first network. If a session context of the terminal in the first network is created in the first network, after the first session management network element determines that the terminal is to move from the first network to the second network, the first session management network element generates a session context that is of the terminal in the third network and that corresponds to the created session context of the terminal in the first network, as the first session context. For the first session context, in a process in which the terminal moves from the first network to the second network, the terminal needs to allocate a session identifier, to correspond to the first session context.

It may be understood that, in the scenario 2, when the terminal initially registers with the second network, the first session management network element has generated, for the terminal, a session context 1 of the terminal in the second network and a session context that is of the terminal in the third network and that corresponds to the session context 1. After the terminal moves from the second network to the first network, a first access management network element (for example, an SGSN) maps the session context 1 as a session context of the terminal in the first network. Then, if the session context of the terminal in the first network is updated, a session context 2 corresponding to an updated context also needs to be updated. Therefore, the session context that is of the terminal in the third network and that corresponds to the session context 1 also needs to be updated. If the terminal creates a session context 2 in the first network, in the process in which the terminal moves from the first network to the second network, the first session management network element may generate a session context 3 that is of the terminal in the second network and that corresponds to the session context 2. Therefore, to facilitate movement of the terminal from the second network to the third network subsequently, a session context of the terminal in the third network needs to be obtained through mapping based on the session context 3.

It may be understood that, in the scenario 2, when the terminal initially registers with the second network, the first session management network element has generated, for the terminal, a session context 1 of the terminal in the second network and a session context that is of the terminal in the third network and that corresponds to the session context 1. After the terminal moves from the second network to the first network, the first access management network element (for example, the SGSN) maps the session context 1 as a session context of the terminal in the first network. Then, if the session context of the terminal in the first network is updated or modified, a session context 2 corresponding to an updated session context also needs to be updated. Therefore, the session context that is of the terminal in the third network and that corresponds to the session context 1 also needs to be updated. If the terminal creates a session context 2 in the first network, in the process in which the terminal moves from the first network to the second network, the first session management network element may generate a session context 3 that is of the terminal in the second network and that corresponds to the session context 2. Therefore, to facilitate movement of the terminal from the second network to the third network subsequently, a session context of the terminal in the third network needs to be obtained through mapping based on the session context 3.

This embodiment of this application provides the inter-network interworking method. In the method, when the terminal supports the non-access stratum NAS capability of the third network and/or the network name corresponding to the terminal supports the interworking between the second network and the third network, the second access management network element in the second network sends, to the first session management network element, the session management request used to request the session context of the terminal in the third network. In this way, when determining that the terminal is to move from the first network to the second network, the first session management network element that supports the interworking of the terminal among the first network, the second network, and the third network feeds back, to the second access management network element, the session context that is of the terminal and that can be applied to the third network, so that when the terminal moves the second network, the second network can prepare the session context of the terminal in the third network, to ensure the terminal to move from the second network to the third network in the future.

It should be noted that, if the terminal modifies a session of the terminal in the first network after the terminal moves from the second network to the first network, the session management request sent by the second access management network element to the first session management network element in step 501 may not carry the session identifier.

In a possible embodiment, before step 501, the method provided in this embodiment of this application may further include: The second access management network element determines the first session management network element.

Because manners of determining address information of the first session management network element by the second access management network element vary with different cases in embodiments of this application, the following separately describes the manners.

Example (1): This example is applied to the scenario 1. The first access management network element selects, for the terminal, a session management network element that supports the interworking of the terminal among the first network, the second network, and the third network.

Figure 6:
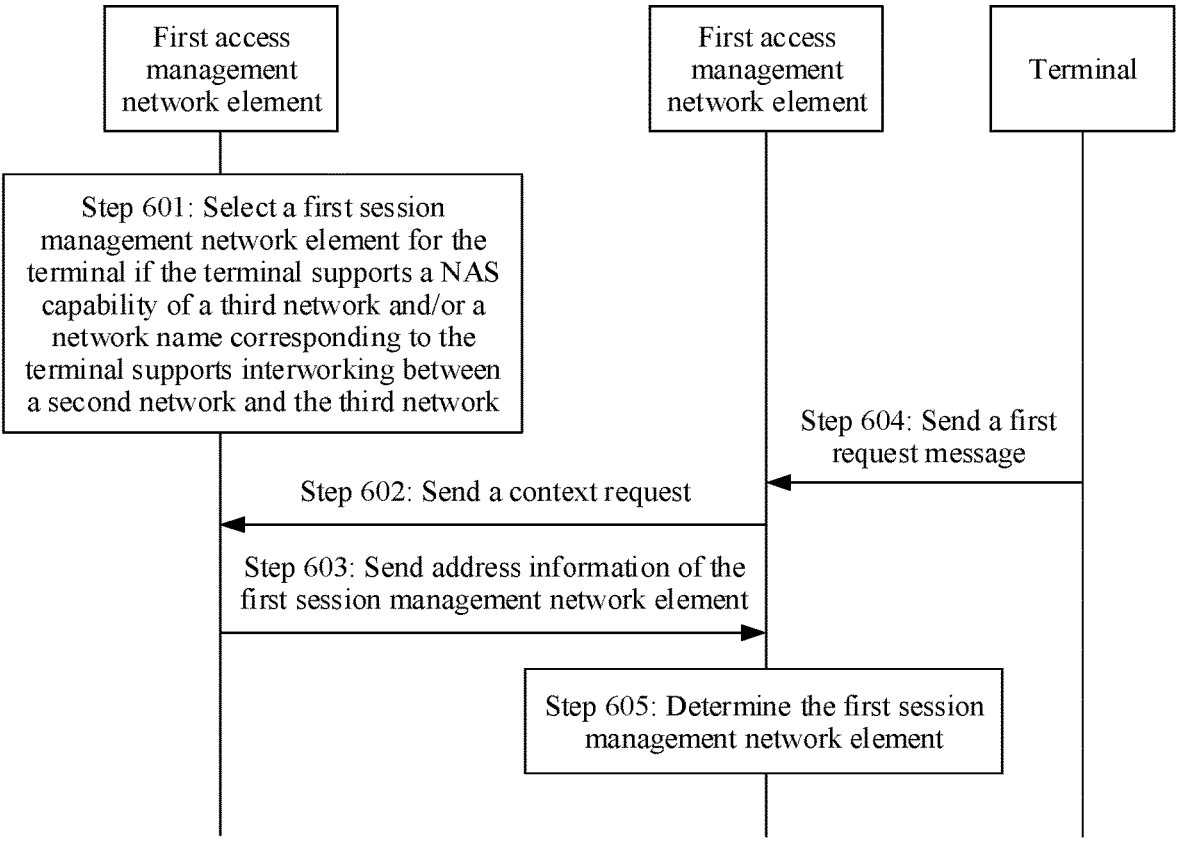
FIG. 6 is a second schematic flowchart of inter-network interworking according to an embodiment of this application.

As shown in FIG. 6, in a possible embodiment, before step 501, the method provided in this embodiment of this application may further include the following steps.

Step 601: The first access management network element in the first network determines that the terminal supports the non-access stratum NAS capability of the third network and/or the network name corresponding to the terminal supports the interworking between the second network and the third network, and the first access management network element selects the first session management network element for the terminal.

For example, the first access management network element selects a combined network element as a second session management network element by using a domain name server (DNS).

Step 602: The second access management network element sends a context request to the first access management network element, so that the first access management network element receives the context request. The context request is used to request the session context of the terminal in the second network.

For example, the session context of the terminal in the second network may be generated by the first access management network element by using the session context of the terminal in the first network.

It may be understood that in a process in which the second access management network element determines that the terminal requests to be handed over or redirected from the first network to the second network, the second access management network element sends the context request to the first access management network element.

The process in which the second access management network element determines that the terminal requests to be handed over or redirected from the first network to the second network may be implemented by using step 604, that is, before step 602, the method may further include:

Step 604: The terminal sends a first request message to the second access management network element, where the first request message includes the session identifier. For example, the first request message may be a TAU request. In addition to the session identifier, the first request message may further carry the identifier of the terminal. The first request message is used to enable the terminal to move from the first network to the second network.

Step 603: In the process in which the terminal moves from the first network to the second network, the first access management network element sends the address information of the first session management network element to the second access management network element in the second network, so that the second access management network element receives the address information of the first session management network element.

For example, the address information of the first session management network element is used to enable the terminal to move from the second network to the third network.

In a possible implementation, address information of the second session management network element is carried in a context response sent by the first access management network element to the second access management network element in the second network.

It should be noted that if the first access management network element determines to proactively send the address information of the second session management network element to the second access management network element in the second network, step 602 may be omitted.

Step 605: The second access management network element determines the first session management network element based on the address information of the first session management network element.

Figure 7:
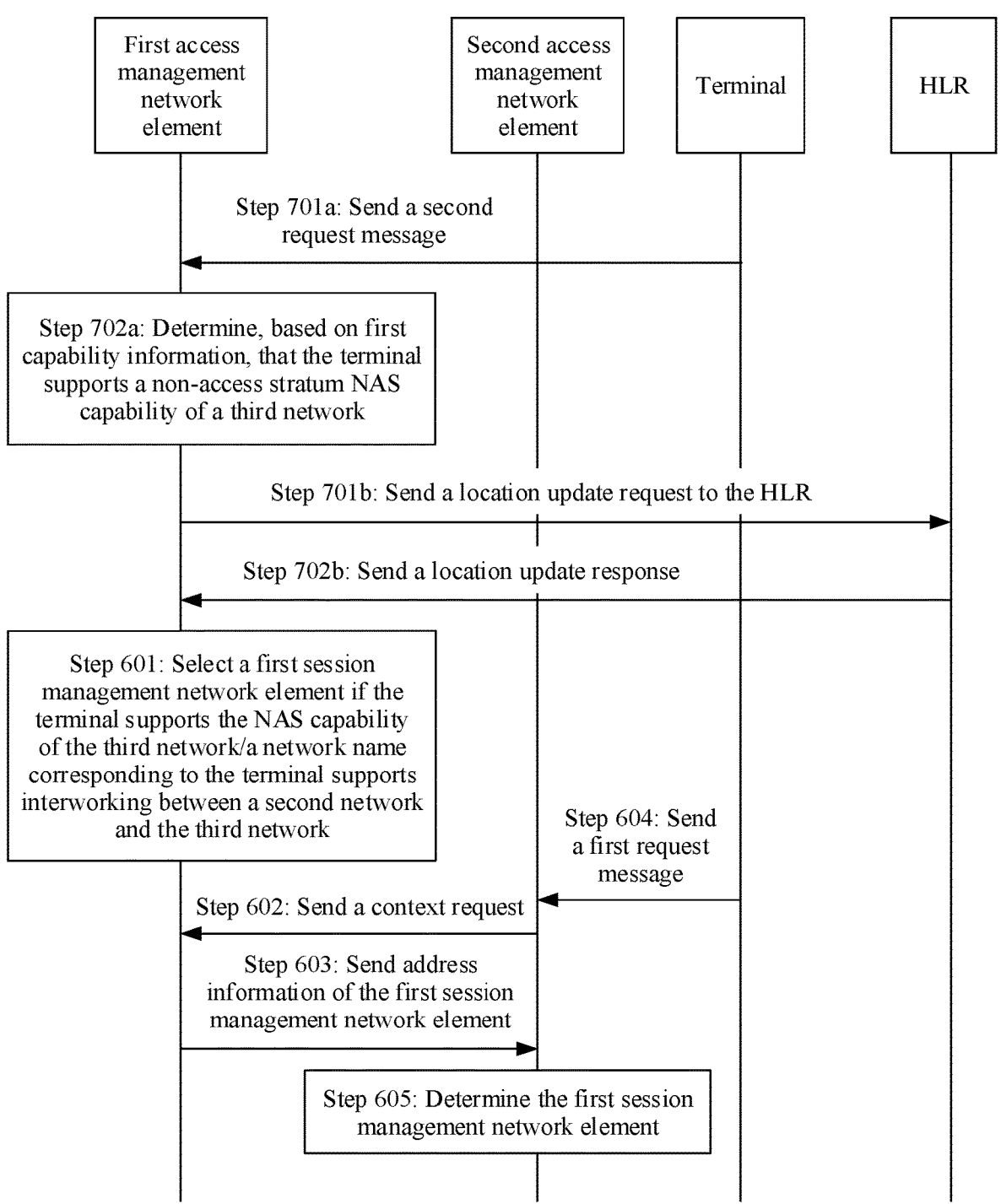
FIG. 7 is a third schematic flowchart of inter-network interworking according to an embodiment of this application.

In this embodiment of this application, a process in which the first access management network element determines that the terminal supports the NAS capability of the third network and/or the network name corresponding to the terminal supports the interworking between the second network and the third network may be implemented by using a solution shown in FIG. 7.

Step 701*a*: The terminal sends a second request message to the first access management network element, so that the first access management network element receives the second request message. The second request message includes first capability information.

The second request message is used to request to register with the first network.

For example, if the terminal supports the non-access stratum NAS capability of the third network, the terminal may send the first capability information to the first access management network element in a process in which the terminal accesses the first network. Therefore, the second request message may be an attach request message (attach request). The second request message may further carry the identifier of the terminal and an EPC NAS capability.

It may be understood that the terminal may send the second request message to the first access management network element through a base station in the first network.

Step 702*a*: The first access management network element determines, based on the first capability information, that the terminal supports the NAS capability of the third network.

Alternatively, step 701*a* and step 702*a* may be replaced with the following step 701*b* and step 702*b*.

Step 701*b*: The first access management network element sends a location update request to an HLR, so that the HLR receives the location update request, where the location update request carries the identifier of the terminal.

Step 702*b*: The HLR sends a location update response to the first access management network element, so that the first access management network element receives the location update response.

The location update response carries subscription information of the terminal. The subscription information includes first indication information, and the first indication information indicates that the network name corresponding to the terminal supports the interworking between the second network and the third network.

In addition, the subscription information may further include QoS information of a 2G/3G network to which the terminal subscribes.

It may be understood that, the identifier of the terminal and a capability that is of an APN of the terminal and that supports the interworking with the third network is configured in the subscription information in the HLR. Therefore, after receiving the location update request from the first access management network element, the HLR may send the first indication information to the first access management network element. Optionally, the first access management network element may select the first session management network element for the terminal based on the first indication information.

Example (2): This example is applied to the scenario 1. The second access management network element selects, for the terminal, a session management network element that supports the interworking of the terminal among the first network, the second network, and the third network.

Figure 8:
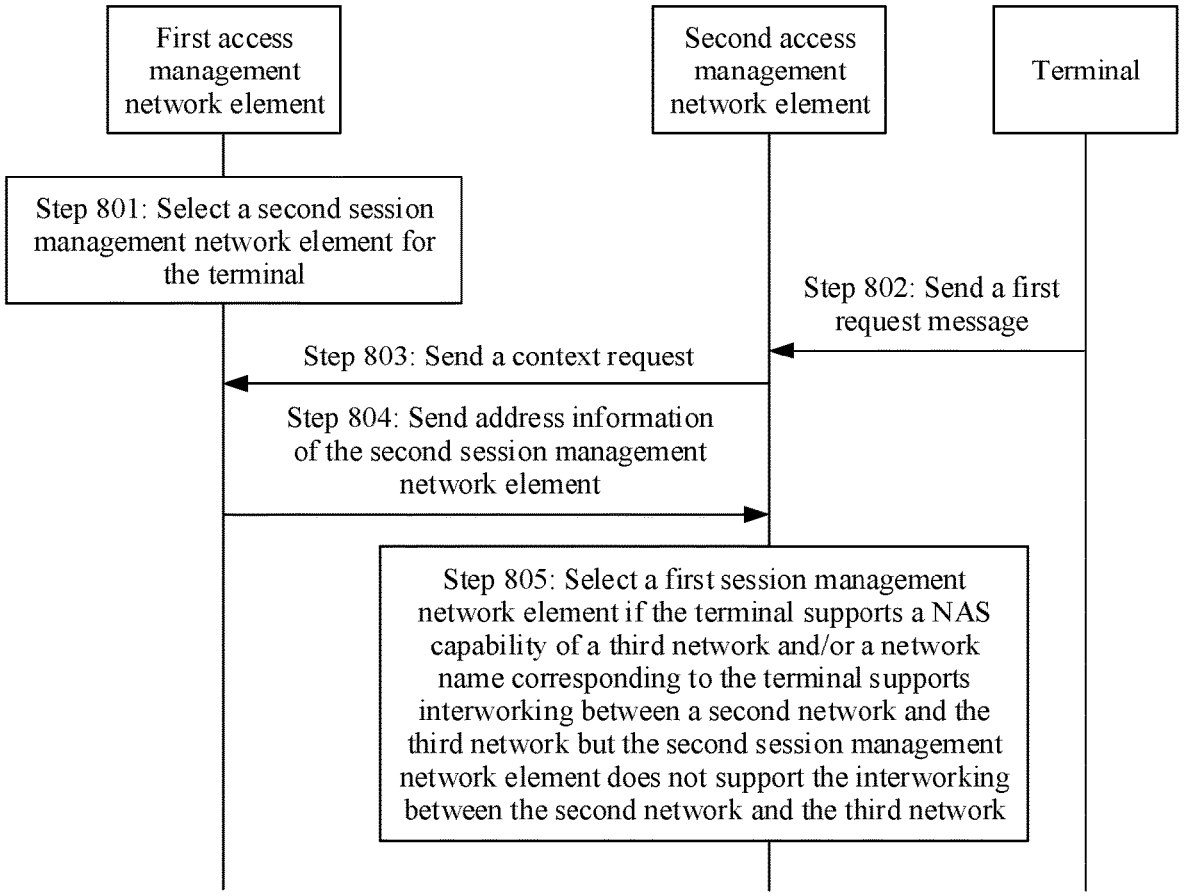
FIG. 8 is a fourth schematic flowchart of inter-network interworking according to an embodiment of this application.

As shown in FIG. 8, in a possible embodiment, before step 501, the method provided in this embodiment of this application may further include the following steps.

Step 801: The first access management network element selects a second session management network element for the terminal.

Optionally, before step 801, the terminal may further send a second request message to the first access management network element, where the second request message is used to request to register with or access the first network. The second request message does not report first capability information of the terminal. Therefore, the first access management network element does not select, for the terminal, the session management network element that supports the interworking of the terminal among the first network, the second network, and the third network.

Then, a session context of the terminal in the first network is created between the first access management network element and the second session management network element. Then, the first access management network element sends a registration accept message to the terminal.

Step 802: The terminal sends a first request message to the second access management network element, so that the second access management network element receives the first request message from the terminal. The first request message carries the session identifier of the terminal and the first capability information.

Step 803: In a process in which the second access management network element determines that the terminal requests to be handed over or redirected from the first network to the second network, the second access management network element sends a context request to the first access management network element, so that the first access management network element receives the context request.

If the second access management network element may alternatively determine, by using a network element other than the terminal, that the terminal supports the non-access stratum NAS capability of the third network (for example, the second access management network element determines, in a context response from the first access management network element, that the terminal supports the NAS capability of the third network, that is, step 804), step 802 may be omitted.

Step 804: The first access management network element sends address information of the second session management network element to the second access management network element, so that the second access management network element receives the address information of the second session management network element from the first access management network element.

For example, the address information of the second session management network element may be carried in the context response. Alternatively, in addition to the session context of the terminal in the second network, the context response may further include the address information of the second session management network element. Alternatively, the first access management network element sends the address information of the second session management network element to the second access management network element by using a message other than the context response.

Same as above, step 803 may be omitted.

Step 805: The second access management network element determines that the terminal supports the NAS capability of the third network and/or the network name corresponding to the terminal supports the interworking between the second network and the third network, where the second session management network element selected, in the first network, by the first access management network element for the terminal does not support the interworking between the second network and the third network; and the second access management network element selects the first session management network element.

For example, the second access management network element requests the first session management network element from a DNS.

In a possible implementation, the method provided in this embodiment of this application may further include: The first session management network element obtains subscription information that is of the terminal and that includes first indication information. The first indication information indicates that the network name corresponding to the terminal supports the interworking between the second network and the third network.

In the embodiment shown in FIG. 8, the terminal first registers with the first network, and the first access management network element does not select the network element that supports the interworking between the second network and the third network. Then, in the process in which the terminal moves from the first network to the second network, the second access management network element obtains the context from the first access management network element and learns that the first access management network element does not select the network element that supports the interworking between the second network and the third network. Therefore, the second access management network element selects the first session management network element.

Example (3): This example is applied to the scenario 2. The second access management network element selects, for the terminal, a session management network element that supports the interworking of the terminal among the first network, the second network, and the third network.

Figures 9, 10:
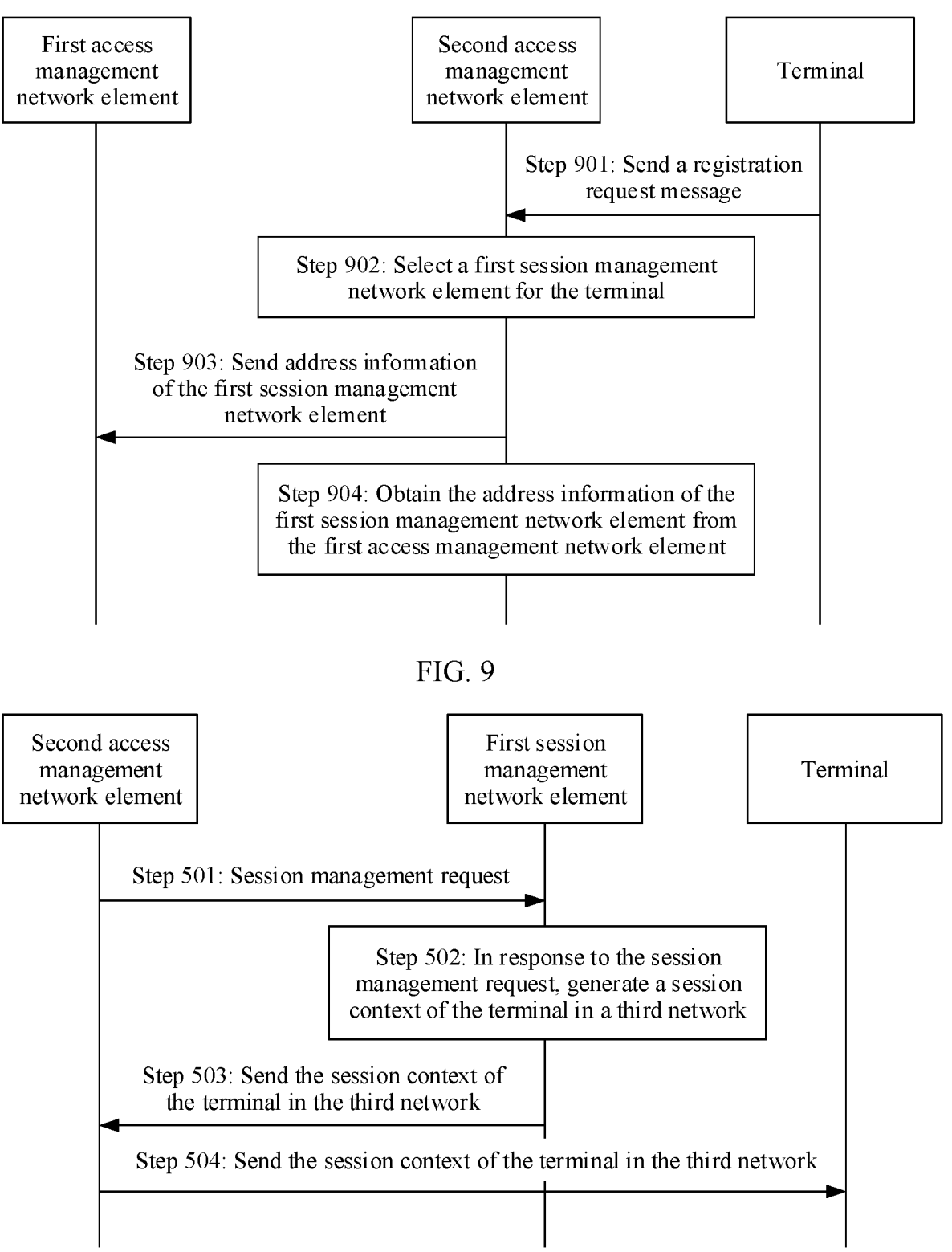
FIG. 9 is a fifth schematic flowchart of inter-network interworking according to an embodiment of this application.
FIG. 10 is a sixth schematic flowchart of inter-network interworking according to an embodiment of this application.

As shown in FIG. 9, in a possible embodiment, before step 501, the method provided in this embodiment of this application may further include the following steps.

Step 901: The terminal sends a registration request message to the second access management network element, so that the second access management network element receives the registration request message, where the registration request message carries first capability information. The registration request message is used to request to access the second network.

Step 902: The second access management network element selects the first session management network element for the terminal.

Then, a session is created between the second access management network element and the first session management network element.

Step 903: In a process in which the terminal moves from the second network to the first network, the second access management network element sends the address information of the first session management network element to the first access management network element.

Step 904: In a process in which the terminal moves from the first network to the second network, the second access management network element obtains the address information of the first session management network element from the first access management network element.

For a specific implementation of step 904, refer to the descriptions of step 604, step 602, step 603, and step 605. Details are not described herein again.

It should be noted that the example (3) is applicable to a case in which the terminal initially registers with the second network. The example (1) and the example (2) are applicable to a case in which the terminal initially registers with the first network.

In conclusion, the example (1) to the example (3) mainly describe a process in which the second access management network element obtains the address information of the first session management network element. In a possible implementation, with reference to FIG. 5, as shown in FIG. 10, after step 503, the method provided in this embodiment of this application may further include:

Step 504: The second access management network element sends the session context of the terminal in the third network to the terminal, so that the terminal receives the session context of the terminal in the third network.

By performing step 504, because the terminal has the session context of the terminal in the third network, if subsequently detecting that a signal strength of the third network is higher than that of the second network, the terminal may move from the second network to the third network.

For example, the second access management network element may send the session context of the terminal in the first network to the terminal by using a tracking area accept (TAU accept) message.

In a possible embodiment, the method provided in this embodiment of this application may further include: The first session management network element obtains subscription information that is of the terminal and that includes first indication information. The first indication information indicates that the network name corresponding to the terminal supports the interworking between the second network and the third network.

Correspondingly, step 502 in this embodiment of this application may be implemented in the following manner: The first session management network element generates the session context of the terminal in the third network based on the first indication information.

In a possible embodiment, in the method provided in this embodiment of this application, before the terminal sends the session identifier to the second access management network element, the method provided in this embodiment of this application may further include: The terminal allocates the session identifier based on at least one of the following information: that the terminal moves from the first network to the second network, first capability information, that the network name of the terminal supports the interworking between the second network and the third network, and that the terminal creates a session in the first network, where the first capability information indicates that the terminal supports the NAS capability of the third network.

Figure 11:
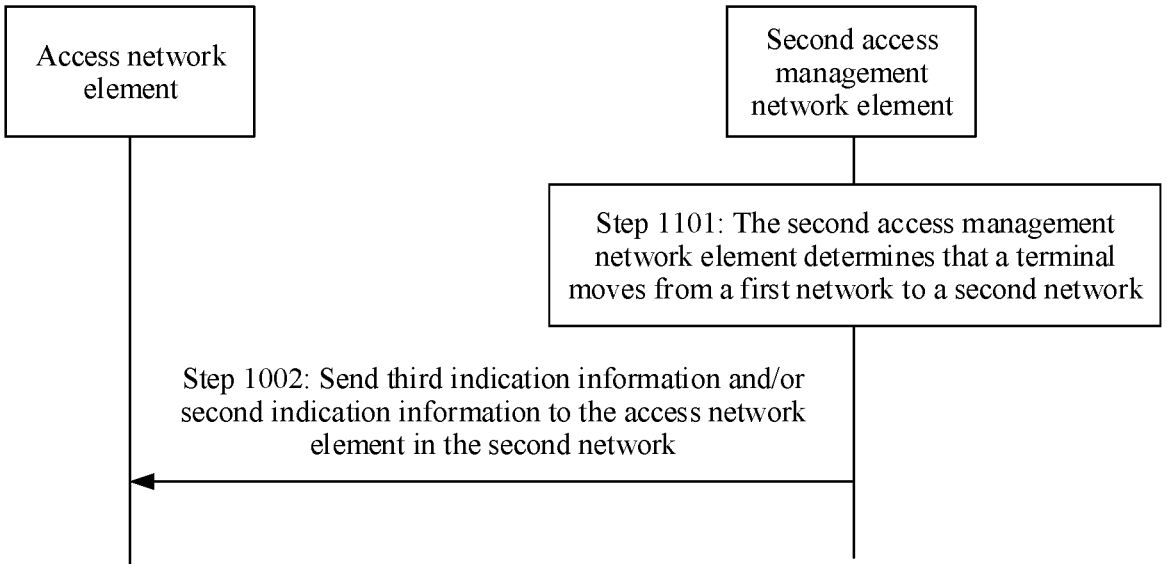
FIG. 11 is a seventh schematic flowchart of inter-network interworking according to an embodiment of this application.

FIG. 11 shows an inter-network interworking method according to an embodiment of this application. The method includes the following steps.

Step 1101: A second access management network element in a second network determines that a terminal is to move from a first network to the second network.

In a possible implementation, the terminal initially registers with the first network.

Step 1102: The second access management network element sends third indication information and/or second indication information to an access network element in the second network, so that the access network element receives the third indication information and/or the second indication information.

The third indication information is used by the access network element to determine to prohibit the terminal from accessing a third network from the second network, and the second indication information indicates the terminal to access the third network in an initial registration manner.

In a possible implementation, step 1101 in this embodiment of this application may be implemented in the following manner: That a second access management network element in a second network determines that a terminal is to move from a first network to the second network includes: The second access management network element receives, from the terminal or the access network element, fourth indication information that indicates the terminal to move from the first network to the second network.

In a possible implementation, step 1101 in this embodiment of this application may be implemented in the following manner: If the second access management network element determines that the terminal is to be redirected or handed over from the first network to the second network, the second access management network element determines that the terminal is to move from the first network to the second network.

In a possible implementation, the third indication information and/or the second indication information may be carried in a terminal context management request sent by the second access management network element to the access network element in the second network. For example, the terminal context management request may be a terminal context modification request (UE Context Modification Request). Optionally, the access network element may further send a response indication for the third indication information and/or the second indication information to the second access management network element, where the response indication is used to indicate that the third indication information and/or the second indication information are/is successfully received. For example, the response indication may be carried in a terminal context modification response.

In a possible implementation, the third indication information may correspond to the following SPID information. Details are not described herein again.

In a possible implementation, the third indication information may be sent by the second access management network element to the access network element in a process in which the access network element requests to move the terminal from the second network to the third network. In this case, the third indication information specifically indicates that a handover request for moving the terminal from the second network to the third network is rejected. Specifically, if the second access management network element receives a handover request (handover Required, HO Required) sent by the access network element, and a destination base station that the terminal requests to access in the handover request is a base station in the third network, the second access management network element rejects the handover request sent by the access network element.

In a possible implementation, the method provided in this embodiment of this application may further include: In a process in which the terminal enters an idle mode from a connected mode, the access network element sends the third indication information to the terminal by using RRC release signaling, and the terminal in the idle mode cannot reselect a cell in the third network.

Alternatively, in a possible implementation, the method provided in this embodiment of this application may further include: The access network element rejects a handover request sent by the terminal. The handover request is used to request to move the terminal from the second network to the third network. To be specific, the third indication information specifically indicates the access network element not to perform a handover procedure of moving the terminal from the second network to the third network. In this case, the third indication information may be sent by the second access management network element to the access network element in a TAU procedure after the terminal moves from the first network to the second network.

It should be noted that, if the third indication information corresponds to the following SPID information, after the terminal is powered on again or restarted, the SPID information is cleared, and the terminal may initially register with the third network.

Figure 12:
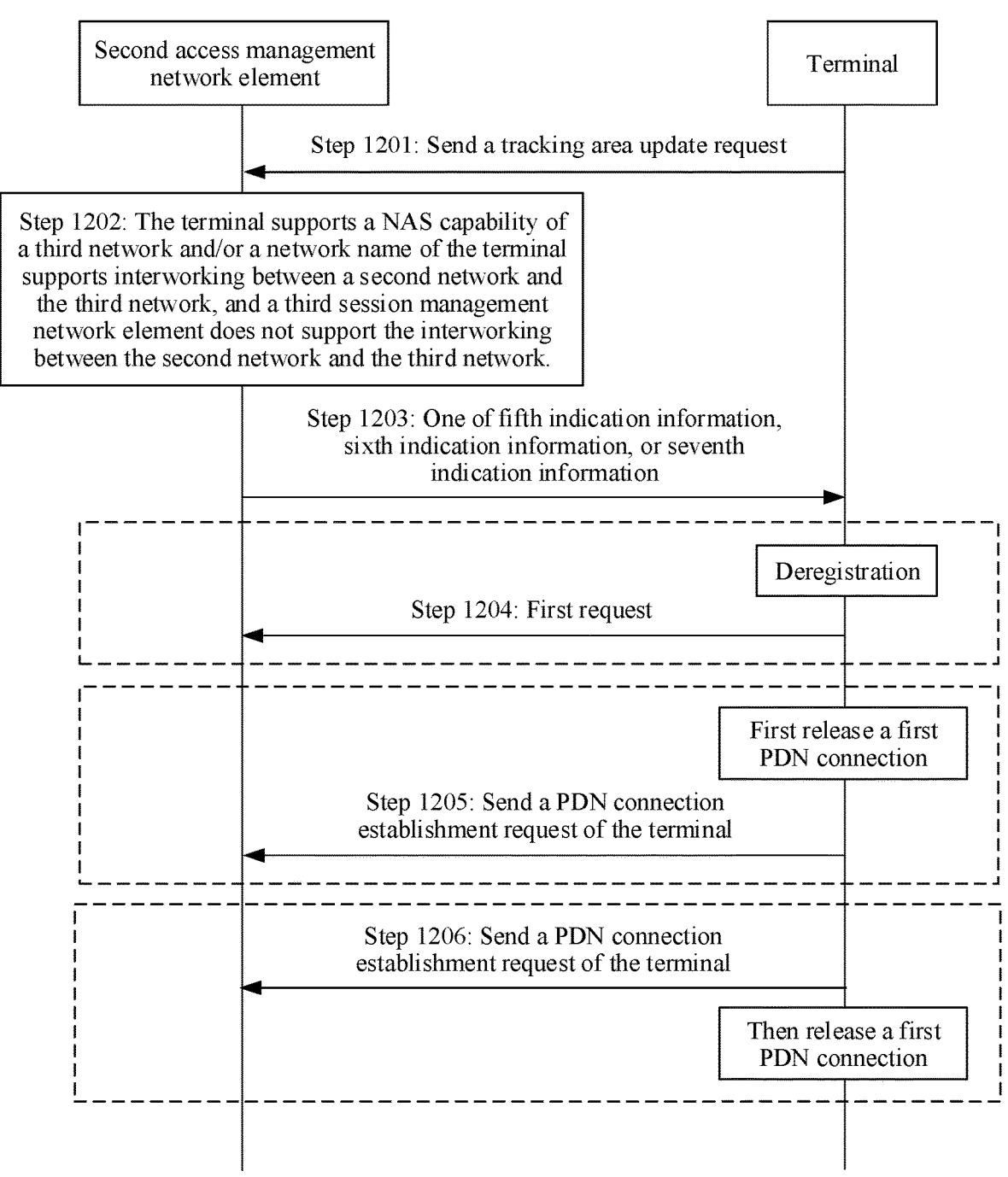
FIG. 12 is an eighth schematic flowchart of inter-network interworking according to an embodiment of this application.

FIG. 12 shows an inter-network interworking method according to an embodiment of this application. The method includes the following steps.

Step 1201: A terminal sends a tracking area update request to a second access management network element in a second network, so that the second access management network element receives the tracking area update request from the terminal. The tracking area update request includes at least one of first capability information and a session identifier of the terminal, where the first capability information indicates that the terminal supports a non-access stratum NAS capability of a third network, and the session identifier is used to identify a session of the terminal in the third network.

It should be understood that the embodiment shown in FIG. 12 is applicable to a scenario in which the terminal initially registers with a first network, that is, the foregoing scenario 1. It may be understood that the terminal registers with the first network before performing step 1201. The terminal sends the tracking area update request to the second access management network element in the second network to request to move from the first network to the second network.

Step 1202: The terminal supports the non-access stratum NAS capability of the third network and/or a network name of the terminal supports interworking between the second network and the third network, and the second access management network element in the second network determines that a second session management network element determined by a first access management network element in the first network for the terminal does not support the interworking between the second network and the third network.

Optionally, before step 1201, the method may further include step 801 and step 802.

Before step 1202, the method may further include step 804 and step 805. Details are not described herein again.

Step 1203: The second access management network element sends one of fifth indication information, sixth indication information, or seventh indication information to the terminal, so that the terminal receives the one of the fifth indication information, the sixth indication information, or the seventh indication information from the second access management network element.

The fifth indication information indicates the terminal to deregister from the second network, to be specific, indicates the terminal to initiate, to the second network, a request for canceling registration with the second network. The sixth indication information indicates the terminal to release a first packet data network PDN connection corresponding to the network name, where the first PDN connection does not support the interworking between the second network and the third network. The seventh indication information indicates the terminal to establish a second PDN connection corresponding to a first network name, where the second PDN connection supports the interworking between the second network and the third network.

In a possible implementation, the fifth indication information further indicates the terminal to initiate initial registration in the second network immediately after the terminal deregisters from the second network. In this way, in a process in which the terminal initiates the initial registration in the second network, the second access management network element selects a first session management network element for the terminal, to assist the terminal in moving from the second network to the third network subsequently.

In a possible embodiment, as shown in FIG. 12, after the terminal receives the fifth indication information, the method provided in this embodiment of this application further includes:

Step 1204: The terminal sends a first request (for example, an attach request attach request) to the second access management network element, so that the second access management network element receives the first request.

The first request is used to request to register with the second network. The first request carries at least one of the first capability information and the session identifier of the terminal, the first capability information is used to indicate that the terminal supports the non-access stratum NAS capability of the third network, and the session identifier is used to identify the session of the terminal in the third network. This helps the second access management network element select the first session management network element for the terminal in a registration process of the terminal, to assist the terminal in moving from the second network to the third network subsequently.

It may be understood that before step 1204, the terminal may further perform a deregistration procedure.

In a possible implementation, the sixth indication information further indicates the terminal to establish a second PDN connection corresponding to the network name immediately after releasing the first PDN connection, where the second PDN connection supports the interworking between the second network and the third network. Therefore, in a process in which the terminal establishes the second PDN connection corresponding to the network name, the second access management network element selects a first session management network element for the terminal in a registration process of the terminal, to assist the terminal in moving from the second network to the third network subsequently.

In a possible embodiment, the sixth indication information may be sent by the second access management network element to the terminal through an access network element in the second network.

In a possible embodiment, as shown in FIG. 12, after the second access management network element sends the sixth indication information to the terminal, the method provided in this embodiment of this application further includes:

Step 1205: The terminal sends a PDN connection establishment request of the terminal to the second access management network element, so that the second access management network element receives the PDN connection establishment request from the terminal. The PDN connection establishment request carries the session identifier. The PDN connection establishment request is used to request to establish the second PDN connection, so that the second access management network element selects the first session management network element for the terminal in a process of establishing the second PDN connection.

In this embodiment of this application, "immediately" may mean "within preset duration"; in other words, a time difference between an operation A and an operation B that are performed by the terminal is less than or equal to the preset duration. This may be considered as "immediately".

For example, if the terminal establishes the second PDN connection corresponding to the network name within T seconds after releasing the first PDN connection, it may also be considered that the terminal establishes the second PDN connection corresponding to the network name immediately after releasing the first PDN connection.

The preset duration may be configured for the terminal, or may be defined in a protocol. This is not limited in this embodiment of this application.

In a possible implementation, the seventh indication information further indicates the terminal to release a first PDN connection corresponding to the first network name after establishing the second PDN connection, where the first PDN connection does not support the interworking between the second network and the third network.

In a possible implementation, after the second access management network element sends the seventh indication information to the terminal, the method provided in this embodiment of this application further includes:

Step 1206: The terminal sends a PDN connection establishment request of the terminal to the second access management network element, so that the second access management network element receives the PDN connection establishment request from the terminal. The PDN connection establishment request carries the session identifier. The PDN connection establishment request is used to request to establish the second PDN connection, so that the second access management network element selects a session management network element for the terminal in a process of establishing the second PDN connection.

Optionally, after establishing the second PDN connection, the terminal releases the first PDN connection.

In a possible implementation, the terminal supports the non-access stratum NAS capability of the third network and/or the network name of the terminal supports the interworking between the second network and the third network.

In a possible implementation, that the first PDN connection does not support the interworking between the second network and the third network includes: A session management network element corresponding to the first PDN connection does not support the interworking between the second network and the third network.

In a possible implementation, that the second PDN connection supports the interworking between the second network and the third network includes: The first session management network element corresponding to the second PDN connection supports the interworking between the second network and the third network.

In a possible implementation, the method provided in this embodiment of this application further includes: The second access management network element receives, from the first access management network element in the first network, address information that is of the second session management network element in the first network and that is determined for the terminal.

In a possible implementation, that second access management network element receives, from the first access management network element, address information of the second session management network element determined for the terminal includes: In a process in which the second access management network element obtains a session context of the terminal in the second network from the first access management network element, the second access management network element receives the address information of the second session management network element from the first access management network element.

Figure 13:
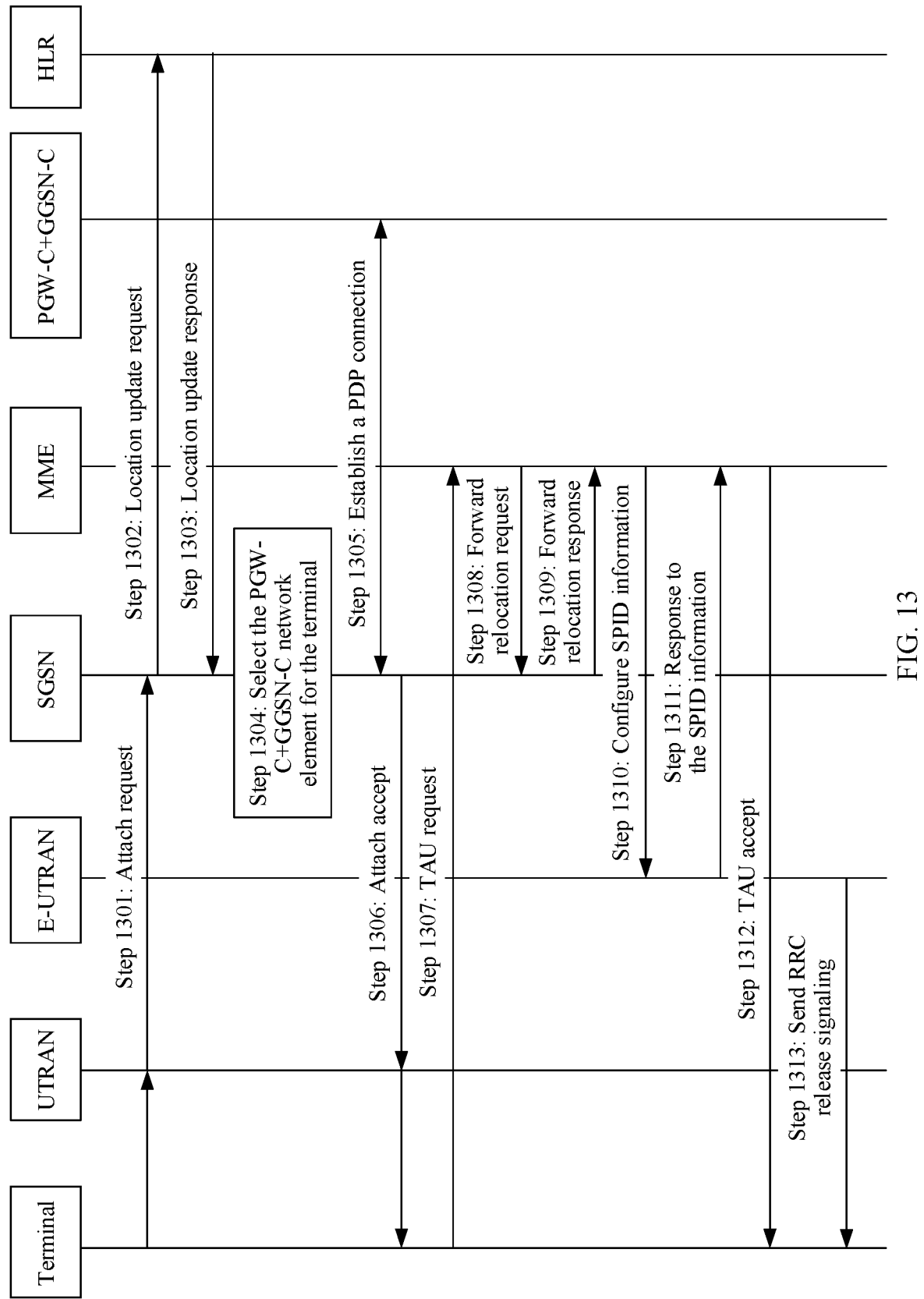
FIG. 13 to FIG. 17B are schematic flowcharts of a specific implementation of inter-network interworking according to embodiments of this application.

FIG. 13 is a detailed schematic flowchart of an internetwork interworking method according to an embodiment of this application. In the method, for example, a first network is a 3G network, a second network is a 4G network, a third network is a 5G network, an access network element in the second network is an E-UTRAN in the 4G network, a first access management network element is an SGSN, and a second session management network element is a PGW-C+GGSN-C. The method includes the following steps.

Step 1301: A terminal sends an attach request (attach request) to the SGSN through a UTRAN, so that the SGSN receives the attach request, which may also be referred to as a registration request or an access request.

Step 1302: The SGSN sends a location update request (location update request) to an HLR, so that the HLR receives the location update request from the SGSN.

Step 1303: The HLR sends a location update response (location update response) to the SGSN, so that the SGSN receives the location update response from the HLR.

Step 1304: The SGSN selects the PGW-C+GGSN-C network element for the terminal.

It should be noted that because the terminal does not report to the SGSN that the terminal supports a 5GC NAS capability (which corresponds to a NAS capability of the third network), the SGSN may not select an SMF+PGW-C+GGSN-C network element for the terminal, and selects, for the terminal, a gateway that does not support interworking between the 4G network and the 5G network, namely, the PGW-C+GGSN-C network element.

Step 1305: The SGSN establishes a PDP connection to the PGW-C+GGSN-C network element.

In an implementation, step 1305 may be implemented in the following manner: The SGSN sends a create PDP context request (create PDP Context request) to the PGW-C+GGSN-C network element, so that the PGW-C+GGSN-C network element receives the create PDP context request. The create PDP context request carries QoS of the terminal in a 2G network or the 3G network. The PGW-C+GGSN-C network element sends a create PDP context response (create PDP Context response) to the SGSN, so that the SGSN receives the create PDP context response. In this case, the PDP connection between the SGSN and the PGW-C+GGSN-C network element is established. For a specific detailed process of establishing the PDP connection, refer to descriptions in a conventional technology. Details are not described herein.

Step 1306: The SGSN sends an attach accept (attach accept), which may also be referred to as an access accept or a registration accept, to the terminal.

Then, a signal of the 4G network satisfies a handover or redirection requirement, and the terminal prepares to move (move) from the 2G/3G network to the 4G network.

For example, when the terminal is in a connected mode, a network side may indicate the terminal to be handed over from a 2G/3G network side to the 4G network, or the terminal may actively initiate a redirection (TAU) procedure to move from the 2G/3G network to the 4G network. The terminal in an idle mode moves from the 2G/3G network to the 4G network through redirection or a TAU.

Step 1307: The terminal sends a tracking area update (Tracking Area Update, TAU) request (request) to an MME, so that the MME receives the TAU request from the terminal.

Optionally, the TAU request carries an indication indicating that the terminal moves from the 2G/3G network to the 4G network.

Step 1308: The MME sends a forward relocation request (forward relocation request) to the SGSN, so that the SGSN receives the forward relocation request. The forward relocation request carries an IMSI of the terminal. The MME requests a 4G session context (for example, an EPS bearer context) from the SGSN by using the forward relocation request, that is, the 4G session context is generated by the SGSN by using a PDP context.

Step 1309: The SGSN sends a forward relocation response (forward relocation response) to the MME, so that the MME receives the forward relocation response from the SGSN. The forward relocation response carries address information of the PGW-C+GGSN-C network element and the 4G session context of the terminal.

It should be noted that, an example in which the address information of the PGW-C+GGSN-C network element is carried in the forward relocation response is used in step 1309. Certainly, the SGSN may alternatively notify the MME of the address information of the PGW-C+GGSN-C network element in another manner. This is not limited in this embodiment of this application.

Step 1310: The MME discovers that the terminal moves from the 2G/3G network to the 4G network, and the MME configures SPID (subscriber profile ID, subscriber profile identifier) information for the E-UTRAN, where the SPID information is used to determine to prohibit the terminal from moving from the 4G network to the 5G network.

For example, step 1310 may be specifically implemented in the following manner: The MME sends a terminal context modification request (UE Context Modification Request) to the E-UTRAN, so that the E-UTRAN receives the terminal context modification request.

The terminal context modification request carries the SPID information. For specific content of the SPID information, refer to Table 1.

TABLE 1

| Configuration parameter | Value | Meaning |
|---|---|---|
| E-UTRAN carrier frequency signal priority (carriers priority) | High (high) | Inter-RAT carrier frequency signal priority: If the terminal is in the connected mode, when an eNB selects a target base station, the |
| UTRAN carriers priority | Medium (medium) | eNB selects a 4G base station, a 3G base station, and a 2G base |
| GERAN carriers priority | Low (low) | station in descending order of priorities; and if the terminal is in the idle mode, when selecting a target cell, the terminal selects a 4G |

TABLE 1-continued

| Configuration parameter | Value | Meaning |
|---|---|---|
| | | cell, a 3G cell, and a 2G cell in descending order of priorities. |

Table 1 does not include an NG RAN carriers priority, that is, there is no 5G base station carrier frequency priority. An advantage is that when selecting a target base station in the future, the eNB does not select a 5G base station, so that the terminal is prohibited from being handed over from the 4G network to the 5G network.

Optionally, after step 1310, the method further includes the following steps.

Step 1311: The E-UTRAN sends, to the MME, a response to the SPID information.

For example, the E-UTRAN sends a terminal context modification response (UE Context Modification response) to the MME, so that the MME receives the terminal context modification response.

Step 1312: The MME sends a TAU accept (accept) to the terminal, so that the terminal receives the TAU accept.

Subsequently, in a process in which the terminal enters the idle mode from the connected mode, the eNB sends the SPID information to the terminal. Therefore, the method provided in this embodiment of this application may further include the following steps.

Step 1313: The E-UTRAN sends radio resource control (radio resource control, RRC) release (Release) signaling to the terminal, so that the terminal receives the RRC release signaling. The RRC release signaling carries indication information, to indicate that the terminal in the idle mode cannot reselect a 5G cell. For example, the indication information may be the SPID information.

In the future, after the terminal is powered on again, the SPID information will be cleared, and the terminal can initially register with the 5G network.

When the terminal initially registers with the 2G/3G network, other solutions in which the terminal is prohibited from moving from the 4G network to the 5G network (the terminal needs to be changed) are as follows:

Handover in the connected mode:

In a possible replacement, step 1310 may be replaced with the following step: In a TAU procedure after the terminal moves from the 2G/3G network to the 4G network, the MME indicates the E-UTRAN not to hand over the terminal from the 4G network to the 5G network.

In a possible replacement, step 1310 may be replaced with the following step: In a process in which the terminal requests to move from the 4G network to the 5G network, the MME receives a handover request (HO Required) from the E-UTRAN, where the handover request carries information about a target (Target) base station to which the terminal is to be handed over. If the MME determines that the target base station is a 5G base station, the MME sends a handover response to the E-UTRAN, where the handover response indicates that the terminal is rejected to be handed over from the 4G network to the 5G network.

Redirection in the connected mode and the idle mode:

In a possible replacement, step 1310 may be replaced with the following step: In a TAU procedure after the terminal is handed over from the 2G/3G network to the 4G network, the MME indicates that only initial registration of the terminal in the 5G network is allowed (including redirection rejection and no registration update). It should be noted that the TAU procedure herein is lightweight compared with the TAU procedure in step 1307. The MME updates only an area in which the terminal is located, and the MME does not need to further send a session context create or update request to the SMF+PGW-C network element.

If the terminal is unauthorized, a registration update procedure is forcibly performed on the 5G network. If an AMF network element finds that a gateway from the MME does not support an SMF, the AMF network element rejects the registration update. Then, the terminal initiates initial registration again. To be specific, in the registration update procedure, the AMF requests a session context from the MME. The context includes an address of a PGW. However, the PGW is not of an SMF+PGW-C type and does not support a function of the SMF, that is, the PGW does not have a capability of generating a 5G session context based on the 4G session context.

In the embodiment shown in FIG. 13, as shown in FIG. 4a, the terminal initially registers with the 2G/3G network. After the terminal moves from the 2G/3G network to the 4G network, the MME prohibits the terminal from moving from the 4G network to the 5G network. After the terminal is powered on, the terminal may register with the 5G network through an initial registration procedure. According to the method, a possibility that the terminal moves the 5G network is avoided, and a problem that a service is interrupted when the terminal moves from the 4G network to the 5G network in the scenario 1 is avoided.

Figure 14:
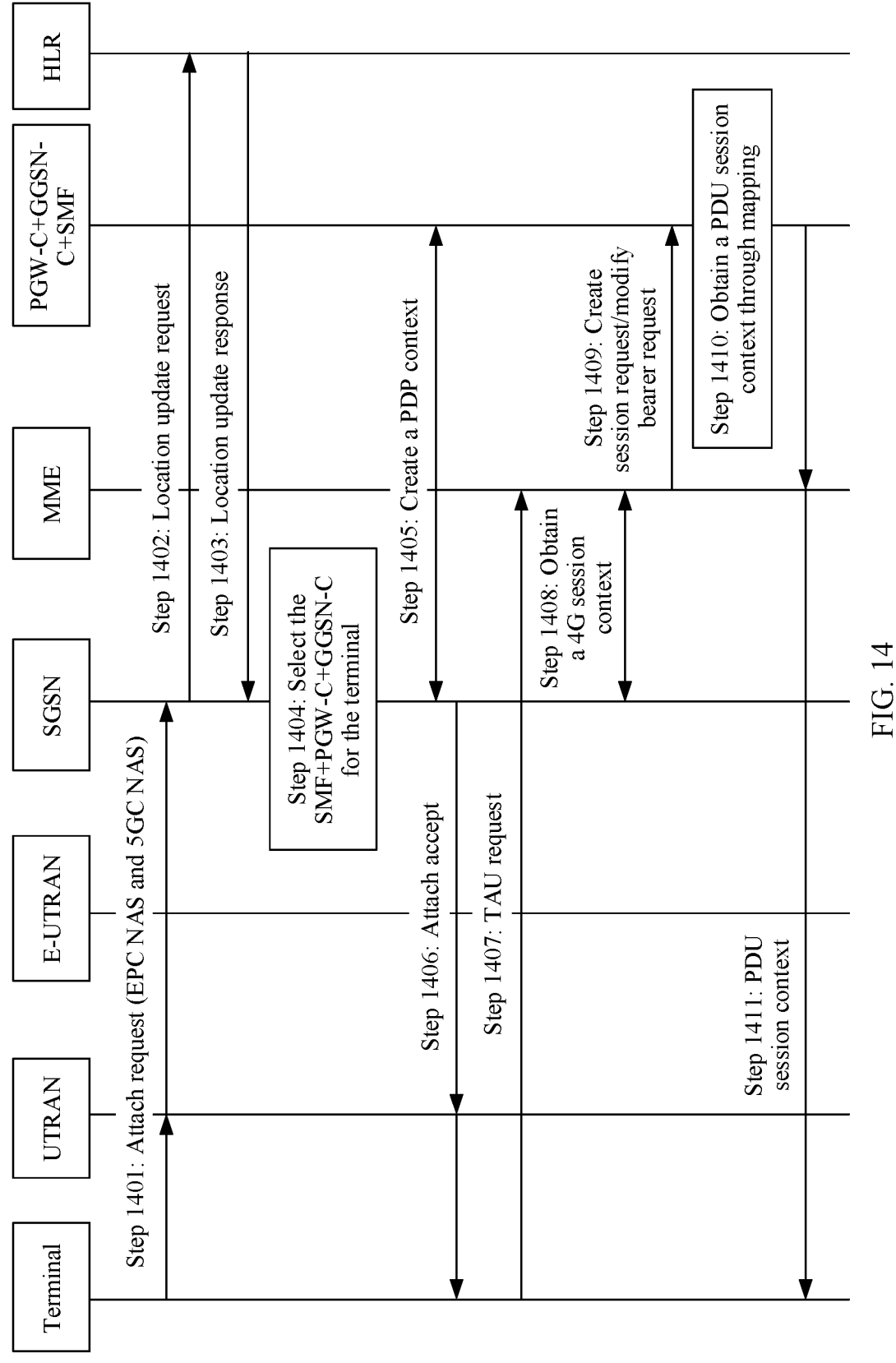

FIG. 14 is a detailed schematic flowchart of an inter-network interworking method according to an embodiment of this application. In the method, for example, a first network is a 3G network, a second network is a 4G network, a third network is a 5G network, an access network element in the second network is an E-UTRAN in the 4G network, a first access management network element is an SGSN, a second access management network element is an MME, and a first session management network element is a GGSN-C+PGW-C+SMF. The method includes the following steps.

Step 1401: A terminal sends an attach request (attach request) to the SGSN through a UTRAN, so that the SGSN receives the attach request from the terminal. The registration request carries an IMSI and a core network capability of the terminal. For example, the core network capability of the terminal includes an EPC NAS capability and a 5GC NAS capability.

Step 1402: The SGSN sends a location update request (location update request) to an HLR, so that the HLR receives the location update request. The location update request carries an identifier of the terminal and an APN supported by the terminal.

Step 1403: The HLR sends a location update response (location update response) to the SGSN, so that the SGSN receives the location update response. The location update response carries indication information indicating that the APN supports interworking between the 4G network and the 5G network and subscription data of the terminal. The subscription data of the terminal includes QoS information of the terminal in a 2G network or the 3G network.

Step 1404: The SGSN determines, based on that the terminal supports the 5GC NAS capability and/or the indication information indicating that the APN supports the interworking between the 4G network and the 5G network, that a combined network element that needs to be selected to support the interworking with the 5G network is an SMF+PGW-C+GGSN-C.

For example, the SGSN may select the SMF+PGW-C+ GGSN-C through a DNS.

Step 1405: The SGSN creates a PDP context between the SGSN and the SMF+PGW-C+GGSN-C based on the subscription data of the terminal. The PDP context includes a PDP type, a PDP context ID, and the QoS information of the 2G/3G network. The PDP context is stored in the SMF+ PGW-C+GGSN-C. In addition, the PDP context may further be sent by the SGSN or the SMF+PGW-C+GGSN-C to the terminal.

Step 1406: The SGSN sends an attach accept (attach accept) message to the terminal, so that the terminal receives the registration accept message. The registration accept message carries the PDP context.

Then, the terminal moves a location having a strong 4G network signal, and the method may further include the following steps.

Step 1407: The terminal sends a TAU request to the MME, so that the MME receives the TAU request from the terminal. The TAU request carries the IMSI of the terminal and a session identifier (for example, a PDU session ID):

if the terminal is in a connected mode, the UTRAN (for example, a 2G base station/3G base station) indicates the terminal to be redirected to the 4G network, that is, the terminal initiates a TAU procedure based on the indication of the 2G base station/3G base station; and if the terminal is in an idle mode, the terminal measures a 4G signal and determines to move from the 2G/3G network to the 4G network, so that the terminal initiates a TAU procedure to the MME.

The terminal first locally maps a 2G session parameter/3G session parameter to a 5G parameter. Based on that the terminal supports the 5GC NAS core network capability and/or a PDN connection that corresponds to the APN configured by the terminal supports the interworking between the 4G network and the 5G network, the terminal allocates a 5G-side PDU session ID to the PDN connection (corresponding to the PDP context) to be established, includes the PDU session ID in a PCO, and sends the PDU session ID to the MME by using the TAU request.

Step 1408: The MME obtains a 4G session context (namely, an EPS bearer context) from the SGSN by using the IMSI, where the 4G session context is generated by the SGSN by using the PDP context; and the MME further obtains address information of the combined network element SMF+PGW-C+GGSN-C from the SGSN.

Specifically, step 1408 may be implemented in the following manner: The MME sends a forward relocation request (forward relocation request) to the SGSN, so that the SGSN receives the forward relocation request. The forward relocation request is used to request the 4G session context. Then, the SGSN sends a forward relocation response (forward relocation response) to the MME, so that the MME receives the forward relocation response. In addition to the 4G session context, the context response may further include the address information of the SMF+PGW-C+GGSN-C.

It should be understood that, in this embodiment of this application, an example in which the context response includes the address information of the SMF+PGW-C+ GGSN-C is used. Certainly, the address information of the SMF+PGW-C+GGSN-C may alternatively be sent by the SGSN to the MME by using a message other than the forward relocation response. This is not limited in this embodiment of this application.

The MME allocates a default bearer identifier to a PDN connection corresponding to each 4G session context. If one or more dedicated bearers exist, one or more dedicated bearer identifiers further need to be allocated.

Step 1409: The MME sends a create session request/ modify bearer request (Create Session Request/Modify Bearer Request) to the SMF+PGW-C+GGSN-C through an S-GW, where this 4G session create process is an EPS bearer establishment process.

The create session request/modify bearer request carries the IMSI, the PCO (the PDU session ID), an RAT type (4G), and the EPS bearer context (an EPS bearer ID and a 4G QoS parameter). The RAT type (4G) is an optional information element. Information in the PCO (protocol configuration option, protocol configuration option) is content sent by the UE to the GGSN-C+PGW-C+SMF, and is invisible to the MME.

Step 1410: The SMF+PGW-C+GGSN-C discovers, based on the RAT type, that the terminal moves from the 2G/3G network to the 4G network, parses out the PDU session ID from the PCO, and then obtains a PDU session context (PDU Session Context) through mapping by using the EPS bearer context. The PDU session context corresponds to the foregoing first session context. For example, the PDU session context includes a PDU session type, a QFI, and a 5G QoS parameter. For a specific process, refer to FIG. 1b.

The 5G QoS parameter in the PDU session context may be obtained through mapping by using the 4G QoS parameter, or may be obtained by the SMF+PGW-C+GGSN-C through query from a PCF network element based on the IMSI. This is not limited in this embodiment of this application.

Step 1411: The SMF+PGW-C+GGSN-C sends the PDU session context to the terminal, so that the terminal receives the PDU session context.

Specifically, the SMF+PGW-C+GGSN-C sends a modify bearer response to the S-GW, where the modify bearer response carries the PDU session context. The PDU session context may be in a PCO in the modify bearer response. The S-GW sends a create session response to the MME. The create session response carries the PDU session context. The PDU session context may be in a PCO in the create session response. The MME sends a registration accept message (TAU Accept) to the terminal, so that the terminal receives the registration accept message. The registration accept message carries the PDU session context. The PDU session context may be in a PCO in the registration accept message.

In the embodiment shown in FIG. 14, although the terminal initially accesses the 2G/3G network, because the terminal reports that the terminal supports the 5GC NAS core network capability; or the SGSN determines, based on the subscription data of the terminal, that the APN of the terminal supports the interworking between the 5G network and the 5G network, and then selects the combined network element for the terminal, after the terminal moves from the 2G/3G network to the 4G network, the combined network element generates a 5G session context based on the 4G session context, and sends the 5G session context to the terminal for storage, to ensure the terminal to successfully move from the 4G network to the 5G network in the future. In this solution, an operation of the terminal is changed, an operation of the terminal in the 2G/3G network is changed (for example, the terminal needs to report the 5GC NAS core network capability), and an operation of the terminal in the 4G network is changed (for example, the MME needs to obtain, from the SGSN, an address of the session management network element GGSN-C+PGW-C+SMF that supports the interworking with the 5G network and/or that the UE supports the 5GC NAS core network capability), and an operation of the terminal in the 5G network is not changed. This can ensure service continuity from the 2G/3G network to the 4G network, and further ensure service continuity from the 4G network to the 5G network.

Figure 15:
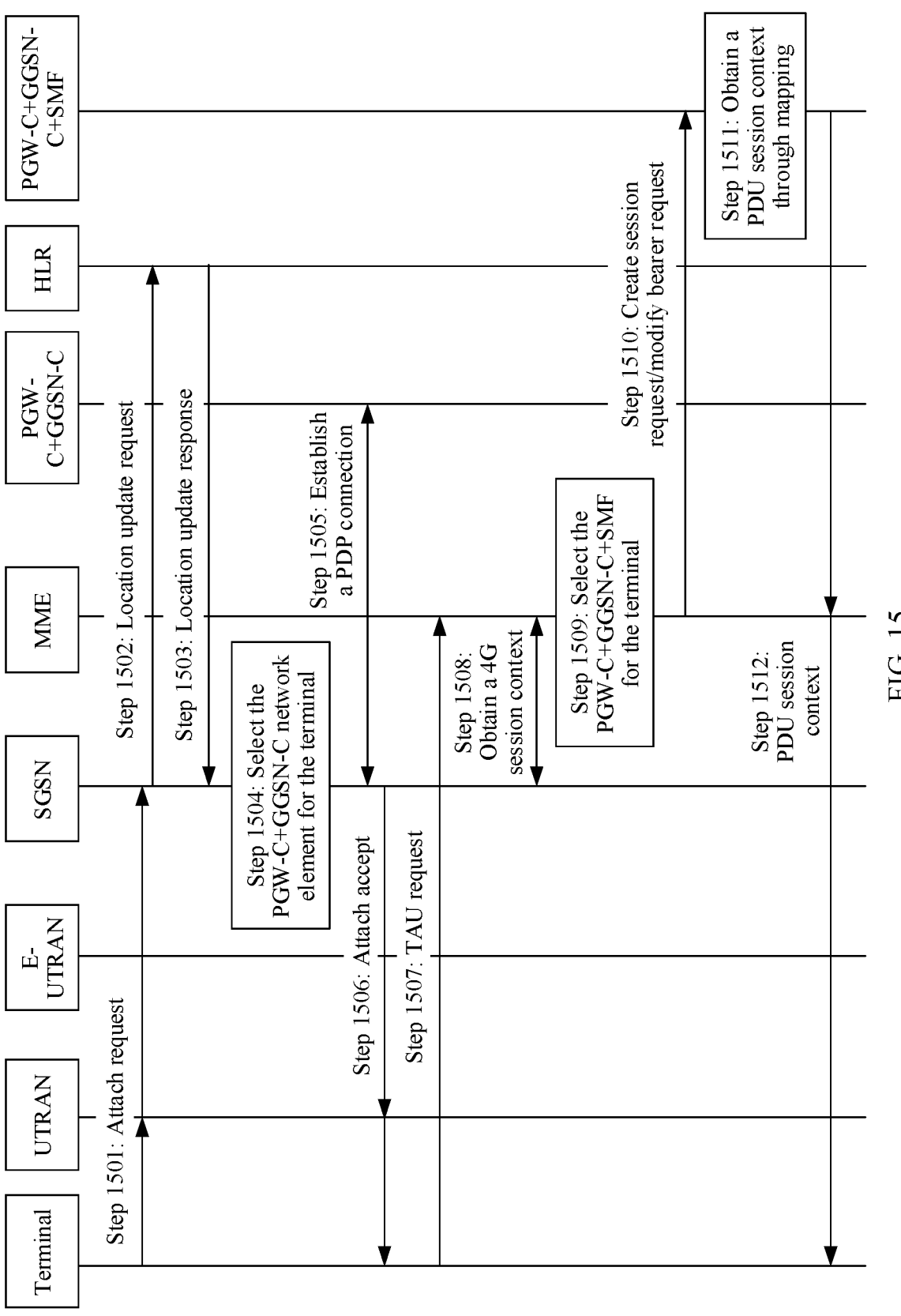

FIG. 15 is a detailed schematic flowchart of an inter-network interworking method according to an embodiment of this application. In the method, for example, a first network is a 3G network, a second network is a 4G network, a third network is a 5G network, an access network element in the second network is an E-UTRAN in the 4G network, a first access management network element is an SGSN, a second access management network element is an MME, and a session management network element is a GGSN-C+ PGW-C+SMF. The method includes the following steps.

Step 1501: A terminal sends an attach request (attach request) to the SGSN through a UTRAN, so that the SGSN receives the registration request from the terminal. The registration request carries an IMSI and a core network capability of the terminal. For example, the core network capability of the terminal includes an EPC NAS capability.

Step 1502: The SGSN sends a location update request (location update request) to an HLR, so that the HLR receives the location update request. The location update request carries an identifier of the terminal and an APN supported by the terminal.

Step 1503: The HLR sends a location update response (location update response) to the SGSN, so that the SGSN receives the location update response. The location update response carries subscription data of the terminal. The subscription data of the terminal includes QoS information of the terminal in a 2G network or the 3G network.

Step 1504: The SGSN selects, for the terminal, a gateway that does not support interworking between the 4G network and the 5G network, namely, a PGW-C+GGSN-C network element.

Step 1505 and step 1506 are the same as step 1405 and step 1406. Details are not described herein again.

Step 1507: The terminal sends a TAU request to the MME, so that the MME receives the TAU request from the terminal. The TAU request carries the IMSI of the terminal, a session identifier (for example, a PDU session ID), and a 5GC NAS.

For a trigger factor for sending, by the terminal, the TAU request to the MME, refer to the descriptions of step 1407. Details are not described herein again.

Step 1508: The MME obtains a 4G session context (namely, an EPS bearer context) from the SGSN by using the IMSI, where the 4G session context is generated by the SGSN by using a PDP context; and the MME further obtains address information of the PGW-C+GGSN-C network element from the SGSN.

Step 1509: The MME determines that the terminal supports the 5GC NAS and/or the APN of the terminal supports the interworking between the 4G network to the 5G network, but the PGW-C+GGSN-C network element from the SNSN does not support the interworking between the 4G network and the 5G network, so that the MME requests, from a DNS, a new combined gateway, namely, an SMF+PGW-C+ GGSN-C network element, to serve the terminal.

Step 1510 to step 1512 are the same as step 1409 to step 1411. Details are not described herein again.

In the embodiment shown in FIG. 15, although the terminal initially accesses the 2G/3G network, because the terminal does not report, to the SGSN, that the terminal supports the 5GC NAS core network capability, or the subscription data of the terminal does not carry indication information indicating that the APN of the terminal supports the interworking between the 5G network and the 5G network, the SGSN selects, for the terminal, the gateway that does not support the interworking between the 4G network and the 5G network, namely, the PGW-C+GGSN-C network element. In a process in which the terminal moves from the 2G/3G network to the 4G network, the terminal reports, to the MME, that the terminal supports the 5GC NAS core network capability, so that the MME selects the combined network element for the terminal based on that the terminal supports the 5GC NAS core network capability, and then the combined network element generates a 5G session context based on the 4G session context and sends the 5G session context to the terminal for storage, to ensure the terminal to successfully move from the 4G network to the 5G network in the future. In this solution, an operation of the terminal in the 4G network is modified, the 2G/3G network is not modified (that is, an operation of the terminal in the 2G/3G network remains unchanged), and the 5G network is not modified, although service continuity from the 2G/3G network to the 4G network cannot be ensured (where in the process in which the terminal moves from the 2G/3G network to the 4G network, the gateway or session management network element is changed from the PGW-C+ GGSN-C network element to the SMF+PGW-C+GGSN-C network element, and an IP address is changed; therefore, a session is interrupted, and a service is interrupted), service continuity from the 4G network to the 5G network can be ensured.

Figure 16:
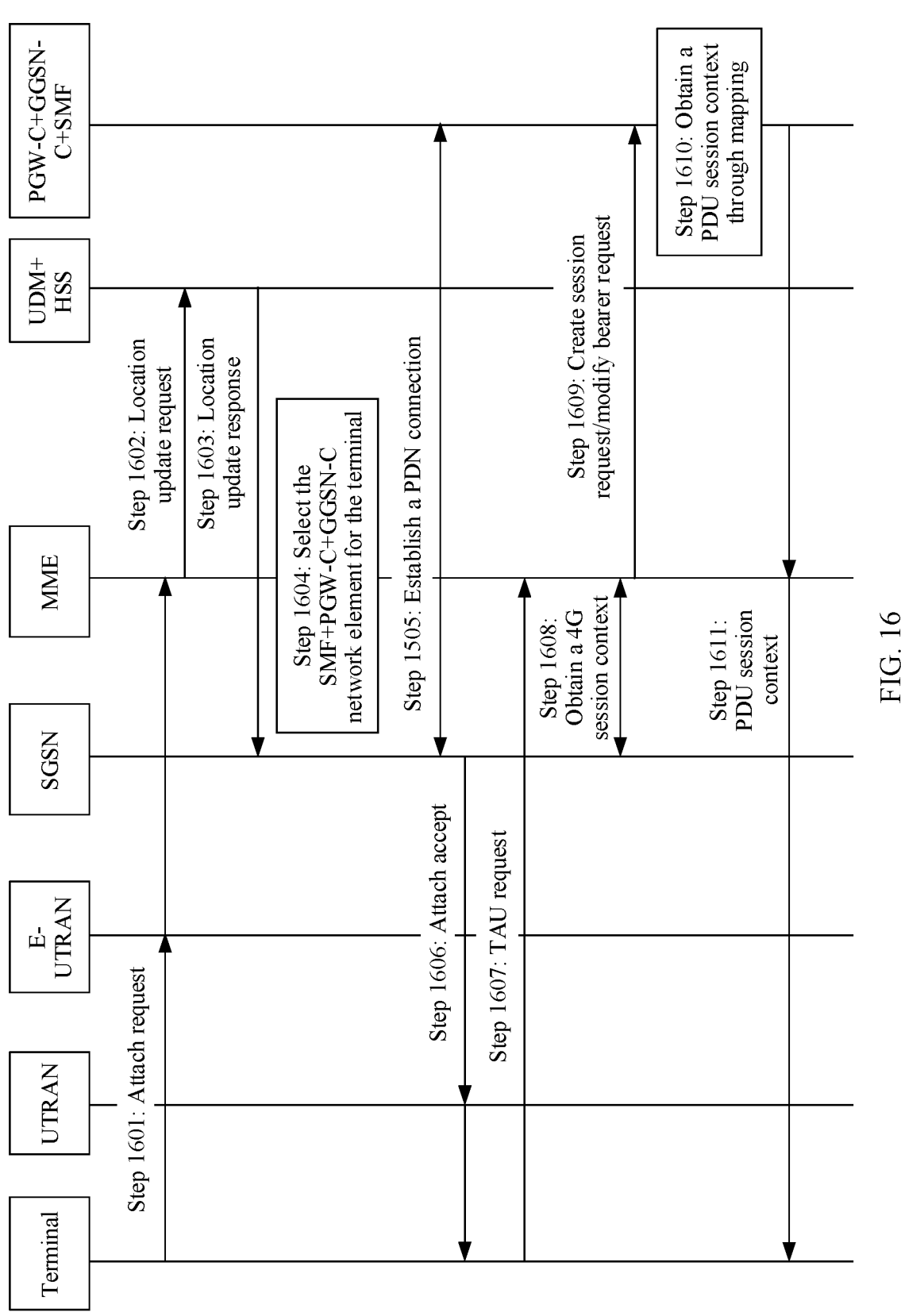

FIG. 16 is a detailed schematic flowchart of another inter-network interworking method according to an embodiment of this application. A difference between the method and that in the embodiment shown in FIG. 14 lies in that the terminal initially registers with the 4G network. However, in the embodiment shown in FIG. 14, the terminal initially registers with the 2G/3G network.

Step 1601: The terminal sends an attach request (attach request) to the MME through the E-UTRAN, so that the MME receives the registration request from the terminal. The registration request carries an IMSI and a core network capability of the terminal. For example, the core network capability of the terminal includes an EPC NAS and a 5GC NAS. If the terminal needs to establish a PDN connection in a registration process, the terminal further allocates a PDU session identifier (PDU Session ID) that is on a 5G network side and that corresponds to the PDN connection. In this case, the registration request further carries a PCO (the PDU Session ID).

Step 1602: The MME sends a location update request (location update request) to an UDM+HSS, so that the UDM+HSS receives the location update request. The location update request carries an identifier of the terminal and an APN supported by the terminal.

Step 1603: The UDM+HSS sends a location update response (location update response) to the MME, so that the MME receives the location update response. The location update response carries indication information indicating that the APN supports interworking between the 4G network and the 5G network and subscription data of the terminal.

The subscription data of the terminal includes QoS information of the terminal in the 4G network.

Step 1604: The MME determines, based on that the terminal supports the 5GC NAS core network capability and/or the indication information indicating that the APN supports the interworking between the 4G network and the 5G network, that a combined network element that needs to be selected to support the interworking with the 5G network is an SMF+PGW-C+GGSN-C network element.

Step 1605: The MME establishes a PDN connection to the SMF+PGW-C+GGSN-C network element.

Step 1605 may be specifically implemented in the following manner: The MME sends a create session request to the SMF+PGW-C+GGSN-C network element through an S-GW, so that the SMF+PGW-C+GGSN-C network element receives the create session request. The create session request is used to request to establish a PDN connection of the terminal in the second network. Then, the SMF+PGW-C+GGSN-C network element sends a create session response to the MME, so that the MME receives the create session response. The create session response may indicate the PDN connection of the terminal in the second network.

Optionally, after the SMF+PGW-C+GGSN-C network element receives the create session request, when generating a session context of the PDN connection of the terminal, the SMF+PGW-C+GGSN-C network element further generates a session context of a PDU session corresponding to the session context of the PDN connection. A PDU session ID corresponding to the session context of the PDU session is from step 1601.

Step 1606: The MME sends an attach accept (attach accept) message to the terminal, so that the terminal receives the attach accept message. The attach accept message carries the session context of the PDU session of the terminal.

Subsequently, the terminal is handed over from the 4G network to the 2G/3G network, or the terminal is redirected from the 4G network to the 2G/3G network. In the 2G/3G network, the terminal modifies a PDP context, or re-creates a PDP context. Then, the terminal determines to be handed over from the 2G/3G network to the 4G network, or the terminal is redirected from the 2G/3G network to the 4G network.

1. If the terminal creates a PDP context in the 2G/3G network, after the terminal is returned to the 4G network from the 2G/3G network, the terminal needs to allocate a corresponding PDU session ID, and sends the PDU session ID to the SMF+PGW-C+GGSN-C network element on a network side by using a PCO. After detecting that the terminal moves from the 2G/3G network to the 4G network, the SMF+PGW-C+GGSN-C network element generates a PDU session context corresponding to the PDU session ID, and sends the PDU session context to the terminal by using the PCO.

2. Otherwise, if the terminal modifies only an existing PDP context when the terminal is in the 2G/3G network, after the terminal is returned to the 4G network from the 2G/3G network, the terminal does not need to allocate a PDU session ID. After detecting that the terminal moves from the 2G/3G network to the 4G network, the SMF+PGW-C+GGSN-C network element on a network side updates a corresponding PDU session context and sends an updated PDU session context to the terminal by using a PCO.

Based on the foregoing descriptions, the method shown in FIG. 16 may further include the following steps:

Step 1607 to step 1611 are the same as step 1407 to step 1411 shown in FIG. 14. Details are not described herein again.

Figure 17A:
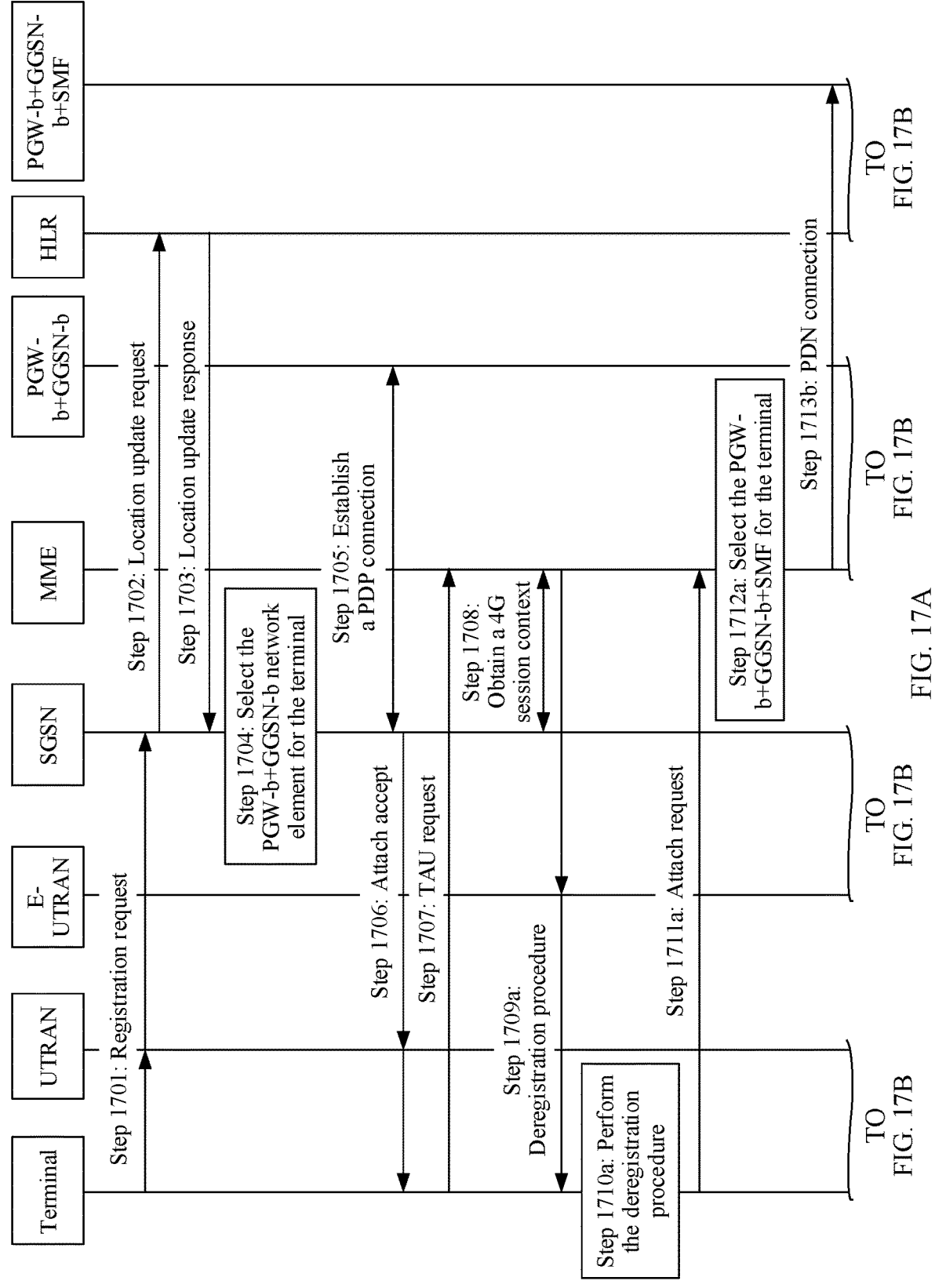
Figure 17B:
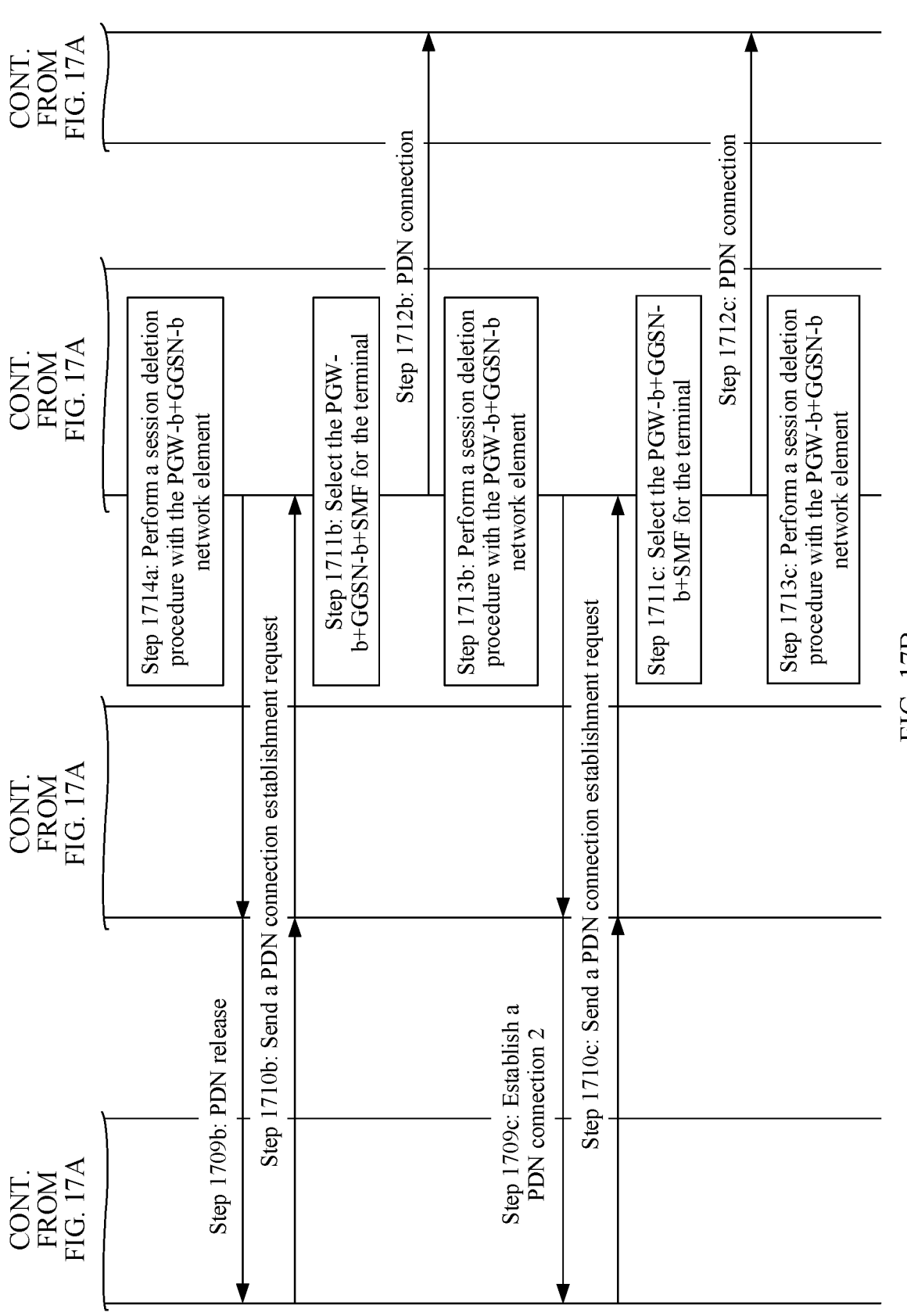

FIG. 17A and FIG. 17B are a detailed schematic flowchart of another inter-network interworking method according to an embodiment of this application. The method includes the following steps.

Step 1701 to step 1708 are the same as step 1501 to step 1508. Details are not described herein again.

If the MME determines that the terminal supports the 5GC NAS and/or the APN of the terminal supports interworking between the 4G network and the 5G network, the MME performs one of the following operations:

(1) Deregistration Procedure

1709a: The MME indicates the terminal to perform a detach (Detach) procedure. For example, the MME sends first indication information to the terminal, so that the terminal receives the first indication information. The first indication information indicates the terminal to perform the detach procedure (where service continuity from 2/3G to 4G cannot be ensured).

In addition, the MME may further indicate the terminal to initiate a registration procedure immediately during deregistration. It should be noted that the first indication information may further indicate the terminal to initiate the registration procedure immediately during the deregistration. Alternatively, when or after sending the first indication information to the terminal, the MME may further send a first notification message to the terminal, where the first notification message is used to indicate the terminal to initiate the registration procedure immediately during the deregistration.

Step 1710a: The terminal performs the detach procedure.

Step 1711a: The terminal sends an attach request (attach request) to the MME through the E-UTRAN, so that the MME receives the attach request. The attach request carries the 5GC NAS and a PCO of the terminal. The PCO carries a PDU session ID. Certainly, the attach request may not carry the 5GC NAS or the PCO of the terminal. The PCO carries the PDU session ID.

Step 1712a: The MME selects an SMF+PGW-C+GGSN-C network element for the terminal.

In the registration procedure, the terminal may report, to the MME, that the terminal supports the 5GC NAS and/or the MME may determine that the APN of the terminal supports the interworking between the 4G network and the 5G network. Therefore, the MME may select the SMF+PGW-C+GGSN-C network element for the terminal.

Step 1713a: The MME establishes a PDN connection to the SMF+PGW-C+GGSN-C network element.

For example, the MME sends a create session request to the SMF+PGW-C+GGSN-C network element, where the create session request carries the PCO. Then, the MME receives a create session response from the SMF+PGW-C+GGSN-C network element.

Step 1714a: The MME performs a session deletion procedure with the PGW-C+GGSN-C network element.

(2) First Releasing a PDN Connection, and then Establishing a New PDN Connection

1709b: The MME indicates the terminal to initiate a PDN release (disconnection) procedure (where service continuity from 2/3G to 4G cannot be ensured). For example, the MME sends second indication information to the terminal, where the second indication information indicates the terminal to release a PDN connection 1 corresponding to the APN.

In addition, the MME may further indicate the terminal to immediately initiate establishment of a new PDN connection 2 (corresponding to the foregoing second PDN connection) of the APN when the terminal releases the PDN connection 1 (corresponding to the foregoing first PDN connection).

The PDN connection 2 may support the interworking between the 4G network and the 5G network. Optionally, the second indication information may further indicate the terminal to immediately initiate the new PDN connection 2 of the APN when the terminal releases the PDN connection 1; or the MME separately sends a second notification message to the terminal, where the second notification message indicates the terminal to immediately initiate the new PDN connection 2 of the APN when the terminal releases the PDN connection 1.

Step 1710b: The terminal sends a PDN connection establishment request to the MME through the E-UTRAN, where the PDN connection establishment request is used to request to establish the PDN connection 2.

It may be understood that the terminal releases the PDN connection 1 after receiving the second indication information.

Steps 1711b to 1713b are the same as steps 1712a to 1714a. Details are not described herein again.

(3) First Establishing a New PDN Connection, and then Releasing an Existing PDN Connection Step 1709c: The MME indicates the terminal to initiate establishment of a new PDN connection 2. For example, the MME sends third indication information to the terminal, where the third indication information indicates the terminal to establish the new PDN connection 2. In addition, the MME may further indicate the terminal to release a PDN connection 1 after the terminal establishes the PDN connection 2. The PDN connection 1 is a PDN connection that has been established before the terminal establishes the PDN connection 2.

It should be understood that the third indication information may further indicate the terminal to release the PDN connection 1 after the terminal establishes the PDN connection 2.

For example, the MME sends a message to the E-UTRAN, where the message carries the third indication information. Then, the E-UTRAN sends a deactivate bearer request to the terminal. The deactivate bearer request carries the third indication information.

Steps 1710c to 1713c are the same as steps 1710b to 1713b. Details are not described herein again.

Specifically, after migrating all sessions to the new PDN connection 2, the terminal releases the PDN connection 1.

It should be understood that the embodiments shown in FIG. 13 to FIG. 15 and FIG. 17A and FIG. 17B are applicable to the foregoing scenario 1, and the embodiment shown in FIG. 16 is applicable to the foregoing scenario 2.

The foregoing mainly describes the solutions in embodiments of this application from a perspective of interaction between the network elements. It can be understood that, to implement the foregoing functions, the network elements, such as the first session management network element, the first access management network element, the second access management network element, and the terminal include corresponding hardware structures and/or software modules for performing the functions. A person skilled in the art should be easily aware that, with reference to the units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first session management network element, the first access management network element, the second access management network element, and the terminal may be divided into functional units based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that, in embodiments of this application, the unit division is an example, and is merely logical function division. In an actual implementation, another division manner may be used.

The foregoing describes the methods in embodiments of this application with reference to FIG. 5 to FIG. 17B. The following describes communication apparatuses that are provided in embodiments of this application and that perform the foregoing methods. A person skilled in the art may understand that the method and the apparatus may be combined and referenced with each other. The communication apparatuses provided in embodiments of this application may perform the steps performed by the first session management network element, the first access management network element, the second access management network element, and the terminal in the foregoing inter-network interworking methods.

Figure 18:
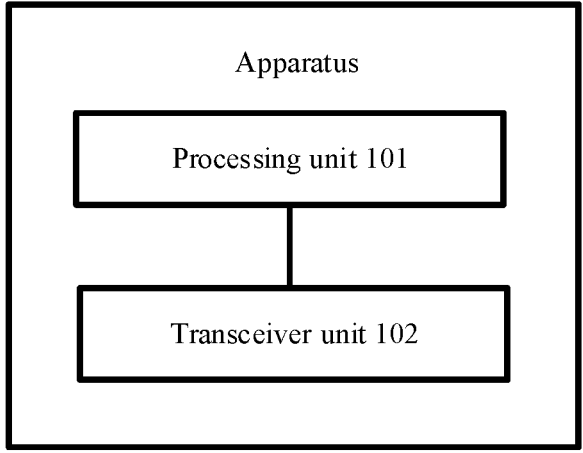
FIG. 18 is a schematic diagram of a structure of a communication apparatus according to an embodiment of this application.

When an integrated unit is used, FIG. 18 shows a communication apparatus in the foregoing embodiments. The communication apparatus may include a transceiver unit 102 and a processing unit 101.

In an example, the communication apparatus is a second access management network element, or a chip used in the second access management network element. In this case, the transceiver unit 102 is configured to support the communication apparatus in performing the sending action performed by the second access management network element in step 501 in FIG. 5 in the foregoing embodiment. The transceiver unit 102 is configured to support the communication apparatus in performing the receiving action performed by the second access management network element in step 503 in FIG. 5.

In a possible embodiment, the transceiver unit 102 is further configured to support the communication apparatus in performing the sending actions performed by the second access management network element in step 602, step 803, step 903, and step 504 in the foregoing embodiments. The transceiver unit 102 is further configured to support the communication apparatus in performing the receiving actions performed by the second access management network element in step 604, step 802, step 901, and step 904 in the foregoing embodiments. The processing unit is further configured to support the communication apparatus in performing step 605, step 805, and step 902 in the foregoing embodiments.

In another example, the communication apparatus is a first session management network element, or a chip used in the first session management network element. In this case, the transceiver unit 102 is configured to support the communication apparatus in performing the receiving action performed by the first session management network element in step 501 in the foregoing embodiment. The processing unit 101 is configured to support the communication apparatus in performing step 502 in the foregoing embodiment.

The transceiver unit 102 is further configured to support the communication apparatus in performing the sending action performed by the first session management network element in step 503 in the foregoing embodiment.

In still another example, the communication apparatus is a first access management network element, or a chip used in the first access management network element. The transceiver unit 102 is configured to support the communication apparatus in performing the receiving actions performed by the first access management network element in step 602, step 701*a*, and step 702*b* in the foregoing embodiments. The processing unit 101 is configured to support the communication apparatus in performing the processing actions performed by the first access management network element in step 601 and step 702*a* in the foregoing embodiments. The transceiver unit 102 is configured to support the communication apparatus in performing the sending actions performed by the first access management network element in step 603 and step 701*b* in the foregoing embodiments. Alternatively:

The processing unit 101 is configured to support the communication apparatus in performing the processing action performed by the first access management network element in step 801 in the foregoing embodiment. The transceiver unit 102 is configured to support the communication apparatus in performing the receiving action performed by the first access management network element in step 803 and the sending action performed by the first access management network element in step 804 in the foregoing embodiment.

In still another example, the communication apparatus is a terminal, or a chip used in the terminal. The transceiver unit 102 is configured to support the communication apparatus in performing the sending action in step 604, step 701*a*, step 802, or step 901 in the foregoing embodiment. The communication apparatus is further configured to support the terminal in performing the receiving action performed by the terminal in step 504 in the foregoing embodiment.

In still another example, the communication apparatus is a second access management network element, or a chip used in the second access management network element. The transceiver unit 102 is configured to support the communication apparatus in performing the sending action performed by the second access management network element in step 1102 in the foregoing embodiment. The processing unit 101 is configured to support the communication apparatus in performing step 1101 in the foregoing embodiment.

In still another example, the communication apparatus is a second access management network element, or a chip used in the second access management network element. The transceiver unit 102 is configured to support the communication apparatus in performing the receiving action performed by the second access management network element in step 1201 in the foregoing embodiment. The processing unit 101 is configured to support the communication apparatus in performing step 1202 in the foregoing embodiment. The transceiver unit is further configured to support the communication apparatus in performing the sending action performed by the second access management network element in step 1203 in the foregoing embodiment.

In a possible implementation, the transceiver unit 102 is further configured to support the communication apparatus in performing the receiving action performed by the second access management network element in step 1204, step 1205, or step 1206 in the foregoing embodiment.

In still another example, the communication apparatus is a terminal, or a chip used in the terminal. The transceiver unit 102 is configured to support the communication apparatus in performing the sending action performed by the terminal in step 1201 in the foregoing embodiment. The transceiver unit is further configured to support the communication apparatus in performing the receiving action performed by the terminal in step 1203 in the foregoing embodiment.

In a possible implementation, the transceiver unit 102 is further configured to support the communication apparatus in performing the sending action performed by the terminal in step 1204, step 1205, or step 1206 in the foregoing embodiment.

Figure 19:
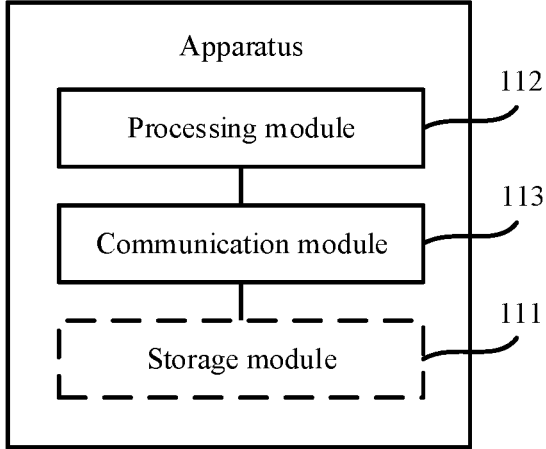
FIG. 19 is a schematic diagram of a structure of another communication apparatus according to an embodiment of this application.

When an integrated unit is used, FIG. 19 is a schematic diagram of a possible logical structure of a communication apparatus in the foregoing embodiment. The communication apparatus includes a processing module 112 and a communication module 113. The processing module 112 is configured to control and manage actions of the communication apparatus. For example, the processing module 112 is configured to perform an information/data processing step performed by the communication apparatus. The communication module 113 is configured to support the communication apparatus in performing an information/data sending or receiving step.

In a possible embodiment, the communication apparatus may further include a storage module 111, configured to store program code and data of the communication apparatus.

In an example, the communication apparatus is a second access management network element, or a chip used in the second access management network element. In this case, the communication module 113 is configured to support the communication apparatus in performing the sending action performed by the second access management network element in step 501 in FIG. 5 in the foregoing embodiment. The communication module 113 is configured to support the communication apparatus in performing the receiving action performed by the second access management network element in step 503 in FIG. 5.

In a possible embodiment, the communication module 113 is further configured to support the communication apparatus in performing the sending actions performed by the second access management network element in step 602, step 803, step 903, and step 504 in the foregoing embodiments. The communication module 113 is further configured to support the communication apparatus in performing the receiving actions performed by the second access management network element in step 604, step 802, step 901, and step 904 in the foregoing embodiments. The processing unit is further configured to support the communication apparatus in performing step 605, step 805, and step 902 in the foregoing embodiments.

In another example, the communication apparatus is a first session management network element, or a chip used in the first session management network element. In this case, the communication module 113 is configured to support the communication apparatus in performing the receiving action performed by the first session management network element in step 501 in the foregoing embodiment. The processing module 112 is configured to support the communication apparatus in performing step 502 in the foregoing embodiment. The communication module 113 is further configured to support the communication apparatus in performing the sending action performed by the first session management network element in step 503 in the foregoing embodiment.

In still another example, the communication apparatus is a first access management network element, or a chip used in the first access management network element. The communication module 113 is configured to support the communication apparatus in performing the receiving actions performed by the first access management network element in step 602, step 701a, and step 702b in the foregoing embodiments. The processing module 112 is configured to support the communication apparatus in performing the processing actions performed by the first access management network element in step 601 and step 702a in the foregoing embodiments. The communication module 113 is configured to support the communication apparatus in performing the sending actions performed by the first access management network element in step 603 and step 701b in the foregoing embodiments. Alternatively:

The processing module 112 is configured to support the communication apparatus in performing the processing action performed by the first access management network element in step 801 in the foregoing embodiment. The communication module 113 is configured to support the communication apparatus in performing the receiving action performed by the first access management network element in step 803 and the sending action performed by the first access management network element in step 804 in the foregoing embodiment.

In still another example, the communication apparatus is a terminal, or a chip used in the terminal. The communication module 113 is configured to support the communication apparatus in performing the sending action in step 604, step 701a, step 802, or step 901 in the foregoing embodiment. The communication apparatus is further configured to support the terminal in performing the receiving action performed by the terminal in step 504 in the foregoing embodiment.

In still another example, the communication apparatus is a second access management network element, or a chip used in the second access management network element. The communication module 113 is configured to support the communication apparatus in performing the sending action performed by the second access management network element in step 1102 in the foregoing embodiment. The processing module 112 is configured to support the communication apparatus in performing step 1101 in the foregoing embodiment.

In still another example, the communication apparatus is a second access management network element, or a chip used in the second access management network element. The communication module 113 is configured to support the communication apparatus in performing the receiving action performed by the second access management network element in step 1201 in the foregoing embodiment. The processing module 112 is configured to support the communication apparatus in performing step 1202 in the foregoing embodiment. The transceiver unit is further configured to support the communication apparatus in performing the sending action performed by the second access management network element in step 1203 in the foregoing embodiment.

In a possible implementation, the communication module 113 is further configured to support the communication apparatus in performing the receiving action performed by the second access management network element in step 1204, step 1205, or step 1206 in the foregoing embodiment.

In still another example, the communication apparatus is a terminal, or a chip used in the terminal. The communication module 113 is configured to support the communication apparatus in performing the sending action performed by the terminal in step 1201 in the foregoing embodiment. The transceiver unit is further configured to support the communication apparatus in performing the receiving action performed by the terminal in step 1203 in the foregoing embodiment.

In a possible implementation, the communication module 113 is further configured to support the communication apparatus in performing the sending action performed by the terminal in step 1204, step 1205, or step 1206 in the foregoing embodiment.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processing module 112 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communication module 113 may be a transceiver, a transceiver circuit, a communication interface, or the like. The storage module 111 may be a memory.

Figures 20, 21:
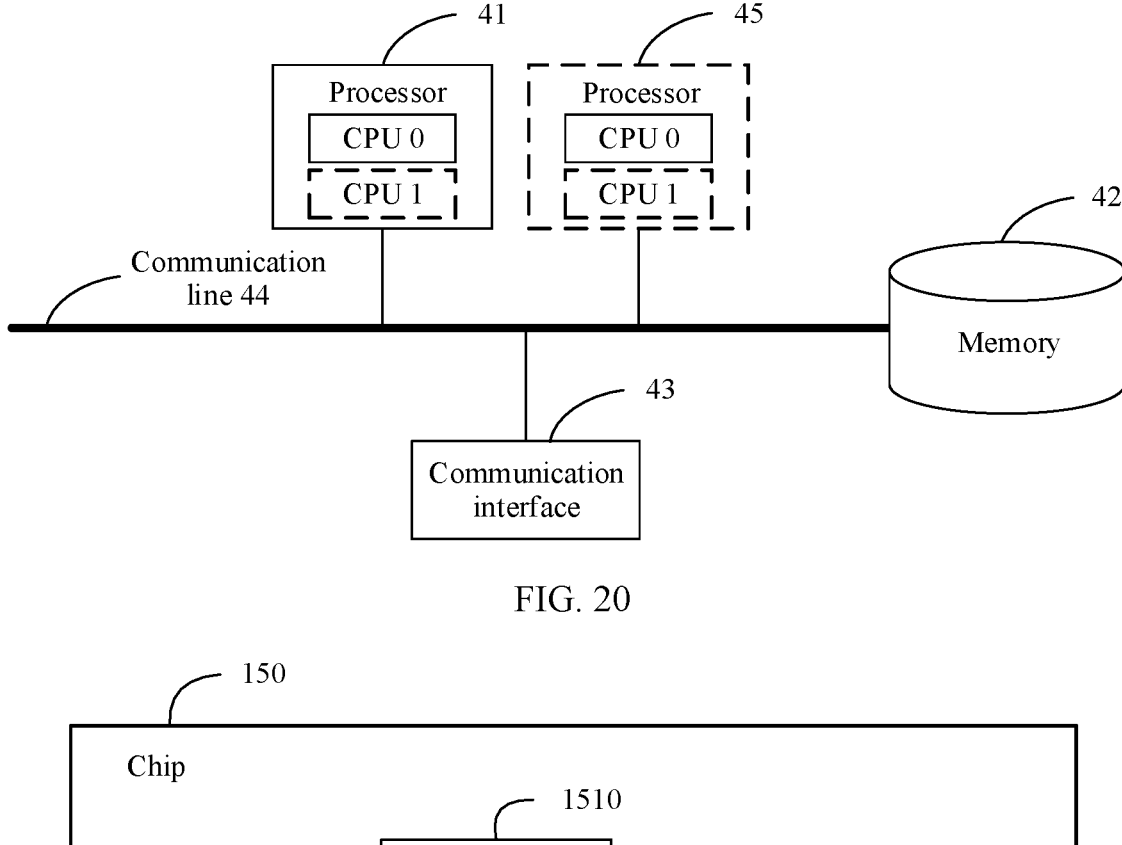
FIG. 20 is a schematic diagram of a structure of a communication device according to an embodiment of this application.
FIG. 21 is a schematic diagram of a structure of a chip according to an embodiment of this application.

When the processing module 112 is a processor 41 or a processor 45, the communication module 113 is a communication interface 43, and the storage module 111 is a memory 42, the communication apparatus in this application may be a communication device shown in FIG. 20.

FIG. 20 is a schematic diagram of a hardware structure of the communication device according to an embodiment of this application. For a structure of a first session management network element, a first access management network element, a second access management network element, and a terminal, refer to the structure shown in FIG. 20. The communication device includes the processor 41, a communication line 44, and at least one communication interface (in FIG. 20, that the communication device includes the communication interface 43 is merely used as an example for description).

Optionally, the communication device may further include the memory 42.

The processor 41 may be a general-purpose central processing unit (central processing unit, CPU), a microprocessor, an application-specific integrated circuit (application-specific integrated circuit, ASIC), or one or more integrated circuits configured to control program execution of the solutions of this application.

The communication line 44 may include a path for transferring information between the foregoing components.

The communication interface 43 is any apparatus such as a transceiver, and is configured to communicate with another device or a communication network such as an ethernet, a radio access network (radio access network, RAN), or a wireless local area network (wireless local area network, WLAN).

The memory 42 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 42 is not limited thereto. The memory may exist independently, and is connected to the processor through the communication line 44. Alternatively, the memory may be integrated with the processor.

The memory 42 is configured to store computer-executable instructions for performing the solutions of this application, and the processor 41 controls execution of the computer-executable instructions. The processor 41 is configured to execute the computer-executable instructions stored in the memory 42, to implement the inter-network interworking method provided in the following embodiments of this application.

Optionally, the computer-executable instructions in embodiments of this application may also be referred to as application program code. This is not specifically limited in embodiments of this application.

During specific implementation, in an embodiment, the processor 41 may include one or more CPUs, for example, a CPU 0 and a CPU 1 in FIG. 20.

During specific implementation, in an embodiment, the communication device may include a plurality of processors, for example, the processor 41 and the processor 45 in FIG. 20. Each of the processors may be a single-core processor (single-CPU) or a multi-core processor (multi-CPU). Herein, the processor may be one or more devices, circuits, and/or processing cores configured to process data (for example, computer program instructions).

It should be noted that when the device shown in FIG. 20 is a terminal, the communication interface 43 may be replaced with a transceiver.

FIG. 21 is a schematic diagram of a structure of a chip 150 according to an embodiment of this application. The chip 150 includes one or more (including two) processors 1510 and a communication interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, a subset thereof, or an extended set thereof.

In this embodiment of this application, a corresponding operation is performed by invoking the operation instructions (where the operation instructions may be stored in an operating system) stored in the memory 1540.

In a possible implementation, structures of chips used by a first session management network element, a first access management network element, a second access management network element, and a terminal are similar, and different apparatuses may use different chips to implement respective functions.

The processor 1510 controls a processing operation of any one of the first session management network element, the first access management network element, the second access management network element, and the terminal. The processor 1510 may also be referred to as a central processing unit (CPU).

The memory 1540 may include a read-only memory and a random access memory, and provide instructions and data for the processor 1510. A part of the memory 1540 may further include an NVRAM. For example, in an application, the memory 1540, the communication interface 1530, and the memory 1540 are coupled together by using a bus system 1520. The bus system 1520 may further include a power bus, a control bus, a status signal bus, and the like in addition to a data bus. However, for clear description, various buses are marked as the bus system 1520 in FIG. 21.

The methods disclosed in the foregoing embodiments of this application may be applied to the processor 1510, or may be implemented by the processor 1510. The processor 1510 may be an integrated circuit chip, and has a signal processing capability. In an implementation process, the steps in the foregoing method may be implemented by using a hardware integrated logical circuit in the processor 1510, or by using instructions in a form of software. The processor 1510 may be a general-purpose processor, a digital signal processor (digital signal processor, DSP), an ASIC, a field programmable gate array (field programmable gate array, FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed by a hardware decoding processor, or may be performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communication interface 1530 is configured to perform the sending and receiving steps of the first session management network element, the first access management network element, the second access management network element, and the terminal in the embodiments shown in FIG. 5 to FIG. 17B. The processor 1510 is configured to perform the processing steps of the first session management network element, the first access management network element, the second access management network element, and the terminal in the embodiments shown in FIG. 5 to FIG. 17B.

The transceiver unit may be a communication interface of the apparatus, and is configured to receive a signal from another apparatus. For example, when the apparatus is implemented as a chip, the transceiver unit is a communication interface used by the chip to receive a signal from or send a signal to another chip or apparatus.

According to an aspect, a computer-readable storage medium is provided. The computer-readable storage medium stores instructions. When the instructions are run, the functions of the first session management network element in FIG. 5 to FIG. 17B are implemented.

According to an aspect, a computer-readable storage medium is provided. The computer-readable storage medium stores instructions. When the instructions are run, the functions of the first access management network element in FIG. 5 to FIG. 17B are implemented.

According to an aspect, a computer-readable storage medium is provided. The computer-readable storage medium stores instructions. When the instructions are run, the functions of the second access management network element in FIG. 5 to FIG. 17B are implemented.

According to an aspect, a computer-readable storage medium is provided. The computer-readable storage medium stores instructions. When the instructions are run, the functions of the terminal in FIG. 5 to FIG. 17B are implemented.

According to an aspect, a computer program product including instructions is provided. The computer program product includes the instructions. When the instructions are run, the functions of the first session management network element in FIG. 5 to FIG. 17B are implemented.

According to another aspect, a computer program product including instructions is provided. The computer program product includes the instructions. When the instructions are run, the functions of the first access management network element in FIG. 5 to FIG. 17B are implemented.

According to another aspect, a computer program product including instructions is provided. The computer program product includes the instructions. When the instructions are run, the functions of the second access management network element in FIG. 5 to FIG. 17B are implemented.

According to another aspect, a computer program product including instructions is provided. The computer program product includes the instructions. When the instructions are run, the functions of the terminal in FIG. 5 to FIG. 17B are implemented.

According to an aspect, a chip is provided. The chip is used in a first session management network element. The chip includes at least one processor and a communication interface, the communication interface is coupled to the at least one processor, and the processor is configured to run instructions, to implement the functions of the first session management network element in FIG. 5 to FIG. 17B.

According to another aspect, a chip is provided. The chip is used in a first access management network element. The chip includes at least one processor and a communication interface, the communication interface is coupled to the at least one processor, and the processor is configured to run instructions, to implement the functions of the first access management network element in FIG. 5 to FIG. 17B.

According to another aspect, a chip is provided. The chip is used in a second access management network element. The chip includes at least one processor and a communication interface, the communication interface is coupled to the at least one processor, and the processor is configured to run instructions, to implement the functions of the second access management network element in FIG. 5 to FIG. 17B.

According to another aspect, a chip is provided. The chip is used in a terminal. The chip includes at least one processor and a communication interface, the communication interface is coupled to the at least one processor, and the processor is configured to run instructions, to implement the functions of the terminal in FIG. 5 to FIG. 17B.

An embodiment of this application provides a communication system. The communication system includes a first session management network element and a second access management network element. The first session management network element is configured to perform any function of the first session management network element in FIG. 5 to FIG. 10, and the second access management network element is configured to perform any step performed by the second access management network element in FIG. 5 to FIG. 10.

Optionally, the communication system may further include a terminal and a first access management network element. The terminal and the first access management network element are configured to perform corresponding functions in FIG. 5 to FIG. 10.

An embodiment of this application provides a communication system. The communication system includes a second access management network element. The second access management network element is configured to perform any step performed by the second access management network element in FIG. 11.

Optionally, the communication system may further include a terminal. The terminal is configured to receive second indication information or third indication information.

An embodiment of this application provides a communication system. The communication system includes a second access management network element. The second access management network element is configured to perform any step performed by the second access management network element in FIG. 12.

Optionally, the communication system may further include a terminal. The terminal is configured to perform the step performed by the terminal in FIG. 12.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer programs or instructions. When the computer programs or instructions are loaded and executed on a computer, all or some of the procedures or functions according to embodiments of this application are generated. The computer may be a general-purpose computer, a special-purpose computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (digital video disc, DVD), or may be a semiconductor medium, for example, a solid-state drive (solid-state drive, SSD).

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. An inter-network interworking method, comprising:
sending, by a second access management network element in a second network, a session management request to a first session management network element in accordance with a terminal supporting:
a non-access stratum (NAS) capability of a third network, and/or
a network name corresponding to the terminal supports interworking between the second network and the third network,
wherein the first session management network element supports interworking of the terminal among a first network, the second network, and the third network;
receiving, by the second access management network element from the first session management network element, a session management response to the session management request, wherein the session management response comprises a session context of a session of the terminal in the third network; and
preparing, by the second access management network element in accordance with the terminal moving to the second network, the session context of the terminal in the third network in advance of the terminal moving from the second network to the third network,
wherein the session management request comprises both:
a session identifier that is used to identify the session of the terminal in the third network, and the session context of the session of the terminal in the third network corresponds to the session identifier; and
a second indication information that is used to indicate to the terminal to move from the first network to the second network.

2. The method according to claim 1, wherein before the sending, by the second access management network element, the session management request to the first session management network element, the method further comprises:
receiving, by the second access management network element, address information of the first session management network element from a first access management network element in the first network.

3. The method according to claim 1, wherein before the sending, by the second access management network element, the session management request to the first session management network element, the method further comprises:
determining, by the second access management network element, that the terminal supports the NAS capability of the third network and/or the network name corresponding to the terminal supports the interworking between the second network and the third network, wherein a second session management network element selected, in the first network, by a first access management network element in the first network for the terminal does not support the interworking between the second network and the third network; and
selecting, by the second access management network element, the first session management network element.

4. The method according to claim 1, wherein the method further comprises:
receiving, by the second access management network element, a first request message from the terminal, wherein the first request message comprises a session identifier and/or first capability information, the first capability information indicates that the terminal supports the NAS capability of the third network, the session identifier is used to identify a session of the terminal in the third network, the session context is a context of the session corresponding to the session identifier, and the first request message is used to enable the terminal to move from the first network to the second network.

5. The method according to claim 1, wherein after the receiving, by the second access management network element, the session management response from the first session management network element, the method further comprises:
sending, by the second access management network element, the session context to the terminal.

6. The method according to claim 1, wherein the first network is a 2G network or a 3G network, the second network is a 4G network, and the third network is a 5G network.

7. A communication apparatus, used in a second access management network element of a second network, wherein the apparatus comprises:
a processor; and
a non-transitory computer readable medium comprising computer-executable instructions that, when executed by the processor, facilitate the communication apparatus carrying out inter-network interworking operations comprising:
sending, by the second access management network element in a second network, a session management request to a first session management network element in accordance with a terminal supporting:
a non-access stratum (NAS) capability of a third network, and/or
a network name corresponding to the terminal supports interworking between the second network and the third network,
wherein the first session management network element supports interworking of the terminal among a first network, the second network, and the third network;
receiving, by the second access management network element from the first session management network element, a session management response to the session management request, wherein the session management response comprises a session context of a session of the terminal in the third network; and
preparing, by the second access management network element in accordance with the terminal moving to the second network, the session context of the terminal in the third network in advance of the terminal moving from the second network to the third network,
wherein the session management request comprises both:
a session identifier that is used to identify the session of the terminal in the third network, and the session context of the session of the terminal in the third network corresponds to the session identifier; and a second indication information that is used to indicate to the terminal to move from the first network to the second network.

8. The communication apparatus according to claim 7, wherein before the sending, by the second access management network element, the session management request to the first session management network element, the operations further comprise:

receiving, by the second access management network element, address information of the first session management network element from a first access management network element in the first network.

9. The communication apparatus according to claim 7, wherein before the sending, by the second access management network element, the session management request to the first session management network element, the operations further comprise:

determining, by the second access management network element, that the terminal supports the NAS capability of the third network and/or the network name corresponding to the terminal supports the interworking between the second network and the third network, wherein a second session management network element selected, in the first network, by a first access management network element in the first network for the terminal does not support the interworking between the second network and the third network; and selecting, by the second access management network element, the first session management network element.

10. The communication apparatus according to claim 7, wherein the operations further comprise:

receiving, by the second access management network element, a first request message from the terminal, wherein the first request message comprises a session identifier and/or first capability information, the first capability information indicates that the terminal supports the NAS capability of the third network, the session identifier is used to identify a session of the terminal in the third network, the session context is a context of the session corresponding to the session identifier, and the first request message is used to enable the terminal to move from the first network to the second network.

11. The communication apparatus according to claim 7, wherein after the receiving, by the second access management network element, the session management response from the first session management network element, the operations further comprise:

sending, by the second access management network element, the session context to the terminal.

12. The communication apparatus according to claim 7, wherein the first network is a 2G network or a 3G network, the second network is a 4G network, and the third network is a 5G network.

* * * * *